United States Patent
Schumacher

(10) Patent No.: US 12,541,447 B2
(45) Date of Patent: Feb. 3, 2026

(54) AUTOMATED MULTI-STAGE COMPUTER CODE GENERATION

(71) Applicant: Ropes AI Inc, New York, NY (US)

(72) Inventor: Kenneth Schumacher, New York, NY (US)

(73) Assignee: Ropes AI Inc., New York, NY (US)

( * ) Notice: Subject to any disclaimer, the term of this patent is extended or adjusted under 35 U.S.C. 154(b) by 0 days.

(21) Appl. No.: 19/081,709

(22) Filed: Mar. 17, 2025

(65) Prior Publication Data

US 2025/0208977 A1 Jun. 26, 2025

Related U.S. Application Data

(63) Continuation of application No. 18/789,112, filed on Jul. 30, 2024, now Pat. No. 12,253,932.

(Continued)

(51) Int. Cl.
*G06F 11/3604* (2025.01)
*G06F 8/30* (2018.01)
(Continued)

(52) U.S. Cl.
CPC ............ *G06F 11/3608* (2013.01); *G06F 8/30* (2013.01); *G06F 8/35* (2013.01); *G06F 11/3438* (2013.01); *G06F 11/3466* (2013.01); *G06F 11/3684* (2013.01); *G06F 11/3692* (2013.01); *G06F 11/3696* (2013.01); *G09B 7/02* (2013.01); *G09B 19/0053* (2013.01); *G09B 23/186* (2013.01)

(58) Field of Classification Search
USPC .................................................. 717/124–135
See application file for complete search history.

(56) References Cited

U.S. PATENT DOCUMENTS 11,301,269 B1 4/2022 Singh
12,111,754 B1 10/2024 Mysore et al.
(Continued)

OTHER PUBLICATIONS

M. Fabijanić, G. Đambić, B. Skračić and M. Kolarić, "Automatic Evaluation of Student Software Solutions in a Virtualized Environment," 2023 46th MIPRO ICT and Electronics Convention (MIPRO), Opatija, Croatia, Jun. 29, 2023, pp. 642-647, doi: 10.23919/MIPRO57284.2023.10159927. (Year: 2023).*

(Continued)

*Primary Examiner* — Andrew M. Lyons
(74) *Attorney, Agent, or Firm* — Foley & Lardner LLP

(57) ABSTRACT

Technical solutions are directed to creation and deployment of multi-stage test problems. A processor can provide, to a client, a first data structure for a first stage of a multi-stage test problem including a description for generation of a client solution for the first stage and a test case to evaluate the client solution. The processor can receive, from the client, a client data structure comprising the client solution including a client computer code generated at the client for the first stage. The processor can determine, by evaluating the client solution using an input value and an output value of the test case, that the output of the client solution satisfies a validity condition of the output value. The processor can provide, to the client, based on satisfying the validity condition, a second data structures for a second stage of the multi-stage test problem.

22 Claims, 40 Drawing Sheets

Related U.S. Application Data

(60) Provisional application No. 63/596,106, filed on Nov. 3, 2023.

(51) Int. Cl.
| | |
|---|---|
| *G06F 8/35* | (2018.01) |
| *G06F 11/34* | (2006.01) |
| *G06F 11/3668* | (2025.01) |
| *G09B 7/02* | (2006.01) |
| *G09B 19/00* | (2006.01) |
| *G09B 23/18* | (2006.01) |

(56) References Cited

U.S. PATENT DOCUMENTS

| | | | |
|---|---|---|---|
| 2009/0222696 | A1 | 9/2009 | Duale |
| 2015/0227452 | A1 | 8/2015 | Raghavan et al. |
| 2019/0095501 | A1 | 3/2019 | Beringer et al. |
| 2020/0019494 | A1* | 1/2020 | Kwon ............... G06F 11/3608 |
| 2020/0341888 | A1 | 10/2020 | Sridhar et al. |
| 2020/0401382 | A1* | 12/2020 | Briggs ............... G06N 3/0464 |
| 2022/0083450 | A1 | 3/2022 | Geddes et al. |
| 2022/0179776 | A1 | 6/2022 | Schrammel et al. |
| 2023/0237826 | A1 | 7/2023 | Perez et al. |
| 2023/0280985 | A1 | 9/2023 | Hayashi et al. |
| 2024/0020116 | A1 | 1/2024 | Chen et al. |
| 2024/0201959 | A1* | 6/2024 | Callegari ............... G06F 8/35 |
| 2024/0241817 | A1 | 7/2024 | Tahvili et al. |
| 2024/0281222 | A1 | 8/2024 | Trummer |
| 2024/0303179 | A1 | 9/2024 | Xu et al. |
| 2024/0330167 | A1 | 10/2024 | Duong |
| 2024/0338306 | A1 | 10/2024 | Waxman et al. |
| 2024/0354234 | A1 | 10/2024 | Dey et al. |
| 2025/0045185 | A1* | 2/2025 | Tang ............... G06F 11/3684 |
| 2025/0077396 | A1* | 3/2025 | Sen ............... G06F 11/3698 |

OTHER PUBLICATIONS

D. Handriks et al., "Measuring Coding Challenge Competence With APPS," Nov. 8, 2021, arXiv:2105.09938v3, doi: 10.48550/arXiv.2105.09938. (Year: 2021).*

J. Skalka and M. Drlík, "Development of Automatic Source Code Evaluation Tests Using Grey-Box Methods: A Programming Education Case Study," in IEEE Access, vol. 11, pp. 106772-106792, Oct. 4, 2023, doi: 10.1109/ACCESS.2023.3317694. (Year: 2023).*

Chemnitz et al., "Towards Code Generation from BOD Test Case Specifications: A Vision," 2023 IEEE/ACM 2nd International Conference on AI Engineering—Software Engineering for AI ( CAIN), May 15-16, 2023, Melbourne, Australia, (5 pages.).

Final Office Action on U.S. Appl. No. 18/789,084 DTD May 8, 2025.

Final Office Action on U.S. Appl. No. 18/789,097 DTD Feb. 6, 2025.

Final Office Action on U.S. Appl. No. 18/789,134 DTD Feb. 18, 2025.

Non-Final Office Action on U.S. Appl. No. 18/789,084 DTD Jan. 3, 2025.

Non-Final Office Action on U.S. Appl. No. 18/789,097 DTD Dec. 9, 2024.

Non-Final Office Action on U.S. Appl. No. 18/789,134 DTD Oct. 21, 2024.

Non-Final Office Action on U.S. Appl. No. 19/081,709 DTD May 21, 2025.

Notice of Allowance on U.S. Appl. No. 18/789,112 DTD Nov. 14, 2024.

T. Rosenthal; P. Suppes; N. Ben-Zvi; Automated evaluation methods with attention to individual differences—a study of a computer-based course in C; Jan. 14, 2003; IEEE; 32nd Annual Frontiers in Education (Year: 2003).

* cited by examiner

700

- Overview
- Problems
- Candidates
- Addessments
- Results
- Settings

- Contact
- Logout

Administrator interface 106

Prompts 222

Fraud engineering department at a bank called Lizard | Submit ( Choose For Me ) ( Recursion ) ( Dynamic Programming ) ( Divide and Conquer ) ( Sliding Window ) ( Graph Theory ) ( String Algorithms ) ( Enter your own )

Identifying Suspicious Transactions
In the fraud engineering department at a bank called Lizard, there is a need to quickly analyze and alert any suspicious transactions. Implement a function that can accept a series of transactions and return a list of high-risk transactions based on the pattern of occurring in quick succession and involving a significantly large amount of money.

Full Description (Test Problem 226)
Fraud Transaction Analysis
Problem Description
In the fraud engineering department at a bank called Lizard, there is a need to quickly analyze and alert any suspicious transactions. Your task is to implement a function that accepts a series of transactions and returns a list of high-risk transactions based on the pattern of quick succession and the involvement of a significantly large amount of money.

Write a function find_high_risk_transactions that takes in two parameters: transactions (a list of tuples) and threshold_amount (an integer). The transactions list represents a series of transactions, where each transaction is a tuple of three elements: (timestamp, amount, transaction_id). The timestamp is an integer indicating the time in seconds since the Unix epoch, the amount is a positive integer indicating the money involved in the transaction, and the transaction_id is a string representing a unique identifier for the transaction.

Your function should analyze the given transactions and return a list of transaction IDs that are considered high-risk. A transaction is considered high-risk if it satisfies both of the following conditions:

- The transaction occurs within a given time window of 60 seconds of a previous transaction.
- The transaction's amount is greater than or equal to the threshold_amount.

Inputs

- transactions (list of tuples): A list of transactions, where each transaction is a tuple in the format (timestamp, amount, transaction_id). The length of this list (n) satisfies the constraint: $1 <= n <= 10^4$.
- threshold_amount (integer): The minimum amount that a transaction should have to be considered high-risk. The value of threshold_amount satisfies the constraint: $0 <= threshold\_amount <= 10^9$.

Expected Output
Your function should return a list of transaction IDs that are considered high-risk. The output should be in the same order as the transactions occur.
Constraints

- The timestamp of each transaction is a positive integer representing the time in seconds since the Unix epoch.
- The amount of each transaction is a positive integer.
- The transaction_id is a unique string identifier for each transaction, consisting only of alphanumeric characters.
- The input data always follows the specified format.
- If there are no high-risk transactions, the function should return an empty list.
- The input list of transactions is sorted in ascending order based on the timestamp (i.e., from the oldest to the most recent).
- The given transactions may span across multiple days, and the time windows should not cross the boundary of any day.

Boilerplate

Results Data Types 1304　　　Data Entries 1306

| Column | Description |
|---|---|
| id | identifier of the current attempt |
| latest_attempt | latest code of the user |
| snapshots | list of snapshots for the current attempt |
| current_test_cases | list of custom test cases the user has for the stage |
| user_actions | list of user actions the user has taken during the stage |
| interview_id | identifier of the associated interview |
| time_started | what time the user started the current stage |
| time_end | what time the user ended the stage, or null if they haven't completed it |
| organization_id | identifier of the organization of the associated interview |
| stage | what stage the current attempt corresponds to |
| final_code | code submitted by the user at the end of the stage, or null |
| results | test cases results of the user at the end of the stage, or null |

FIG. 13

| Column | Description |
|---|---|
| id | id of the submission event |
| test_cases_passed | number of test cases the user's code passed |
| test_case_results | the results of the test cases against the user's code |
| test_case_error | any syntax or runtime errors that occurred while running the user's code |
| submission_timestamp | timestamp of when the submission occurred |
| total_test_cases | total number of test cases run |
| test_case_console_logs | all console logs that were captured during the run |
| interview_id | id of the associated interview |
| problem_id | id of the associated problem |
| is_custom_tests | binary value signaling if the tests run were custom or not |
| organization_id | id of the associated organization |
| test_case_inputs | the data of the test cases that were run |
| test_case_solutions | the current values of the test cases that were run |

FIG. 17

| Column | Description |
|---|---|
| interview_id | ID of the interview |
| code | final code of the user |
| snapshots | list of objects, where each object contains the code and timestamp of that code. Snapshots are added for every keystroke in the code editor |
| user_actions | list of copy, paste, unfocus tab and refocus tab events from user during interview |
| llm_analysis | LLM generated analysis among key pillars (summary, algorithm design, language proficiency, debugging) |
| llm_playback | LLM generated timeline of events |
| rating | LLM generated score |
| llm_filtered_playback | LLM generated highlight timeline of events |
| time_length_seconds | length of total interview |
| completed_timestamp | what time the interview was completed |
| organization_id | organization the completed interview belongs to |
| test_cases_passed | number of test cases passed by the user |
| total_test_cases | total number of test cases for the problem |
| stage_results | metadata of test case results (only used for dynamic problems) |

Administrator interface 106

Details

Client Code (e.g., Client Solution 212)

```
1  class Solution {
2    public int longestDistinctRoute(String path) {
3      // Your code here
4      int max = path. length();
5      String lastChar = "";
6      String longest = "";
7      for (int i=0; i < max; i++) {
8        String current = path.substring(i,i+1);
9        if (!current.equals(lastChar)) {
10         len = longest.length();
11         boolean found = false;
12         for (j=0; j <len; j++) {
13           if (current.equals(longest.substring(j, j+1))) {
14             found
15           }
16         }
17       }
18       lastChar = current;
19     }
20   }
21 }
```

< 463/1076 >   ◯ Showing edits

Implements character repetition detection
User implements a nested for loop and a boolean flag to detect if the current character is already in the 'longest' string.

Administrator interface 106

```
1 from typing import List
2
3 def findPayments(payments: List[int], targetAmount: int) -> List[int]:
4     pass
```

Two Payments
Your task is to implement a function that takes an array of payment amounts (integers) and a target payment amount. The function should find two different payments in the array that, when summed together, equal the target amount. Return their indices.

Input:
- An array of integers payments
- An integer targetAmount

Output:
- An array of two integers representing the indices of the payments that sum up to targetAmount.

Constraints:
- The array will have at least two elements and at most $10^5$ elements.
- Payment amounts are integers from $-10^9$ to $10^9$.
- There will always be exactly one solution.

Example 1
Inputs
payments = [2, 7, 11, 15];
targetAmount = 9
Expected Output:
[0, 1]

Example 2

| Test Cases | Custom Test Cases |
|---|---|
| Test 1 | |
| Test 2 | |

56m:18s  Run Tests  Complete Test

Demo Mode
Struggle  Debug  Brute Force  Solve

FIG. 29

| name | email | created_at | identifier | organization_id | notes | status | greenhouse_id | origin | ashby_id |
|---|---|---|---|---|---|---|---|---|---|
| Firstname Lastname | First.lastname@icloud.com | Date and Time | 336693 | 15 | | Assigned | | | |

FIG. 30

| identifier | candidate_id | problem_id | status | created_at | language | organization_id | is_practice |
|---|---|---|---|---|---|---|---|
| 1caab0 | 5a336f | 19392 | Completed | 1.69783E+14 | kotlin | 15 | f |

FIG. 31

| Column | Description |
|---|---|
| problem_id | unique id for the problem |
| display_name | name of the problem that will be displayed to candidate |
| duration | how long the problem has to take the problem |
| stages | list of objects that contain data necessary to serve the problem. For each stage (static problem have just one stage), the object contains: (1) a title of the stage, (2) a technical description of the stage to show the user, (3) the functionName of the boilerplate code provided to the user, (4) list of objects containing programming language-specific data Each language has (a) a solution, (b) a boilerplate, and (c) tester code to help run the user code against test cases. The stages object also contains (5) a list of test caess that serve as the ground truth of correctness for the problem, (6) a boolean value that signals to the system whether to write new boilerplate for the dynamic problem stage or not, (7) a boolean value on whether time complexity should be considered as part of the problem, and (8) an optional string containing the optimal time complexity of the problem. |

FIG. 32

AUTOMATED MULTI-STAGE COMPUTER CODE GENERATION

RELATED APPLICATION

The present application claims priority to and the benefit of a U.S. Non-Provisional patent application Ser. No. 18/789,112, titled "AUTOMATED MULTI-STAGE COMPUTER CODE GENERATION," filed on Jul. 30, 2024, which claims priority to and the benefit of a U.S. Provisional Patent Application Ser. No. 63/596,106, titled "SYSTEMS AND METHODS FOR STATE-BASED DATA PROCESSING ASSESSMENT," filed on Nov. 3, 2023, both of which are incorporated herein by reference in their entirety and for all purposes.

BACKGROUND

In technical fields, such as software engineering, solutions can involve various types of computer code designed by professionals trained in particular software or engineering fields. Some technical solutions can involve different types of software engineering skills, depending on the technical issues and solutions provided. Testing and analysis of computer code can be useful for quality assessment.

SUMMARY

Technical solutions described herein are directed to automated, machine learning (ML) based testing and evaluation of computer code solutions generated from test problem descriptions. Software solutions can vary in design, level of complexity and applications. These variations can trigger differences in the computer code design, resulting in varying efficiencies, effectiveness, or reliability. Ineffective or unreliable computer code, such as those in existing computer-based test generating systems, can lead to data mishandling, miscommunications, or erroneous device interactions, which can trigger increased computational inefficiencies and system energy consumption. Inefficient computer code design may require more processing computations to perform actions that a more efficiently designed code could achieve with fewer computations. This increased computational demand results in greater consumption of computational resources and processing power, thereby diminishing system efficiency and affecting user experience. Timely detection of such low-quality computer code can help prevent these and similar other issues but is challenging to implement. The technical solutions of this disclosure overcome such challenges using ML-based computational systems that automatically, yet reliably and accurately generate and validate test problems and their computer code solutions, while reducing the number of computational resources, thereby improving energy efficiency and overall system performance.

At least an aspect of the technical solutions is directed to a system. The system can include one or more processors coupled with memory. The one or more processors can be configured to cause the one or more ML models to generate one or more test cases for a test problem and a candidate solution comprising a computer code for the test problem. The one or more test cases and the candidate solution can be generated in response to inputting, into one or more ML models, one or more prompts that can include a description of a test problem for generating computer code. The one or more processors can be configured to determine that the candidate solution satisfies a validity condition, in response to evaluating the candidate solution using the one or more test cases and the computer code of the candidate solution. The one or more processors can be configured to store, in one or more data structures, the description of the problem and the candidate solution, in response to determining that the candidate solution satisfies the validity condition.

The one or more processors can be configured to evaluate the candidate solution using the one or more test cases by executing the computer code. The one or more processors can include first prompts. The one or more processors can be configured to cause, responsive to inputting one or more second prompts that can include a description of a test problem into the one or more ML models, the one or more ML models to generate a boilerplate portion of a computer code for the test problem. The one or more processors can be configured to store, in the one or more data structures, the boilerplate portion. The one or more processors can be configured to cause the one or more ML models to generate a first test case of the one or more test cases. The one or more processors can be configured to parse, responsive to generation of the first test case, the first test case.

The one or more processors can be configured to cause the one or more ML models to generate the candidate solution. The one or more test cases can include a plurality of test cases. The one or more processors are further configured to determine, responsive to generation of each of the one or more test cases, that the candidate solution satisfies the validity condition for each of the one or more test cases. The one or more processors can be configured to store the description of the problem and the candidate solution responsive to determining that the candidate solution satisfies the validity condition for each of the one or more test cases. The candidate solution can be a first candidate solution. The one or more processors can be configured to cause the one or more ML models to generate a second candidate solution prior to the first candidate solution. The one or more processors can be configured to determine, responsive to evaluating the second candidate solution using the one or more test cases and second computer code can correspond to the second candidate solution, that the second candidate solution does not satisfy the validity condition. The one or more processors can be configured to cause the one or more ML models to generate the first candidate solution responsive to determining that the second candidate solution does not satisfy the validity condition.

The one or more processors can be configured to debug the second candidate solution. The one or more processors can be configured to determine, responsive to debugging the second candidate solution, that the second candidate solution includes an error. The one or more processors can be configured to discard the second candidate solution and cause the one or more ML models to generate the first candidate solution. The one or more processors can be configured to debug at least one test case of the one or more test cases. The one or more processors can be configured to determine, responsive to debugging the at least one test case, that the at least one test case includes an error. The one or more processors can be configured to discard the at least one test case and cause the one or more ML models to generate a second test case of the one or more test cases. The one or more processors can be configured to validate the at least one test case with the second candidate solution. The one or more processors can be configured to compare one or more expected outputs of the at least one test case with one or more outputs of the second candidate solution based on one or more inputs of the at least one test case input into the second candidate solution.

The one or more processors can be configured to validate a first test case of the one or more test cases with the candidate solution. The one or more processors can be configured to debug, responsive to one or more outputs of the first test case not matching one or more corresponding outputs of the candidate solution, the first test case. The one or more processors can be configured to determine, responsive to debugging the first test case, that the first test case includes the error. The one or more processors can be configured to discard the first test case and cause the one or more ML models to regenerate the first test case for the candidate solution. The one or more test cases can be a plurality of test cases. The one or more processors can be configured to initiate generation of the candidate solution prior to the one or more ML models completing generation of each of the plurality of test cases. The one or more processors can be configured to provide, for presentation at a client device, the candidate solution responsive to determining that the candidate solution satisfies the validity condition. The one or more processors can be configured to receive, from a client device, a domain of the test problem to be generated. The one or more processors can be configured to generate, responsive to one or more second prompts and the domain input into the one or more ML models, one or more short problem summaries that can correspond to the domain. The one or more processors can be configured to cause, responsive to the one or more second prompts and a candidate short problem summary of the one or more short problem summaries input into one or more ML models, a description of the test problem that can correspond to the domain and the candidate short problem description.

The one or more ML models can include at least one of one or more generative pretrained transformer models or one or more large language models (LLMs). The one or more processors can be configured to generate, by the one or more ML models responsive to a prompt comprising an indication of the test problem, a string of text comprising the description of the test problem. The one or more processors can be configured to provide for display on a client device, the string of text. The one or more processors can be configured to generate, by the one or more ML models responsive to a type of the computer code indicated in the one or more prompts and the string of text input into the one or more ML models, a boilerplate portion of the computer code according to the indicated type. The one or more processors can be configured to provide for display on the client device, the boilerplate portion. The one or more processors can be configured to receive, from the one or more ML models responsive to parsing the candidate solution of the one or more candidate solutions for the test problem, the candidate solution parsed into a JavaScript Object Notation (JSON) object.

The one or more processors can be configured to determine, using the one or more ML models, the JSON object, and a test case of the one or more test cases executed in an execution environment, that the candidate solution satisfies the validity condition. The one or more processors can be configured to receive an indication that a first test case of the one or more test cases or the solution is incorrect. The one or more processors can be configured to generate a plurality of calls for the one or more ML models, each of the plurality of calls can include the first test case. The one or more processors can be configured to receive a plurality of results from the one or more ML models responsive to the plurality of calls. The one or more processors can be configured to determine, based on the plurality of results, validity of the first test case.

At least an aspect of the technical solutions is directed to a method. The method can include causing, by one or more processors, responsive to inputting one or more prompts that can include a description of a test problem for generating computer code into one or more ML models, the one or more ML models to generate one or more test cases for the test problem and a candidate solution comprising a computer code for the test problem. The method can include determining, by the one or more processors, responsive to evaluating the candidate solution using the one or more test cases and the computer code of the candidate solution, that the candidate solution satisfies a validity condition. The method can include storing, by the one or more processors, in one or more data structures, the description of the problem and the candidate solution responsive to determining that the candidate solution satisfies the validity condition.

At least an aspect of the technical solutions is directed to a non-transitory computer-readable media that can have processor readable instructions. The instruction can cause at least one processor to cause responsive to inputting one or more prompts that can include a description of a test problem for generating computer code into one or more ML models, the one or more ML models to generate one or more test cases for the test problem and a candidate solution comprising a computer code for the test problem. The instruction can cause at least one processor to determine, responsive to evaluating the candidate solution using the one or more test cases and the computer code of the candidate solution, that the candidate solution satisfies a validity condition. The instruction can cause at least one processor to store, responsive to determining that the candidate solution satisfies the validity condition, in one or more data structures, the description of the problem and the candidate solution to evaluate computer code generated by a test taker for evaluating software engineering skills of the test taker.

At least an aspect of the technical solutions is directed to a system. The system can include one or more processors coupled with memory. The one or more processors can be configured to provide, to a client device, one or more first data structures for a first stage of a test problem comprising a plurality of stages. The one or more first data structures can include a description for generation of a client solution for the first stage at the client device and one or more test cases to evaluate the client solution. The one or more processors can be configured to receive, from the client device, a client data structure comprising the client solution that can include a client computer code generated at the client device for the first stage. The one or more processors can be configured to determine, by evaluating the client solution using the one or more test cases, that the client solution satisfies the validity condition for the first stage indicated by the description.

The one or more processors can be configured to provide, to the client device, based on determining that the client solution satisfies the validity condition, one or more second data structures for a second stage of the test problem. The one or more processors can be configured to determine that the client solution satisfies the validity condition for the first stage responsive to inputting the client solution and the one or more test cases into one or more machine learning (ML) models. The validity condition corresponds to at least one of: a threshold runtime condition for the client solution, an amount of memory utilized by the client solution, a time interval taken to complete the client solution, or a level of performance of the client solution. The one or more second data structures can include a i) a second description for generation of a second client solution for the second stage at the client device and ii) one or more second test cases to evaluate the second client solution.

The one or more processors can be configured to identify a boilerplate portion of the client computer code for at least the first stage of the test problem. The one or more processors can be configured to present the boilerplate to the client device to use for generating the client solution for the first stage. The one or more processors can be configured to identify a boilerplate portion of computer code for the first stage. The one or more processors can be configured to evaluate the client solution for the first stage using at least the boilerplate portion and the one or more test cases. The one or more processors can be configured to identify a second boilerplate portion of computer code for the second stage. The one or more processors can be configured to evaluate a second client solution that can include a second client computer code generated at the client device for the second stage using at least the second boilerplate portion and a second one or more test cases.

The one or more processors can be configured to identify a plurality of portions of the client computer code for the first stage and a plurality of timestamps for the plurality of portions. Each of the plurality of portions can be associated with a corresponding timestamp of the plurality of timestamps for the respective portion. The one or more processors can be configured to generate, using the plurality of portions and the plurality of timestamps, the description for the second stage of the test problem. The one or more processors can be configured to generate the description for the second stage of the test problem based on inputting the plurality of portions and the plurality of timestamps into the one or more ML models.

The one or more processors can be configured to determine a level of performance of the client solution for the first stage, based on at least one of: an output value of a runtime of the client solution, a time of completion of the runtime, a memory usage of the runtime, or a measure of a code quality of the client solution. The one or more processors can be configured to generate, based on the level of performance for the first stage, a description for a second stage of the test problem. The client solution is a first version of the client solution for the first stage. The one or more processors are configured to receive, from the client device, during a time period for generating the client solution for the first stage, a second version of the client solution for the first stage to evaluate using the one or more first test cases. The second version can be generated prior to completion of the first version of the client solution. The one or more processors can be configured to generate, using the second version of the client solution and the one or more first test cases, an evaluation of the second version of the client solution. The one or more processors can be configured to provide, to the client device, the evaluation of the second version during the time period.

The one or more processors can be configured to determine, based on the second version of the client solution and the one or more first test cases, that the second version of the client solution does not satisfy the validity condition. The one or more processors can be configured to provide, for display at the device, a notification that the second value does not satisfy the validity condition. The one or more processors can be configured to generate, using a validated solution for the first stage and the one or more first test cases input into one or more machine learning (ML) models, the threshold runtime condition of the first stage. The threshold runtime condition can correspond to a value of a runtime of the validated solution using the one or more first test cases.

The one or more ML models can be one or more large language models (LLMs) and the one or more processors are configured to determine that the client solution satisfies the validity condition using at least a prompt to the one or more LLMs. The one or more processors can be configured to determine a level of performance of the client solution for the first stage based on one or more of a runtime of the client solution, a time of completion of the runtime, a memory usage of the runtime, or a measure of a code quality of the client solution. The one or more processors can be configured to select, from the plurality of stages ordered according to a plurality of levels of performance, the second stage of the plurality of stages based on the level of performance of the plurality of levels of performance. The one or more processors can be configured to identify a time duration of a testing period for generating a plurality of client solutions for the plurality of stages. The one or more processors can be configured to determine a time interval of a remaining amount of the time duration of the testing period following the determination that the client solution satisfies the validity condition. The one or more processors can be configured to select, from the plurality of stages can correspond to a plurality of time intervals, the second stage according to the time interval of the remaining amount of the time duration. The one or more processors can be configured to determine a first level of difficulty of the client solution for the first stage. The one or more processors can be configured to select from the plurality of stages can correspond to a plurality of levels of difficulty, the second stage based on the first level of difficulty and responsive to the client solution for the first stage satisfying the validity condition.

At least an aspect of the technical solutions is directed to a method. The method can include providing, by one or more processors, to a client device, one or more first data structures for a first stage of a test problem comprising a plurality of stages. The one or more first data structures can include i) a description for generation of a client solution for the first stage at the client device and ii) one or more test cases to evaluate the client solution. The method can include receiving, by the one or more processors, from the client device, a client data structure. The client data structure can include the client solution that can include a client computer code generated at the client device for the first stage. The method can include determining, by the one or more processors, by evaluating the client solution using the one or more test cases, that the client solution satisfies the validity condition for the first stage indicated by the description.

The method can include providing, by the one or more processors, to the client device, based on determining that the client solution satisfies the validity condition, one or more second data structures for a second stage of the test problem. The method can include determining, by the one or more processors that the client solution satisfies the validity condition for the first stage responsive to inputting the client solution and the one or more test cases into one or more machine learning (ML) models. The validity condition can correspond to at least one of: a threshold runtime condition for the client solution, an amount of memory utilized by the client solution, a time interval taken to complete the client solution, or a level of performance of the client solution. The one or more second data structures can include i) a second description for generation of a second client solution for the second stage at the client device and ii) one or more second test cases to evaluate the second client solution.

At least an aspect of the technical solutions is directed to a non-transitory computer-readable media that can have processor readable instructions. The instructions can cause at least one processor to provide, to a client device, one or more first data structures for a first stage of a test problem comprising a plurality of stages, the one or more first data structures comprising i) a description for generation of a client solution for the first stage at the client device and ii) one or more test cases to evaluate the client solution. The instructions can cause at least one processor to receive, from the client device, a client data structure comprising the client solution that can include a client computer code generated at the client device for the first stage. The instructions can cause at least one processor to determine, by evaluating the client solution using the one or more test cases, that the client solution satisfies the validity condition for the first stage indicated by the description. The instructions can cause at least one processor to provide, to the client device, based on determining that the client solution satisfies the validity condition, one or more second data structures for a second stage of the test problem, wherein the validity condition corresponds to at least one of: a threshold runtime condition for the client solution, an amount of memory utilized by the client solution, a time interval taken to complete the client solution, or a level of performance of the client solution.

At least an aspect of the technical solutions is directed to a system. The system can include one or more processors coupled with memory. The one or more processors can be configured to identify a plurality of entries of a computer code for a client solution of a test problem created at a client device during a testing period. Each entry of the plurality of entries can correspond to a portion of the computer code that is associated with a timestamp within the testing period. The one or more processors can be configured to select, from the plurality of entries, a subset of the entries, each entry of the subset selected based on: (i) a difference between a first timestamp of the entry and a second timestamp of a preceding entry of the subset that satisfies a time selection criteria; or (ii) a difference between a first portion of the computer code of the entry and a second portion of the computer code of a preceding entry of the subset that satisfies a code selection criteria The one or more processors can be configured to generate, using one or more prompts and the subset of the entries input into one or more machine learning (ML) models, a timeline of events indicative of actions taken at the client device during creation of the computer code for the client solution.

The one or more processors can be configured to retrieve, from a storage device, the plurality of entries organized in a chronological order and indicative of a plurality of actions comprising the actions that can include at least one of: a keystroke of a keyboard of the client device, a copy action performed at the client device, a paste action performed at the client device, a menu selection at the client device, a user interface window selection, a click of a pointing device, or testing of the client solution using one or more test cases. The one or more processors can be configured to provide, for display, the timeline of events. The plurality of entries includes a plurality of snapshots of the computer code created using the client device during the testing period and can generate the timeline of events using the plurality of snapshots input into the one or more ML modes.

The one or more processors can be configured to identify, from the plurality of entries, a first entry that can have a string of characters of the first portion of the computer code. The one or more processors can be configured to determine a stage of the client solution using the string of characters of the first entry. The one or more processors can be configured to identify, from a storage device, a plurality of data structures for the plurality of entries. Each of the plurality of data structures can have a timestamp attribute that can include a respective timestamp and a code attribute indicative of a respective state of the computer code for the respective timestamp. The one or more processors can be configured to generate, using the plurality of data structures, a list of actions.

The one or more processors can be configured to identify performance data that can include at least one or more of: a test case input for the client solution, a test case output for the client solution, data on a test case applied to the client solution, data on a test case that the client solution satisfied, data on a test case that the client solution did not satisfy, data on an error for the client solution, metrics on consumption of computing resources, time to run the client solution, or data on a warning for the client solution. The one or more processors can be configured to generate, using the plurality of data structures that can correspond to the performance data, a list of submissions for the client solution. The one or more processors can be configured to generate the plurality of entries using at least the list of actions and the list of submissions.

The one or more processors can be configured to compare the difference between the first timestamp and the second timestamp with the time selection criteria. The one or more processors can be configured to select, from the plurality of entries, the subset of the entries based at least on the comparison. The one or more processors can be configured to compare the difference between the first portion and the second portion with the code selection criteria and select, from the plurality of entries, the subset of the entries based on the comparison.

The one or more processors can be configured to generate, using the one or more ML models, a plurality of data structures for a plurality of events of the timeline of events. Each event of the timeline of events can correspond to one or more actions of the plurality of actions taken at the client device during creation of the computer code for the client solution. The one or more processors can be configured to identify, using the plurality of data structures and the one or more ML models, a subset of the plurality of data structures can correspond to the subset of the entries. Each data structure of the one or more data structures can correspond to one or more actions of the plurality of actions identified by comparing a score to a threshold for actions indicative of the performance of a test taker at the client device.

The one or more processors can be configured to generate, based at least on the one or more actions and the one or more ML models, an annotation that can include a text on performance of a test taker at the client device with respect to the actions taken at the client device during creation of the computer code for the client solution. The text can include a description of actions of the test taker implemented across the plurality of entries.

The one or more processors can be configured to generate, from the timeline of events, a visual representation indicative of the actions taken at the client device according to timestamps of the actions. The one or more processors can be configured to display the visual representation of the actions according to the timestamps. The one or more processors can be configured to provide, based at least on the timeline of events and the actions, a metric indicative of performance of a test taker at the client device during creation of the computer code.

At least an aspect of the technical solutions is directed to a method. The method can include identifying, by one or more processors coupled with memory, a plurality of entries of a computer code for a client solution of a test problem created by a client candidate during a testing period. Each of the plurality of entries can correspond to a portion of the computer code associated with a timestamp of a plurality of timestamps within the testing period. The method can include selecting, by the one or more processors, from the plurality of entries, a subset of the entries. Each entry of the subset selected can be based at least on a difference between a first timestamp of the entry and a second timestamp of a preceding entry of the subset that satisfies one or more time selection criteria or a difference between a first portion of the computer code of the entry and a second portion of the computer code of a preceding entry of the subset that satisfies a code selection criteria. The method can include generating, by the one or more processors, using one or more prompts and the subset of the entries input into one or more machine learning (ML) models, a timeline of events indicative of actions taken by the client candidate during creation of the computer code for the client solution. The method can include providing, by the one or more processors, the timeline of events and the actions for display.

The method can include generating, by the one or more processors, based at least on the timeline of events and the actions, an indication of performance of the client candidate during the creation of the computer code for the client solution. The method can include providing, by the one or more processors, the indication for display. The method can include retrieving, by the one or more processors, from a database in a storage device, a string of characters comprising the plurality of entries indicative of the actions include at least one of: a keystroke of a keyboard operated by the client, a copy action performed by the client, a paste action performed by the client, a menu selection by the client, a user interface window selection, or testing of the client solution using one or more test cases. The method can include identifying, by the one or more processors, the plurality of entries from the string of characters.

The method can include identifying, by the one or more processors, the plurality of entries that include a plurality of snapshots of the computer code created by the client during the testing period. The method can include generating, by the one or more processors, the timeline of events using the plurality of snapshots input into the one or more ML models. The method can include identifying, by the one or more processors, from the plurality of entries, a first entry that can have a string of characters of the first portion of the computer code. The method can include determining, by the one or more processors, a stage of the client solution using the string of characters of the first entry.

The method can include identifying, by the one or more processors, from a storage device for the plurality of entries, a plurality of data structures. Each of the plurality of data structures can have a timestamp attribute that can include a respective timestamp of the plurality of timestamps and a code attribute indicative of a respective state of the computer code for the respective timestamp. The method can include generating, by the one or more processors, using the plurality of data structures can correspond to the performance data, a list of submissions for the client solution. The method can include generating, by the one or more processors, the plurality of entries using the list of actions and the list of submissions.

The method can include comparing, by the one or more processors, the difference between the first timestamp and the second timestamp with the time selection criteria. The method can include comparing, by the one or more proces-sors, the difference between the first portion and the second portion with the code selection criteria.

At least an aspect of the technical solutions is directed to a non-transitory computer-readable media that can have processor readable instructions. The instructions can cause at least one processor to identify a plurality of entries of a computer code for a client solution of a test problem created by a client during a testing period. Each of the plurality of entries can correspond to a portion of the computer code associated with a timestamp of a plurality of timestamps within the testing period. The instructions can cause at least one processor to select, from the plurality of entries, a subset of the entries. Each entry of the subset selected can be based at least on: (i) a difference between a first timestamp of the entry and a second timestamp of a preceding entry of the subset that satisfies one or more time selection criteria or (ii) a difference between a first portion of the computer code of the entry and a second portion of the computer code of a preceding entry of the subset that satisfies a code selection criteria. The instructions can cause at least one processor to generate, using one or more prompts and the subset of the entries input into one or more machine learning (ML) models, a timeline of events indicative of actions taken by the client during creation of the computer code for the client solution. The instructions can cause at least one processor to generate, using the one or more ML models, a second timeline of highlighted events. The second timeline can include a subset of events of the timeline of events associated with one or more timestamps of the plurality of timestamps that correspond to a subset of the actions indicative of one or more skills of a user that operated the client device during the testing period.

At least an aspect of the technical solutions is directed to a system. The system can include one or more processors coupled with memory. The one or more processors can be configured to identify a plurality of code portions of a computer code for a client solution of a test problem. Each code portion can correspond to a respective timestamp of a plurality of timestamps. The one or more processors can be configured to generate, using one or more machine learning (ML) models, a timeline using the plurality of code portions and can correspond timestamps of the plurality of timestamps. The timeline can identify a plurality of actions performed in creating the client solution. The one or more processors can be configured to generate, using the one or more ML models, the timeline, the plurality of code portions and corresponding timestamps, for each evaluation parameter of a plurality of evaluation parameters, a textual output describing performance along the evaluation parameter and a description of one or more actions of the sequence of actions associated with the evaluation parameter. The one or more processors can be configured to provide, for display, a report can include the textual output for each of the plurality of evaluation parameters and based on the one or more actions of the sequence.

The one or more processors can be configured to generate, using the one or more ML models and the textual output, one or more scores that can correspond to one or more evaluation parameters of the plurality of evaluation parameters. The one or more processors can be configured to store, in one or more data structures, an association between an identifier of the client solution, the textual output, and the one or more scores. The one or more processors can be configured to generate, using the one or more ML models, a list of one or more objects that can correspond to one or more code portions, each object of the one or more objects can include a timestamp of the plurality of timestamps that can correspond to an action of the plurality of actions.

The evaluation parameter can correspond to at least one of: a problem-solving approach, an ability to develop an algorithm, a proficiency in a programming language of the computer code, a demonstration of secure software coding practice, or an ability to debug the computer code. The one or more processors can be configured to generate, using the one or more ML models, a plurality of scores can correspond to the plurality of evaluation parameters. The one or more processors can be configured to generate, using the one or more ML models and the plurality of scores, a performance metric for the plurality of evaluation parameters of the client solution.

The one or more processors can be configured to identify a plurality of lists of events that can correspond to a plurality of stages of the test problem. The plurality of stages can include a stage that can correspond to the plurality of actions, The one or more processors can be configured to combine the plurality of lists of events into a list of events, the list of events can include one or more markers indicative of one or more transitions between the plurality of stages. The one or more processors can be configured to generate the plurality of entries using the list of events. The one or more processors can be configured to select, using the one or more ML models, from the plurality of actions, an action that can correspond to one or more code portions of the plurality of code portions in support of a score that can correspond to an evaluation parameter of the one or more evaluation parameters. The one or more processors can be configured to store, in one or more data structures, an association between the client solution, the score and at least one of the action or the one or more code portions.

The one or more processors can be configured to provide, for display via a user interface, a summary section of the report. The summary section can include a description of a respective performance along each evaluation parameter of the plurality of evaluation parameters according to one or more scores that can correspond to one or more evaluation parameters of the plurality of evaluation parameters. The one or more processors can be configured to provide, for display via a graphical user interface, a plurality of sections of the report. Each section of the plurality of sections can correspond to an evaluation parameter of the plurality of evaluation parameters. The one or more processors can be configured to receive, via the user interface, a selection of a section of the plurality of sections. The one or more processors can be configured to display, via the user interface, the section that includes the textual output that can correspond to the respective evaluation parameter.

The one or more processors can be configured to receive, via a user interface, one or more selections that can correspond to a plurality of sections of the report. The plurality of sections can correspond to the plurality of evaluation parameters. The one or more processors can be configured to identify, based on the one or more selections, the plurality of evaluation parameters to use for the test problem and one or more weights for the plurality of evaluation parameters. The one or more processors can be configured to generate, based at least on the one or more selections, the textual output for the plurality of evaluation parameters according to the one or more weights selected via the user interface.

The one or more processors can be configured to receive the identifier of the client solution and a request to generate the report. The one or more processors can be configured to generate, using the one or more data structures and the one or more ML models, the report for the one or more evaluation parameters. The one or more processors can be configured to generate the report that can include the timeline. The one or more processors can be configured to receive, via a user interface, a selection of an action of the plurality of actions in the timeline. The one or more processors can be configured to provide, for display via the user interface, responsive to the selection, one or more code portions of the plurality of code portions that can correspond to the action.

At least one of a plurality of evaluation parameters can be input in a text format via a graphical user interface. The one or more processors can be configured to identify, from a plurality of clients, a client according to the textual output and one or more evaluation parameters.

At least an aspect of the technical solutions is directed to a method. The method can include identifying, by one or more processors coupled with memory, a plurality of code portions of a computer code for a client solution of a test problem. Each code portion can correspond to a respective timestamp of a plurality of timestamps. The method can include generating, by the one or more processors, using one or more machine learning (ML) models, a timeline using the plurality of code portions and corresponding timestamps of the plurality of timestamps, the timeline identifying a plurality of actions performed in creating the client solution. The method can include generating, by the one or more processors, using the one or more ML models, the timeline, the plurality of code portions and corresponding timestamps, for each evaluation parameter of a plurality of evaluation parameters, a textual output describing performance along with the evaluation parameter and a description of one or more actions of the sequence of actions associated with the evaluation parameter. The method can include providing, by the one or more processors, for display, a report based on the one or more actions of the sequence, the report can include the textual output for each of the plurality of evaluation parameters.

The method can include generating, by the one or more processors, using the one or more ML models and the textual output, one or more scores that can correspond to one or more evaluation parameters of the plurality of evaluation parameters. The method can include storing, by the one or more processors, in one or more data structures, an association between an identifier of the client solution, the textual output, and the one or more scores. The method can include generating, by the one or more processors, using the one or more ML models, a list of one or more objects can correspond to one or more code portions. Each object of the one or more objects can include a timestamp of the plurality of timestamps that can correspond to an action of the plurality of actions.

The evaluation parameter can correspond to at least one of: a problem-solving approach, an ability to develop an algorithm, a proficiency in a programming language of the computer code, or an ability to debug the computer code. The method can include generating, by the one or more processors, using the one or more ML models, a plurality of scores that can correspond to the plurality of evaluation parameters. The method can include generating, by the one or more processors, using the one or more ML models and the plurality of scores, a performance metric for the plurality of evaluation parameters of the client solution. The method can include identifying, by the one or more processors, a plurality of lists of events that can correspond to a plurality of stages of the test problem. The plurality of stages can include a stage corresponding to the plurality of actions. The method can include combining, by the one or more processors, the plurality of lists of events into a list of events. The list of events can include one or more markers indicative of one or more transitions between the plurality of stages.

The method can include generating, by the one or more processors using the list of events, the plurality of entries. The method can include selecting, by the one or more processors, using the one or more ML models, from the plurality of actions, an action that can correspond to one or more code portions of the plurality of code portions in support of a score that can correspond to an evaluation parameter of the one or more evaluation parameters. The method can include storing, by the one or more processors, in one or more data structures, an association between the client solution, the score and at least one of the action or the one or more code portions. The method can include providing, by the one or more processors, for display via a user interface, a summary section of the report.

The summary section can include a description of a respective performance along each evaluation parameter of the plurality of evaluation parameters according to one or more scores that can correspond to one or more evaluation parameters of the plurality of evaluation parameters. The method can include providing, by the one or more processors, for display via a graphical user interface, a plurality of sections of the report. Each section of the plurality of sections can correspond to an evaluation parameter of the plurality of evaluation parameters. The method can include receiving, by the one or more processors, via the user interface, a selection of a section of the plurality of sections. The method can include displaying, by the one or more processors, via the user interface, the section that can include the textual output that can correspond to the respective evaluation parameter.

The method can include receiving, by the one or more processors, via a user interface, one or more selections that can correspond to a plurality of sections of the report. The plurality of sections can correspond to the plurality of evaluation parameters. The method can include identifying, by the one or more processors, based on the one or more selections, the plurality of evaluation parameters to use for the test problem and one or more weights for the plurality of evaluation parameters. The method can include generating, by the one or more processors, based at least on the one or more selections, the textual output for the plurality of evaluation parameters according to the one or more weights selected via the user interface.

The method can include receiving, by the one or more processors, the identifier of the client solution and a request to generate the report. The method can include generating, by the one or more processors, using the one or more data structures and the one or more ML models, the report for the one or more evaluation parameters. The method can include generating, by the one or more processors, the report comprising the timeline. The method can include receiving, by the one or more processors, via a user interface, a selection of an action of the plurality of actions in the timeline. The method can include providing, by the one or more processors, for display via the user interface, responsive to the selection, one or more code portions of the plurality of code portions that can correspond to the action.

At least an aspect of the technical solutions is directed to a non-transitory computer-readable media that can have processor readable instructions. The instructions can cause at least one processor to identify a plurality of code portions of a computer code for a client solution of a test problem. Each code portion can correspond to a respective timestamp of a plurality of timestamps. The instructions can cause at least one processor to generate, using one or more machine learning (ML) models, a timeline using the plurality of code portions and corresponding timestamps of the plurality of timestamps. The timeline can identify a plurality of actions performed in creating the client solution. The instructions can cause at least one processor to generate, using the one or more ML models, the timeline, the plurality of code portions and corresponding timestamps, for each evaluation parameter of a plurality of evaluation parameters, a textual output describing performance along the evaluation parameter and a description of one or more actions of the sequence of actions associated with the evaluation parameter. The instructions can cause at least one processor to generate, using the one or more ML models and the textual output, one or more scores that can correspond to one or more evaluation parameters of the plurality of evaluation parameters. The instructions can cause at least one processor to store, in one or more data structures, an association between the client solution, the textual output, and the one or more scores. The instructions can cause at least one processor to provide, for display, a report that can include the one or more scores and the textual output for each of the plurality of evaluation parameters and based on the one or more actions of the sequence.

BRIEF DESCRIPTION OF THE DRAWINGS

FIG. 7 is an example of a graphical user interface at an administrator interface function using prompts to provide providing a full description of a test problem.

FIGS. 8-12 are examples of graphical user interfaces at the administrator interface function for generating test problems and candidate solutions.

FIG. 13 is an example of a results data structure for storing client candidate actions and performance results.

FIG. 17 is an example of a submission table including test result data for various test case runs during the testing process.

FIG. 18 is an example of a data table that can be provided to the employer staff user following the completion of the test.

Figure 23:
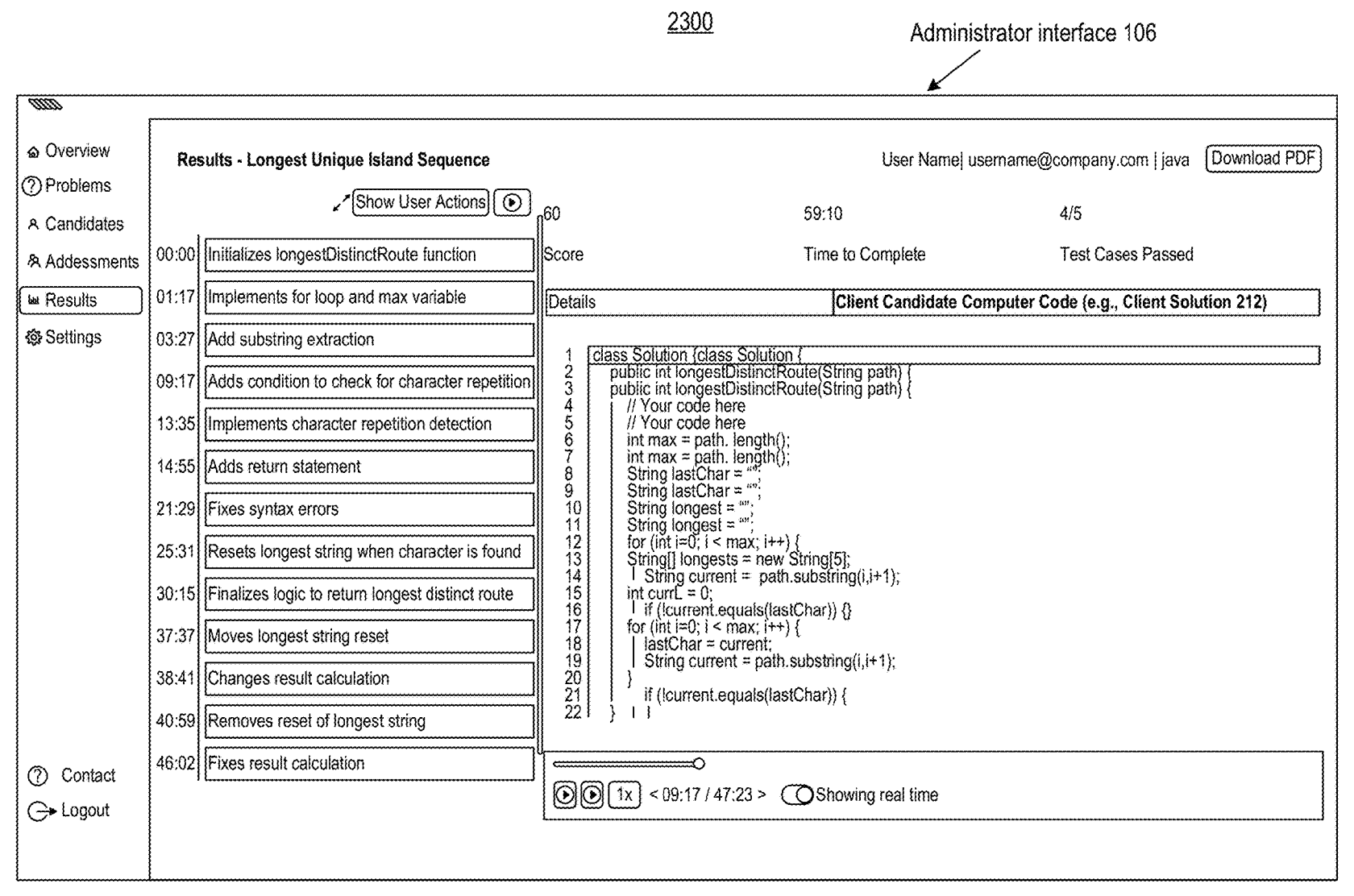

FIGS. 22-26 are examples of graphical user interfaces of administrator interface function providing descriptions of client performance, including client actions, analyses, and client solutions.

FIGS. 28-29 are examples of graphical user interfaces of administrator interface function providing demonstrative features related to the client performance.

FIGS. 30-31 illustrate examples of user information for client candidates taking the test and test information for the test assigned to the client.

FIG. 32 illustrates an example of a graphical user interface showing a table of information on the working solution that can be presented to the administration.

DETAILED DESCRIPTION

Figure 1:
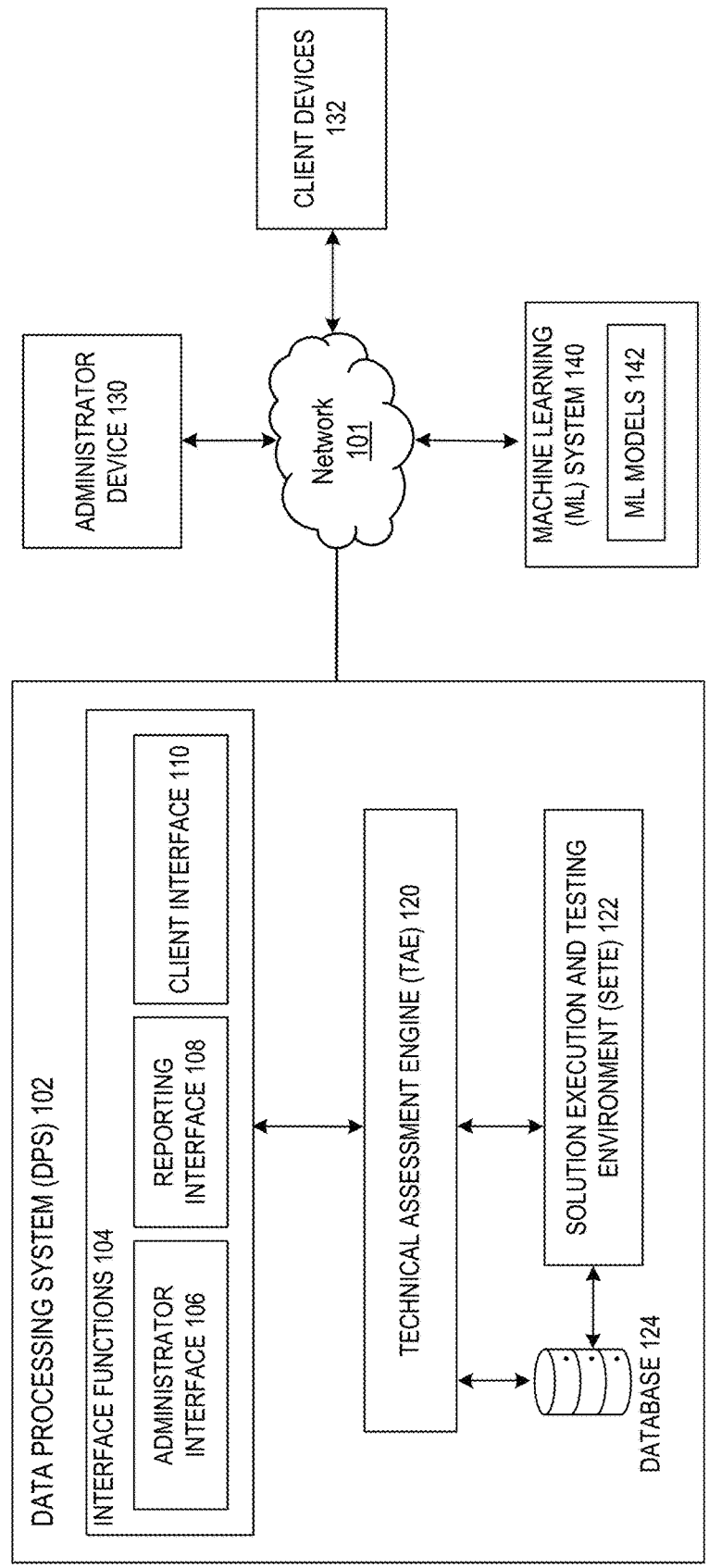
FIG. 1 is an example block diagram of a system for automated ML-based generation, testing and evaluation of computer code based on test problem descriptions.

For purposes of reading the description of the various embodiments below, the following descriptions of the sections of the specification and their respective contents may be helpful:

Section A describes an overview of a computing environment of a data processing system for automated test problem and solution generation and validation and client candidate performance evaluation.

Section B describes systems and methods for automated computer code generation, such as automated testing and evaluation of test problems and corresponding computer code solutions.

Section C describes systems and methods for automated multi-stage computer code generation, such as testing and evaluation of dynamically generated multi-stage test problems and their corresponding solutions.

Section D describes systems and methods for automated computer code timeline generation, such as assessment of client candidate computer code test problem solutions using timeline entries.

Section E describes systems and methods for generating automated computer code processing performance, such as analyses and candidate performance reports based on timeline entries.

Section F describes systems and methods for automated delivery of assistance to a candidate.

Using software applications to generate test problems for test taker skill evaluation can be challenging for various reasons. For instance, while computer applications can be used to conduct testing by serving pre-generated test problems and solutions to test takers, it is hard to automate test problem-solution pair generation in a reliable way. While machine learning (ML) models can be utilized to generate different test problems and their solutions, such models can be insufficiently accurate to reliably verify the accuracy of the generated solutions due to ML model false positive determinations which can lead to hallucinations and drifting, resulting in inaccurate and unreliable solutions for the generated problems. The technical solutions overcome these challenges by utilizing validity conditions to the automatically validate candidate solutions to improve the accuracy of the generated test solutions, thereby minimizing hallucinations and improving the reliability of the outcome.

In addition, limited in their ability to automatically generate and validate test problem-solution pairs, common computer-based testing solutions are incapable of adjusting the test problems during the course of the testing. For example, when in a first part of an ongoing test a test taker exhibits a sufficient level of knowledge or skill warranting a shift towards a detailed testing of other skills, it can be desirable and beneficial for the test solution to adjust the scope of the test problem, during an ongoing test, based on the test taker's performance. However, adjusting the scope of the testing during the course of the test can be challenging, particularly with respect to the more sophisticated and technical test problems and their corresponding solutions. The technical solutions of this disclosure can overcome these challenges by selecting next stage test problems based on the validation of the test taker's solution using validity conditions.

Moreover, some computer-based testing applications can be limited in evaluating test takers based on the end results of the test taker's solution, rather than analysis of how the test taker arrived at the solution. In doing so, the existing applications are precluded from drawing inferences based on the test taker's use of time during the course of the testing, failing to capitalize on the cues that can be drawn from temporal progress during the course of the testing. The technical solutions can address such issues by providing a timeline of the test taker's progress based on time selection or code selection criteria. Utilizing such timelines, the technical solutions can also identify actions implemented by the test taker in the course of generating the solution, allowing the solutions to generate more nuanced reports with textual outputs of the test taker's performance.

Even testing applications that can leverage generative AI solutions, or in particular, large language models, face a variety of challenges when attempting to generate test problems and test cases with solutions to use to verify candidate solutions to the test problems. When generating test problems, LLMs may generate problem statements that are not entirely clear or precise. This happens because LLMs rely on patterns in the data they were trained on, which might not always align perfectly with the desired clarity and specificity for a given context. Similarly, when generating test cases for the test problems, LLMs may generate an output that does not match the inputs of the test cases or may generate test cases that do are inconsistent with the problem statements. LLMs might produce test cases that appear correct but fail under certain conditions. LLMs might also generate solutions for test problems but those solutions may also appear correct but either don't work when executed by a computer or generate incorrect outputs that are not aligned with the test problem. This is because of the inherent limitations in LLMs and their inability to necessarily validate the content they generate. Because these LLMs or pretrained transformer models in general are designed to predict the next word or token in a sequence based on probabilities that are biased by the training data, these LLMs are inherently designed to provide outputs that may not be accurate.

The described below are generally directed to examples of systems and methods of state-based data processing for automated computer code testing and analysis. The figures provided can relate to example systems and methods for implementing automated testing and evaluation of computer code that is generated based on test problem descriptions and code parameters. The figures can also relate to systems and methods for automated generation and validation of multi-stage computer code test problems, which can be selected from a range of test problem stage options or generated dynamically based on prior computer code performance. The figures can relate to systems and method for assessment of performance of computer code based on machine learning determined timeline of events from the testing. The figures can relate to systems and methods for generating reports with candidate solution performance metrics based on the machine learning based analyses of various skills or evaluation parameters exhibited in the client computer code.

The technical solutions described herein can be utilized or applied in a variety of ways. While examples discussed herein relate to assessment and evaluation of computer code skills of a software engineering position candidate, it is understood that the technical solutions can be applied to other fields or applications in which generation, testing and evaluation of computer code can be desired. For example, technical solutions can be applied or used in applications in which automated ML-based generation of computer code is implemented using textual description of test problems to resolve. For instance, technical solutions can involve generation of candidate computer code solutions responsive to prompts to ML models describing technical problems or challenges to resolve, along with the related code constraints and parameters. For example, the technical solutions can be applied or used in automated ML-based testing, evaluation and validation of computer code that can be applied to different applications or products in industrial and professional settings, including computer code quality assurance applications and evaluation of software projects. The technical solutions can be utilized in applications for assessment of computer code designer skills in educational or professional environments, such as enterprises testing and evaluating software engineering candidate skill levels. The technical solutions can be utilized in applications for evaluating computer coding skills for professional development of engineers, or automated grading in computer coding bootcamps or courses. The technical solutions can be utilized in remote technical interview applications, applications for evaluating performance of participants in coding competitions, or for automated code review of open-source or other computer code. Technical solutions can be utilized in applications for benchmarking coding skills across teams or departments or for improving technical assessments in recruitment processes, including support in employee performance reviews. Technical solutions can be used in quality control of coding challenges in gamified learning platforms, offering multi-stage problem-solution platforms to cover various types and levels of software development skills.

A. Overview of the Computing Environment of a Data Processing System

The system of the technical solutions can include a computing environment having any combination of hardware and software for automated generation and validation of test problems and the corresponding solutions and providing timeline-based analyses and assessment of client candidate skills and performance. The system can include ML or AI architectures to automatically generate field-specific test problems using natural language descriptions. The system can generate test cases for testing the candidate solutions and detailed instructions for client candidates taking the tests. The system can generate multi-stage test problems, allowing dynamic change in complexity based on the candidate's performance, providing a more nuanced understanding of the candidate's skill levels. The system can provide timestamped timelines of the actions the client candidate takes during a test, allowing for detailed analysis of the test taker's skills and abilities. The system can provide objective numeric scores and both objective and subjective text-based analyses along with highlight examples providing support for the given analyses and assessments. The system can provide in-session assistance to candidates by detecting when candidates can use help and providing helpful hints to aid the test takers during the test. The system can be combined into a comprehensive candidate field-specific skillset testing platform to allow for nuanced, user-specific, and configurable evaluation of candidate skills and abilities in any field, such as software or any other engineering, scientific, legal, medical, business or any other fields.

FIG. 1 illustrates an example block diagram of a network environment 100 for automated ML-based generation, testing and evaluation of computer code based on test problem descriptions. Network environment 100 can include a data processing system 102 that can communicate with one or more administrator or admin devices 130, client devices 132 and machine learning (ML) systems 140 via a network 101. Data processing system 102 can be deployed on one or more servers or a cloud computing platform and include or provide various interface functions 104, such as administrator or admin interface 106, reporting interface 108 and client interface 110. The data processing system 102 can include or provide one or more technical assessment engines (TAEs) 120 for assessing computer code (e.g., client) performance and one or more solution execution and testing environments (SETEs) 122 for providing various computer code testing and evaluation functions and operations. Admin devices 130 can be utilized by enterprise administrators to generate test problems for the data processing system 102 to generate and evaluate candidate solutions to provide to clients (e.g., test takers). Client devices 132 can be utilized for providing test problems and prompting computer code designs to provide computer code designs or solutions to evaluate or test, such as using application programming interfaces (APIs) to and from ML system 140.

The data processing system 102 can be provided or embodied in a cloud software service that can run on a cloud service platform. The data processing system 102 can include interface functions 104 facilitating communications with admin devices 130 and client devices 132. The data processing system 102 can utilize an interface to an external AI or ML system 140, using application programming interface (API) calls to ML models 142.

Administrator devices 130 can be computer devices via which employer staff (e.g., administrators or admins generating and providing the tests) can communicate with the data processing system 102. Similarly, client devices 132 can be computer devices via which clients or client candidates (e.g., test takers) can communicate with the data processing system 102 to take tests on the tested subject matter to test their abilities and skills. The data processing system 102 can include SETE 122 and TAE 120 functions to facilitate testing, valuation and scoring according to generated test problems. It should be appreciated that the admin devices 130 and the client devices 132 can communicate with the data processing system 102 for other use cases including but not limited to evaluating candidates for software engineering roles at companies.

For instance, staff of an enterprise (e.g., a corporation, an educational institution, or an organization) can use an application (e.g., a web browser) on an administrator device 130 to log into the data processing system 102, which can be deployed via a cloud software service. The application can include an application with a user interface configured for supporting code execution and iterative computer code development, debugging, and data analysis, such as Jupyter Notebook. The employer staff (e.g., admin) can be authenticated and access the administrative interface 106 of the system. An administrator interface 106 can include one or more objects, for example, an object representing a client candidate, an object representing a test problem (e.g., also referred to as the problem), and an object representing an interview in which the client skills are to be tested. An interview can include the assignment of one or more problems to a client candidate (e.g., on a client device 132) to test the client candidate's software design skills or abilities. For instance, there may be any number (e.g., zero to n) of client candidates, any number (e.g., one to m) test problems, and any number (e.g., zero to k) of interviews. A given client candidate can be assigned multiple interviews, each with different problems. The interface 104 can support managing client candidates (e.g., by adding and deleting them), managing problems (e.g., by creating and deleting them), and managing interviews (e.g., by adding and deleting them) where each interview is the assignment of a test problem to a client candidate.

The employer staff (e.g., admin at an administrator device 130) can use the administrator interface 106 to create one or more test problems to be assigned to client candidates (e.g., on one or more client devices 132). Interfaces 104, including admin interface 106, reporting interface 108 or client interface 110, can include any graphical user interface, including menus and prompts for user selections and outputs, which can be provided via an application, such as a page displayed in a web browser accessed via client devices 132 or admin devices 130. In an example, a same problem can be assigned to multiple client candidates in the same role although one could make other choices. The test problem may either be selected from an existing library or may be created dynamically by the data processing system 102. In an example, the staff member can choose to create new test problems because the test problems that are personalized to the employer, are more difficult for a client candidate to cheat (due to their newness and uniqueness) and may more accurately model the intended work for successful candidates if hired.

To create a test problem, the employer staff (e.g., admin at an administrator device 130) can start the process of test creation by providing a short description of the intended problem space. This can include a name of the employer, a descriptive text for the nature of the open position, and one or more detailed descriptions of what type of problem may be desired. The admin can select a computer science problem domain from amongst a provided list or request that the data processing system 102 make that decision automatically. The admin can click or otherwise select a create test problem button on an administrator interface 106 to invoke the system's problem creation facility or a function, such as one or more test problem generator, test case generator or candidate solution generator functions discussed in connection with FIG. 2. Selections, data, and call functions can be transmitted via the network 101, which can include any combination of wired and wireless networks, including any combination of wireless local area networks (WLANs), Bluetooth connections, cellular networks, intranet connections or the Internet.

The data processing system 102 can utilize a test problem creation facility (e.g., SETE 122) to leverage the external AI system (e.g., ML system 140) to create one or more test problems. It can build one or more high level concepts for the test problem, and these can be presented to the user via administrative interface 106. The user (e.g., admin using an admin device 130) may select one of the offered concepts for further action or may choose to create new concepts for review (if none of those offered are desired). For instance, the user may alter the inputs (e.g., description of intended test problem space, or a computer science problem domain) and instruct the data processing system 102 to create new test problem concepts by clicking the corresponding button (e.g., a button for triggering the test problem generator).

Once the employer staff chooses a presented problem concept for further action, the data processing system 102 can begin to build the full test problem. In some implementations, no human action may be involved throughout this process, providing an automated solution and improvement over systems generating and validating test problems using human actions. At this stage, the data processing system 102 can create a solution set, which can include a data structure with the detailed description of the test problem, a boilerplate portion of the computer code solution and a generated candidate solution for the test problem along with any test cases for testing the candidate solution. The solution set can include a detailed description of the test problem, which can be suitable to present to a candidate in an interview as a prompt from which the candidate begins the test. The detailed description can describe the test problem which the client candidate may resolve using the computer code the candidate client is to generate during the test. The solution set can include a boilerplate, which can include a boilerplate problem shell with a portion of the computer code (e.g., variable and function name definitions) which the client candidate (e.g., being tested with the test problem) can utilize to build the client software solution. The solution set can include one or more test cases (e.g., input and output pairs) that may be used on the candidate solution the data processing system 102 is to generate to validate proposed data processing system 102 generated candidate solutions to the test problem or to validate client generated solutions. The solution set can include a candidate solution (e.g., generated by the data processing system 102), which can also be referred to as a reference solution.

For some programming languages, a test code harness may be created. For example, an initial solution set can be delivered in the Python programming language, although any suitable language could be used. This process can include numerous interactions between the data processing system 102 and the external AI framework, such as an ML system 140. As part of this process, the data processing system 102 can iteratively execute the proposed solutions with the test cases to determine if the solution is correct. If the solution is determined to not be correct, additional interactions with the ML or AI system 140 can be used to update and adjust the solution until a fully functional solution is identified and tested. The final and fully functional test problem can be displayed to the employer staff, who may choose to save it to the problem library (e.g., as a data structure). The employer staff can generate additional solution sets for additional programming languages, in which the data processing system 102 can offer language choices to candidates at interview time. The data processing system 102 can support any field specific software or tool, including for example, and without limitation: Python, Java, C++, Swift, Typescript, JavaScript, Go, and Kotlin. The data processing system 102 can create a solution set for each programming language or software tool permitted by employer staff.

The employer staff, using the admin interface 106, can create one or more client candidate accounts for which the test problems will be administered in interviews. For instance, some information can be used to create the client candidate accounts. For example, the interaction between the data processing system 102 and the users (e.g., clients) can be conducted via email. The employer staff can create a candidate account (e.g., candidate profile) in the data processing system 102 by selecting a button for adding a new client candidate in an administrator interface 106. The prompts in the user interface of the administrator interface 106 can include or provide the client candidate's name and email address, allowing the admin (or the client candidate creating the profile) to save this information. Depending on the implementation, other information about the candidate can be included. Such information can be useful in operating the interview and other operations.

Figure 2:
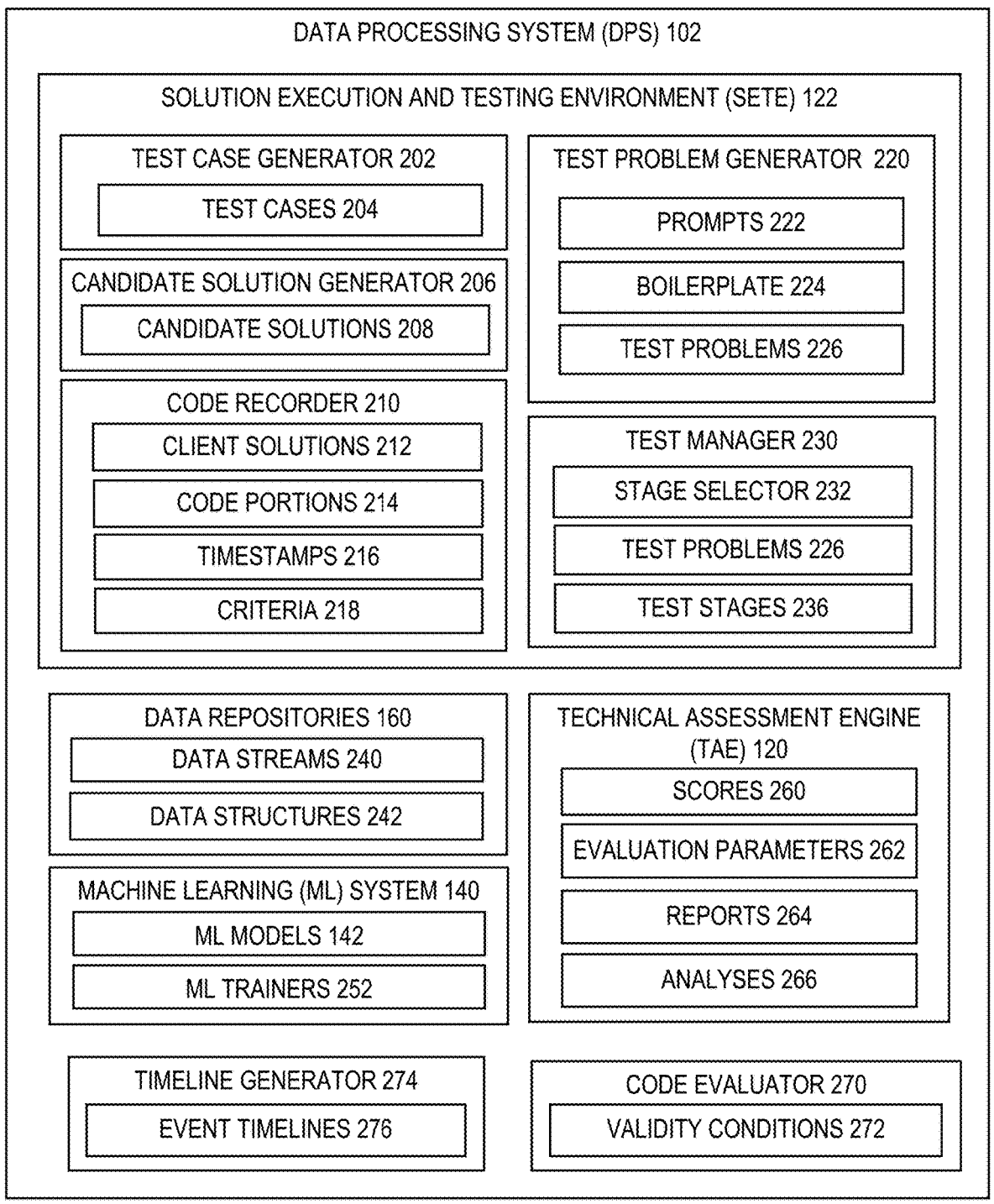
FIG. 2 is an example of a data processing system of the computing environment that can be used for implementing the technical solutions.

Having created at least one test problem 226 (e.g., as shown in FIG. 2) and at least one client candidate profile or account in the data processing system 102, the employer staff can schedule or create an interview through an appropriate interface in the data processing system 102. The interview can include the assignment of one or more test problems to a client candidate. When the interview is created, the data processing system 102 can use the candidate's name and email address to send an inviting email to the candidate. The email can include a link to the client interface 110 in the cloud service. Interviews can also be scheduled to be sent to the client candidate at a later time.

A client candidate can be alerted that they may participate in an interview when they receive an email that the data processing system 102 sends with a link to participate in the interview. Such email can be sent in response to employer staff creating an interview in the data processing system 102, which links one or more test problems to the client candidate for action. The link included in the email can be of the form suitable for the user to navigate to the web page referenced using a browser of their choice. A browser can be launched from a device (e.g., 130 or 132), such as a personal computer, or a mobile device. When the client candidate accesses the data processing system 102 through such link (e.g., via a client device 132), the client candidate can be authenticated through the client interface 110 authentication or authorization functionalities (e.g., in a user interface). In an embodiment, the authentication can include a process to perform other identity validation on the client candidate such as verifying a government-issued ID, photographs, and biometric identification.

After identification and authentication, the user can be presented with the option to begin the interview when ready. A client interface 110 can provide an application (e.g., a web page for a web browser or any other application) that can present an instruction page. The instruction page can provide general instructions and guidance to the client candidate. The problem details may or may not be shared until the timed interview is started by the client candidate. The client candidate can be given or can choose a programming language that they wish to use from a list established by the admin. The test problem can include or use one or more languages designated when the problem was created. When the client candidate elects to begin the interview, the one or more languages can be presented with details of the problem as created by the employer staff using the data processing system 102. The presented details can include the detailed description of the test problem 226, one or more test cases 204 which can be used to evaluate the solution (e.g., 208 or 212), and a boilerplate 224. The boilerplate 224 can include a portion of the computer code (e.g., one or more defined parameters or function names), which the client candidate can use as a starting point for client solution to be generated by the client candidate during the test. The system can provide a test code harness and candidate solution that was generated and tested by the system to be used to compare the client candidate solution and which may not be made visible or available to the client candidate.

As the client candidate progresses to solve the test problem using the boilerplate 224 portion of the computer code, the data processing system 102 can monitor and record user actions using code recorder 210. The code recorder 210 can store or save client candidate entries, including for instance a sufficient information to recreate one or more timelines of the interview. The recorded data can include the actions taken by the client candidate, which can be timestamped with timestamps 216 and reflected in code portions 214. The recording can include the state of the computer code including any selections and characters typed into the code editor. The data processing system 102 can closely monitor user activity and may offer hint (if necessary) as the user progresses to facilitate overcoming technical hurdles that prove too difficult for the user. The recorded data can include recording of annotations designed to detect client candidate cheating, such as when the user switches tabs in the browser, switches to other applications on their device, uses copy and paste feature of the browser where the pasted text originates from outside the boilerplate, and any other relevant or significant events or actions, each of which can be timestamped for further time-based analysis of actions that can be suggestive of cheating.

When the client candidate wishes, the client candidates can invoke the evaluation facility of the data processing system 102 using the corresponding button. This can cause a code evaluator to evaluate the current state of the client code (e.g., the solution) to be executed. This can include steps such as compilation and linking and can evaluate the solution in a sandbox environment using the test cases built for the problem and record the results. Such tests also become part of the interview timeline. The client candidate can iteratively conduct evaluations of the client candidate's solution with the test cases and further enhance or correct the solution until either the client is satisfied that it is complete, or the time allotted for the test expires. At such endpoint, the interview can be complete, the client solution computer code can be recorded, and the client candidate can exit the system.

When the client candidate's solution is submitted for evaluation, either as a result of their election to do that, due to expiration of the maximum time allotted for the interview, or manually re-run by the administrator, the data processing system 102 can perform fully automated analysis of the overall interview. This process may be completed with no human intervention. The inputs to the evaluation can include the solution set that was created for the problem by the data processing system 102 at problem creation time (e.g., test cases generated for the candidate solution at the test problem generation stage). The inputs can include the client candidate's proposed solution (e.g., client's computer code written during the test and for the test problem) which can be delivered with the boilerplate after the interview, along with all recorded events or actions from the interview.

A series of interactions with the ML system 140 (e.g., the AI system) can be used to perform the evaluation of the client solution (e.g., the computer code of the client). As the evaluation is conducted by the data processing system 102, the data processing system 102 can produce an evaluation report that can include natural language description of the analysis of the interview. The analysis can include an overall summary as well as specific analysis of certain dimensions or evaluation parameters of the interview, such as the client's coding abilities, troubleshooting abilities, code security practices or any other particular skills that can be analyzed. The analysis can include conclusion about various aspects or skills of the client candidate, similar to what an expert software engineer that had witnessed and analyzed the interview might produce. In an embodiment, analysis can include insights into software algorithms, language proficiency, debugging skills, secure coding practices, and other aspects of the interview as the default selection. Users can also request to evaluate different areas instead of these default options.

Beyond the text-based summaries, actions from the interview can be analyzed by ML system 140 (e.g., AI models) to create a timeline of events. Within the timeline of events, some of the events can be selected to highlight to the user in the highlight playback view. For instance, events suggestive of struggling with respect to a concept or an issue, events suggestive of cheating, events suggestive of overcoming a particular challenge or an issue within a certain period of time, events indicative of client's exceptional skills with respect to a particular aspect of computer code design, or any other similar information can be used. For example, an overall numeric score can be created that rates the client candidate's work in the interview. In some examples, multiple scores can be generated for multiple evaluation parameters (e.g., skills) that can be analyzed can be generated. The scores, analyses, timeline, annotations, and other related details can be stored as a data structure and become part of the interview result.

The employer staff (e.g., admin) can monitor pending interviews through the administrative interface where a status field can be displayed. Once the interview has been completed by the client candidate, a processing status can be shown while the system analyzes the interview results. When the analysis is finished, the status can reflect the completion and a button to review results can become available. The employer staff can select that facility to view the interview timeline, analysis, and scoring information that was created by the data processing system 102. The employer staff can generate a PDF format output report using the system' corresponding functions, including the ability to save the report to the computer from which the user (e.g., client or admin) can operate their respective browser applications to view the report.

While reviewing the interview results, the employer staff can select any system annotated part of the timeline to focus onto any specific detail. This can include focusing on the specific actions that were taken by the client candidate (e.g., including a replay capability). This can promote close inspection of specific parts of the interview that may be interesting, indicative, or informative with respect to client candidate's abilities.

The employer staff may also replay the entire interview from the timeline in a time-compressed format. For example, an interview that took 30 minutes might be able to be reviewed in time-compressed format of any duration such as between 30 seconds for up to 5 minutes. In time-compression, time when the user was considering next steps is compressed out and multiple small steps may be collapsed into a single event to allow fast replay.

The data processing system 102 can include functionality or support for an advanced class of problems that offer an adjustment (e.g., increase or decrease) in power and flexibility. These test problems, which can also be referred to as "dynamic problems," can be configured or built so that the nature or difficulty of the problem changes in response to the user's performance in an interview. Qualitatively, these questions can be modeled to mimic the typical procedure of live software engineering interviews. Follow up questions can be used that drop previous assumptions, widen the scope of the problem, or take other additional steps to allow the client candidate to provide further evidence of their skill proficiency. From the perspective of the client candidate, the problem can be presented in stages where subsequent stages may become more or less difficult based on performance in earlier stages. Dynamic problems can provide an improved ability to analyze a client candidate's ability, as they are suitable for a broad range of skills. Results can include analysis of where the client candidate excelled or struggled and accurate analysis for both less and more experienced client candidates.

When creating multi-stage or dynamic problem sets, an initial stage can be constructed as other individual test problem 226. When the problem for that initial test stage 236 is completed, the test problem 226 description can be fed back into the data processing system 102 as part of the input for the subsequent stage. However, the description can be augmented with instructions on how the next stage relates to the previous one. For example, the instructional description for the subsequent stage may indicate to start with the previous one but add additional extensions, increase, or decrease the level of difficulty, add additional computer science domain challenges into the new stage problem, or other alterations. Such follow-on or follow-up stages to the problem may be created as a series of related problems and through an interface provided by the data processing system 102, be linked into a mesh network where all of the stages together comprise a dynamic problem.

At execution time, the data processing system 102 can administer dynamic problems as a series of stages. At the conclusion of each stage, the results of the completed stage may be used to select an appropriate next stage. From the client candidate perspective, a series of problem stages that fit together can be presented (although the client candidate is not aware of parts of the mesh network of problems that were not selected). Dynamic problems can offer additional resistance to client candidate cheating as they are less predictable in any given interview. The analysis created by the data processing system 102 for dynamic problems may be useful in terms of illuminating or testing the client candidate skills.

FIG. 2 can illustrate an example of a data processing system 102 of the computing environment that can be used for implementing the technical solutions. The data processing system 102 can include one or more solution execution and testing environments (SETEs) 122, data repositories 160, technical assessment engines (TAEs) 120, ML systems 140, code evaluators 270 and timeline generators 274. Solution execution and testing environment (SETE) 122 can include one or more test case generators 202 for generating test cases 204. SETE 122 can include one or more candidate solution generators 206 for generating candidate solutions 208 and one or more test problem generators 220 generating, utilizing, or providing prompts 222, boilerplates 224 and test problems 226. SETE 122 can include one or more code recorders 210 recording, capturing, marking, or utilizing one or more client solutions 212, code portions 214, timestamps 216 and criteria 218. SETE 122 can include one or more test managers 230 managing, providing, or utilizing one or more stage selectors 232, test problems 226 and test stages 236. Data repository 160 can include or store one or more data streams 240 and data structures 242. ML system 140 can include, provide, or utilize one or more ML models 142 and ML trainers 252. TAE 120 can include, generate, provide, or utilize one or more scores 260, evaluation parameters 262 and reports 264 for providing analyses 266 of the computer code or the client performance. Code evaluator 270 can evaluate various candidate solutions (e.g., data processing system 102 generated computer code) or client solutions (e.g., computer code from test takers) which can be stored in data structures 242 according to validity conditions 272. Timeline generator 274 can generate event timelines 276 according to actions taken by the candidate while creating the client solutions 212, which can be utilized by TAE 120 to evaluate the performance of the client candidates and provide analyses 266.

The data processing system 102 can include any combination of hardware and software for automating the generation, testing, and evaluation of software computer code, such as software solutions to test problems generated by client candidates. The data processing system 102 can include a framework for creating candidate solutions to defined problems, executing these solutions in controlled environments, and assessing their performance. The data processing system 102 can include one or more SETEs 122, data repositories 160, TAEs 120, ML systems 140 and code evaluators 270. Each of these components can facilitate various aspects of the technical solutions and contribute to the overall functionality of data processing system 102 by generating test cases, recording code execution, managing tests, storing data, applying machine learning algorithms, and evaluating code quality.

The data processing system 102 can be deployed on various technical platforms, including one or more servers, cloud computing environments, or virtual machines. The data processing system 102, or any of its functions or components, be executed on one or more processors, which can operate based on instructions, computer code, or data stored in memory units coupled with the processors. The data processing system 102 can be deployed on platforms that can be implemented for any combination of a centralized execution on a single server or a distributed approach across multiple servers or cloud services or platforms. The data processing system 102 can include applications allowing client devices 132 to access, operate or utilize any aspects or features of the data processing system 102 via interface functions 104. For instance, data processing system 102 can include applications (e.g., user interfaces with user menus, selection buttons, input, or output functionalities) facilitating user interaction with the data processing system 102 via one or more interface functions 104. For instance, applications provided via interface functions 104 can include an application provided via admin interface 106 for generating, creating, or providing for testing data structures 242 of test problems 226. For instance, applications can include an application provided via a client interface 110 for creating, editing, compiling, or evaluating computer code generated at the client device 132 during a testing of computer code design skills of a candidate. For instance, applications can include an application provided via reporting interface 108 for providing reports 264 or analyses 266 of the client candidate skills (e.g., with respect to specific evaluation parameters 262) based on the timeline of entries with code portions 214 recorded according to timestamps 216 by a code recorder 210.

Solution execution and testing environment (SETE) 122 can include any combination of hardware and software for facilitating generation of test problems and execution and testing of computer code solutions. SETE 122 can include functionalities, such as test problem generators 220 to generate test problems 226, boilerplates 224 (e.g., with the starting portion of the computer code) utilizing prompts 222. SETE 122 can include test case generators 202 to generate test cases and candidate solution generators 206 to generate candidate solutions 208 to facilitate generation of test problems 226. SETE 122 can include test managers 230 to facilitate providing test problems 226 at one or more test stages 236 that can be selected or generated based on stage selector 232. SETE 122 can provide code recorders 210 to record client solutions 212, such as the client candidate generated computer code to address test problems 226 created by the client, for example during the course of the client candidate testing. SETE 122 can utilize code recorders 210 to record code portions 214 (e.g., snippets of the client computer code) along with the timestamps 216 and according to the criteria 218. SETE 122 can integrate various aspects of the data processing system 102 functionalities to support automated and manual computer code generation, validation, and testing. The SETE 122 can handle the orchestration of test cases and collection of the execution logs (e.g., code portions 214). SETE 122 can work together with TAE 120 to analyze and computer code quality and determine client candidate performance metrics (e.g., scores 260). SETE 122 can be executed on servers, virtual machines, and containerized environments to replicate diverse runtime conditions.

Test problem generator 220 can include any combination of hardware and software for creating diverse and challenging test problems for assessing skills of client candidates. Test problem generator 220 can generate test problems 226, which can be organized or structured as problem sets stored as data structures 242 to be used to evaluate the performance or qualities of various client solutions. Test problems 226 can include any combination of one or more descriptions of one or more test problems, boilerplates 224, candidate solutions 208 for the one or more test problems 226 and any test cases 204 to test the candidate solutions 208 or client solutions 212. Test problems 226 can include any problem for testing computer code skills of a candidate, such as a hypothetical description of a test problem, or a description of a real technical issue to resolve in a product or a service. Test problem generator 220 can use algorithms and predefined templates to produce test problems that cover a wide range of scenarios and edge cases. The generated problems can be tailored to specific domains or generalized for broader testing purposes. Test problem generator 220 can output problems in various formats compatible with the test case generator and SETE 122 (e.g., testing environment).

Test case generator 202 can include any combination of hardware and software for automatically creating test cases 204 for generated test problems. Test case generator 202 can convert abstract test problems into executable test cases that can be run within the solution execution environment. Test case generator 202 can interpret problem specifications and map them to specific input-output pairs or scenarios. The test case generator 202 can include data and parameters for execution of a computer code, such as inputs and expected outputs for the given inputs. Test case generator 202 can utilize the inputs for the candidate solutions 208 or client solutions 212 and the expected outputs to test such candidate solutions 208 or client solutions 212 for correctness or performance efficiency. The generated test cases 204 can be designed to evaluate different aspects of candidate solutions, such as correctness of the output, performance efficiency or effectiveness, energy efficiency or software security. Test case generator 202 can provide the test cases to be used by SETE 122 to identify the correct candidate solutions 208 or for evaluating the client solutions 212 (e.g., using a code evaluator 270).

Candidate solution generator 206 can include any combination of hardware and software for producing potential solutions to the test problems. Candidate solution generator 206 can generate computer code in any particular computer language, based on the boilerplate 224 and according to test problem 226 descriptions or specifications. Candidate solution generator 206 can include algorithms, heuristics, and machine learning techniques to generate candidate solutions that can be evaluated and tested, such as using test cases 204 (e.g., specific inputs and outputs to test the computer code of the candidate solution 208). Candidate solution generator 206 can generate or synthesize code, instructions, parameters and configurations, and any other artifacts of a computer code solution. The candidate solution generator 206 can use historical data, training datasets of various computer code, predefined templates, and optimization strategies to improve the quality and diversity of generated candidate solutions 208. Candidate solution generator 206 can output candidate solutions 208 in any computer language or format, based on the test problem 226 specifications. For example, by generating and testing multiple candidate solutions 208, the candidate solutions generator 206 can utilize test cases 204 and code evaluator 270 to test the performance (e.g., execution speed or efficiency) of the candidate solutions 208 to identify a candidate solution 208 that is the most effective and efficient for further development and deployment.

Test manager 230 can include any combination of hardware and software for coordinating and overseeing the testing process for a client candidate. Test manager 230 can include any functionality for scheduling, execution, and monitoring of client testing within the SETE 122 (e.g., the solution execution environment). Test manager 230 can include any applications for providing test problems 226 to client devices 132 and implementing code recording using a code recorder 210. Test manager 230 can provide various test stages 236 of any multi-stage test stage 236 using a stage selector 232. Test manager 230 can run the test problems 226 according to predefined schedules and parameters. The test manager 230 can utilize code recorder 210 to collect and aggregate test results (e.g., client solutions 212 and its code portions 214 along with timestamps 216) to provide a centralized view of testing progress and outcomes. Test manager 230 can integrate with other components such as the test case generator 202, SETE 122, and data repositories 160 to streamline the testing workflow and record the incoming data streams 240 (e.g., code portions 214 from the client devices 132). The test manager 230 can generate reports and notifications to keep stakeholders informed about the status of testing activities.

Stage selector 232 can include any combination of hardware and software for selecting a next stage of a multi-stage test problem 226. Stage selector 232 can include the functionality for utilizing a code evaluator 270 to evaluate client solution 212 for a computer code for a current test stage 236 to determine a next test stage 236. For instance, stage selector 232 can determine (e.g., based on the code evaluator 270 operation) that a client candidate achieved a high score 260 (e.g., exceeding a threshold score) on a prior test stage 236. In response to this determination, the stage selector 232 can select from a plurality of test problems 226 for the next test stage 236, a particular test problem 226 of a higher level of difficulty (e.g., difficulty level above a particular difficulty threshold) to more accurately focus on the skills level of the candidate. For instance, stage selector 232 can determine that a client candidate performed achieved a low score 260 (e.g., below a threshold score) on a prior test stage 236. In response to this determination, the stage selector 232 can select from a plurality of test problems 226 for the next test stage 236, a particular test problem 226 of a lower level of difficulty (difficulty level that is below a particular threshold).

Code recorder 210 can include any combination of hardware and software for capturing and documenting the execution of client solutions 212. Code recorder 210 can record code portions 214, including any snapshots, snippets, or sections of the computer code, such as any changes in the computer code of a client solution 212 between a current snapshot and a prior snapshot. Code recorder 210 can generate and record timestamps 216 for any code portion 214, allowing SETE 122 to follow the progress of the candidate in creating timelines 276. This component records the actions, decisions, and outputs generated during the execution of solutions within the testing environment. Code recorder 210 can provide logs and traces that can be analyzed to understand solution behavior and performance. The code recorder 210 can integrate with the SETE 122 to monitor runtime events and client interactions with the computer code. Code recorder 210 can capture input parameters, execution paths, error messages, and output results according to criteria 218. Criteria 218 can include timeline related criteria, such as time duration thresholds between each captured code portion 214 or code related criteria for a minimum number of changed characters or actions captured with respect to the computer code to capture the code portion 214. The recorded data can be stored in data repositories 160 as data structures 242.

Data repositories 160 can include any combination of hardware and software for storing and managing data used in the testing and development process. Data repositories 160 can include storage devices and services to facilitate recording of data streams (e.g., incoming code portions 214 and timestamps 216) of client solutions 212 or candidate solutions 208 and the corresponding test problems 226. Data repositories 160 can provide a centralized location for test problems 226, test cases 204, candidate solutions 208, client solutions 212, code portions 214, timestamps 216, boilerplate 224, prompts 222, various types of timelines or any other relevant data. Data repositories 160 can support data access and retrieval, storage, and management to facilitate data processing system 102 operation.

Machine learning (ML) system 140, also referred to as AI platform or AI framework, can include any combination of hardware and software for providing, operating, developing, inference, or training ML models 142. ML system 140 can include the tools and infrastructure to build and optimize AI algorithms that can generate candidate solutions or analyze test results. ML system 140 can support various stages of the ML lifecycle, including data preprocessing, model training, evaluation, and deployment. The ML system 140 can integrate data with data repositories 160 to access training data, which can be stored in data repositories 160 and used for training of ML models 142. ML system 140 can include a solution execution environment to deploy ML models 142 for making determinations. ML system 140 can utilize cloud resources, GPUs, and specialized hardware to accelerate ML computations. This component enhances the system's capability to handle complex problems by incorporating intelligent, data-driven approaches.

ML system 140 can include any framework or a platform to provide any combination of ML models 142. ML models 142 can include any one of a broad spectrum of architectures and algorithms, depending on their tasks and domains. ML models 142 can any type or form of ML or AI models, such as for example neural network models, including recurrent neural networks (RNNs) for sequential data processing or natural language analysis. ML models 142 can include generative AI models, such as generative pre-trained transformer (GPT) models. ML models 142 can include generative adversarial networks (GANs) for generating textual output or provide analysis of computer code, support vector machines (SVMs), decision tree or random forests to facilitate classification and regression tasks. ML models 142 can include any transformer-based models for natural language processing tasks.

ML models 142 can include any generative artificial intelligence (AI) models that can be trained, configured or designed to generate content or new content, such as text, images, or code, by learning patterns and structures from existing data. Such generative AI models (e.g., ML models 142 that are generative AI models) can include any model, a computational system or an algorithm that can learn patterns from data (e.g., chunks of data from various input documents, computer code, templates, forms, etc.) and make predictions or perform tasks without being explicitly programmed to perform such tasks. A generative AI model can refer to or include a large language model. The generative AI model can be trained using a dataset of documents (e.g., text, images, videos, audio or other data). The generative AI model can be designed to understand and extract relevant information from the dataset.

An ML model 142 configured as a generative AI model can be built using deep learning techniques, such as neural networks, and can be trained on large amounts of data. Such a generative AI model can be designed, constructed or include a transformer architecture with one or more of a self-attention mechanism (e.g., allowing the model to weigh the importance of different words or tokens in a sentence when encoding a word at a particular position), positional encoding, encoder and decoder (multiple layers containing multi-head self-attention mechanisms and feedforward neural networks). For example, each layer in the encoder and decoder can include a fully connected feed-forward network, applied independently to each position. The data processing system can apply layer normalization to the output of the attention and feed-forward sub-layers to stabilize and improve the speed with which the generative AI model is trained. The data processing system can leverage any residual connections to facilitate preserving gradients during backpropagation, thereby aiding in the training of the deep networks. Transformer architecture can include, for example, a generative pre-trained transformer, a bidirectional encoder representations from transformers, transformer-XL (e.g., using recurrence to capture longer-term dependencies beyond a fixed-length context window), text-to-text transfer transformer, Through training (e.g., by ML trainers 242), the generative AI model can learn, or adjust its understanding of mapping the embeddings to particular issues (e.g., various aspects of computer code design, skill level testing, or computer code features or activities that are indicative of particular skill levels), by adjusting its internal parameters. Internal parameters can include numerical values of the generative AI model that the model learns and adjusts during training to optimize its performance and make more accurate predictions. Such training and can include iteratively presenting the various data chunks or documents of the dataset (e.g., or their chunks, embeddings) to the generative AI model, comparing its predictions with the known correct answers, and updating the model's parameters to minimize the prediction errors. By learning from the embeddings of the dataset data chunks, the generative AI model can gain the ability to generalize its knowledge and make accurate predictions or provide relevant insights when presented with prompts or other data inputs.

The generative AI model can include any ML or AI model or a system that can learn from a dataset to generate new content (e.g., text or images) that resembles a distribution of the training dataset. A distribution of a dataset can include an underlying probability distribution representing the patterns and characteristics of the data used to train a generative AI model (e.g., ML model 142). For example, a training data distribution can represent statistical properties of a text data (e.g., text corpus), such as the frequency of words, the co-occurrence of terms, and the overall structure of the language used in the training dataset. The generative AI model can include the functionality to utilize such a probability distribution of patterns and characteristics to generate new responses (e.g., predictions) that were not present in the dataset.

ML models 142 can be trained using ML trainers 252, which can include any combination of hardware and software for training ML models 142. ML trainers 252 can train ML models 142 using datasets, which can be stored in data repositories 160, including any data streams 240 (e.g., any data generated or used by data processing system 102), including any candidate solutions 208 or client solutions 212. ML trainers 252 can train any selection of ML models 142 to perform particular tasks or determinations or can train a single ML model 142 for multiple tasks or operations.

Technical assessment engine (TAE) 120 can include any combination of hardware and software for evaluating the technical quality and performance of candidate solutions 208 or client solutions 212. TAE 120 can analyze computer code (e.g., client solutions 212) based on evaluation parameters 262 relating to efficiency, correctness, scalability, and security. TAE 120 can use assessment techniques, including static code analysis, dynamic testing, and performance benchmarking. TAE 120 can integrate with the SETE 122 to run assessments and gather relevant performance metrics. TAE 120 can generate evaluation reports 264 with analyses 266 of various client candidate strengths, weaknesses, and areas for improvement based on the client solutions 212 and event timelines 276.

Code evaluator 270 can include any combination of hardware and software for analyzing and assessing the performance, operation, correctness, or quality of computer code of any candidate solutions 208 or client solutions 212. Code evaluator 270 can evaluate the computer code based on the validity conditions 272, such as particular performance parameters. For example, validity conditions 272 can include any performance metrics according to test cases 204 or metrics on code execution. Code evaluator 270 can perform static and dynamic code analysis to identify issues such as bugs, inefficiencies, and security vulnerabilities. Code evaluator 270 can use a variety of tools and techniques, including linting, code review, and automated testing, to evaluate code quality. Code evaluator 270 can integrate with the solution execution environment and code recorder to access and analyze code artifacts. Code evaluator 270 can generate reports that provide insights into code quality and suggest improvements.

Timeline generator 274 can include any combination of hardware and software for generating timelines 276 of events or actions implemented by a client candidate during a test. Timeline generator 274 can systematically organize and sequence events based on gathered data, such as the code portions 214 and timestamps 216 of the client solution 212. Timeline generator 274 can use algorithms to arrange events in a chronological timeline 276. Event timeline 276 can identify or mark various client actions that can be used by TAE 120 to generate analyses 266 and provide scores 260 for the client performance according to evaluation parameters 262 (e.g., particular computer coding skills to be tested). The timeline 276 can allow the TAE 120 to organize and identify the sequence and interrelation of events to analyze the client candidate's thought process and progress through the development of the client solution 212.

Timelines generated by the timeline generator can include any collection of data indicative of individual actions, such as an order of actions, which have occurred in creation of a computer code for a solution, such as a client solution 212 or candidate solution 208. Timeline can include a plurality of timestamped code portions 214, such as a series of pairs of code portions 214 along with timestamps 216 when such code portions 214 were drafted, created, or generated. Timeline can include entries of all of the actions (e.g., keystrokes, menu selections, inputs into the system or algorithm) used in preparation of a solution. Timeline can include a filtered version of the timeline, including only entries of actions that pass criteria 218 for the given timeline. Criteria 218 can include time-related criteria (e.g., minimal amount of time between two entries) or a content-based criteria (e.g., minimum number of characters that are different between two entries). Criteria 218 can include determinations by ML model, such as a determination that a particular time entry is sufficiently similar, related to, or indicative of a particular test taker skill (e.g., actions indicative of client candidate's ability to draft an algorithm of a computer code or troubleshoot an error). Timelines can include event timelines 276, highlight timelines (e.g., ML model determined series of actions indicative of test taker's abilities corresponding to the evaluation parameters 262 for which the test is conducted), or general timelines of entire test taking process.

Figure 3:
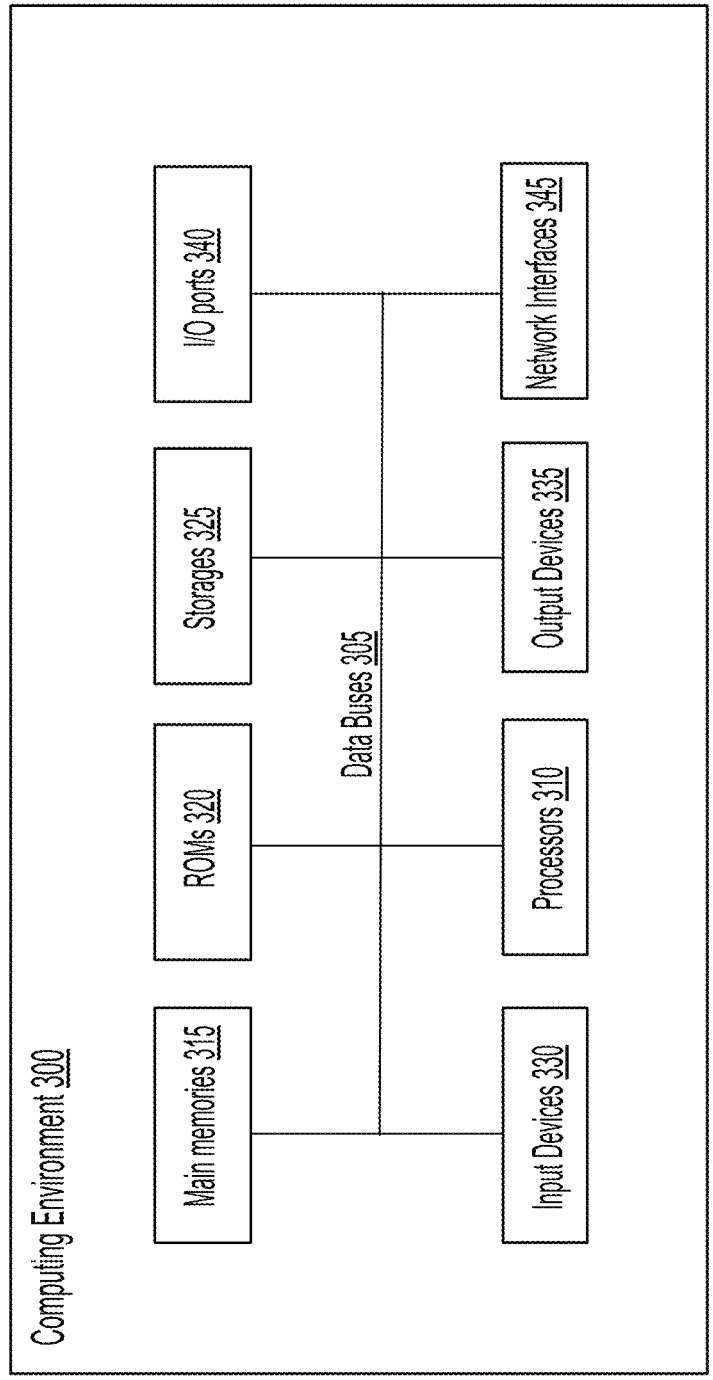
FIG. 3 is an example block diagram of a computing environment in which the data processing system and the features of the technical solutions can be implemented.

FIG. 3 illustrates an example block diagram of a computing environment 300, also referred to as a computing or a computer system 300, in which the data processing system 102 can be implemented. Computer system 300 can include or be used to implement any computation or processing (e.g., operation, command, protocol, or data processing) described herein, including any component of a data processing system 102. For instance, computing environment 300 can be included or provided in and run any device (e.g., server) or service (e.g., cloud computing service) of a client device 132, admin device 130 or a data processing system 102. Computer system 300 can be used for operating or running one or more SETEs 122, data repositories 160, ML systems 140, TAEs 120, timeline generators 274 or code evaluators 270, or any other functionality described herein.

Computing system 300 can include at least one bus data bus 305 or other communication component for communicating information and at least one processor 310 or processing circuit coupled to the data bus 305 for processing information. Computing system 300 can include one or more processors 310 or processing circuits coupled to the data bus 305 for exchanging or processing data or information. The processors 310 can include any processing circuitry, including, for example, graphics processing units (GPUs) or any circuitry or processors configured for executing machine learning or artificial intelligence models. Computing system 300 can include one or more main memories 315, such as a random-access memory (RAM), dynamic RAM (DRAM) or other dynamic storage device, which can be coupled to the data bus 305 for storing information and instructions to be executed by the processor(s) 310. Main memory 315 can be used for storing information (e.g., data, computer code, commands, or instructions) during execution of instructions by the processor(s) 310.

Computing system 300 can include one or more read only memories (ROMs) 320 or other static storage device coupled to the bus 305 for storing static information and instructions for the processor(s) 310. Storage 325 can include any storage device, such as a solid-state device, magnetic disk, or optical disk, which can be coupled to the data bus 305 to persistently store information and instructions. Storage 325 can be used, for example, to provide data repositories 160.

Computing system 300 may be coupled via the data bus 305 to one or more output devices 335, such as speakers or displays (e.g., liquid crystal display or active-matrix display) for displaying or providing information to a user. Input devices 330, such as keyboards, touch screens or voice interfaces, can be coupled to the data bus 305 for communicating information and commands to the processor(s) 310. Input device 330 can include, for example, a touch screen display (e.g., output device 335). Input device 330 can include a cursor control, such as a mouse, a trackball, or cursor direction keys, for communicating direction information and command selections to the processor(s) 310 for controlling cursor movement on a display.

Computer system 300 can include input/output ports 340, also referred to as I/O ports 340, can include physical interfaces that facilitate or provide communication between external or peripheral devices and processor(s) 310 and/or memory 315. I/O ports 340 can be connected to data bus 305, allowing the transfer of data between the processor(s) 310, memories 315, and any external devices (e.g., keyboards, mice, printers, and external storage devices). Computer system 300 can also include one or more network interfaces 345 coupled via data buses 305. Network interfaces 345 can include any physical or virtual components enabling communication between the computer system 300 and any external networks (e.g., the Internet). Network interface 345 can provide transfer of data between the processor(s) 310, memories 315 and any external networks.

The processes, systems and methods described herein can be implemented by the computing system 300 in response to the processor 310 executing an arrangement of instructions contained in main memory 315. Such instructions can be read into main memory 315 from another computer-readable medium, such as the storage device 325. Execution of the arrangement of instructions contained in main memory 315 causes the computing system 300 to perform the illustrative processes described herein. One or more processors 310 in a multi-processing arrangement may also be employed to execute the instructions contained in main memory 315. Hard-wired circuitry can be used in place of or in combination with software instructions together with the systems and methods described herein. Systems and methods described herein are not limited to any specific combination of hardware circuitry and software.

Although an example computing system has been described in FIG. 3, the subject matter including the operations described in this specification can be implemented in other types of digital electronic circuitry, or in computer software, firmware, or hardware, including the structures disclosed in this specification and their structural equivalents, or in combinations of one or more of them.

B. Automated Testing and Evaluation of Test Problems and Computer Code Solutions The technical solutions of the present disclosure can be directed to a ML-based system for automated generation, testing, and evaluation of computer code created by a job candidate based on test problem description. As accuracy, effectiveness, efficiency, and reliability of computer code solutions can depend on variations in the computer code design, it can be important to quickly and effectively generate and validate the computer code while maintaining a high level of quality. Inaccurate, ineffective, or unreliable code can lead to data mishandling, miscommunications, or errors involving client devices, leading to computational inefficiencies and increased energy consumption. Inefficient designs can demand more processor computations to complete actions that a more efficient design could accomplish using fewer cycles, thus negatively impacting the system efficiency and the user experience. Prompt and timely detection of subpar code designs is a technical challenge. The technical solutions can utilize an ML-based system that overcomes such challenges using generative AI models that can systematically generate and validate computer code solutions to various technical problems, in a variety of applications, such as testing of technical skills of applications in software engineering design positions.

While computerized testing of computer engineering candidates can provide some flexibility in testing solutions, these solutions are normally limited in various ways. For instance, computerized tests can rely on prior prepared and often reused static questions and static answers, providing only pass or fail outcomes and thereby failing to test for nuances in the degrees of skill levels of the candidates. As a result, such tests often lack the level of granularity in the skill assessment to accurately identify the most suitable candidates. Computer tests can also be limited to test problems and solutions that are manually created or verified, thereby making the process of test creation time consuming and resource and energy inefficient. This adversely impacts the accuracy, reliability as well as the efficiency of the use of the testing computational resources.

The technical solutions of this disclosure can utilize ML models to autonomously create and validate test problems and their corresponding computer code solutions in applications in which technical abilities of software engineering applicants are being assessed. Inefficiencies related to manually curating field-specific test problems and storing them for subsequent use in applicant testing can be time consuming and resource intensive. Using common computer software to draft and edit test problems of varying difficulty levels can consume an excessive amount of computational and network resources as well as time, making such solutions ineffective and undesirable. Moreover, libraries created in this way can be limited in terms of the range of problems and the levels of difficulty covered by the testing material, making such test problems insufficiently diverse and ineffective in testing various specific skills that the employers may desire to test. Similar libraries can also include test problems from well-known sources, making their solutions widely accessible on the internet and presenting opportunities for cheating, all of which makes the testing system unsuitable for its intended purpose. Using machine learning to address these issues is challenging due to ML related performance issues, such as drifting or hallucinations, leading to false-positive, inaccurate, and unreliable results, adding to the computational and energy inefficiencies.

The technical solutions can overcome these and other challenges by providing a system for automated generation and validation of test problems and their computer code solutions using user prompt-configured machine learning solutions. For example, the system can utilize a selection of a problem field or domain and inputs for a test problem (e.g., a difficulty level). Based on the user selection and preferences for the test problem, the system can increase the focus and accuracy of the utilized ML (e.g., large language models), thereby limiting the possibility of drifting and hallucination performance issues. For instance, the ML-models can simultaneously generate descriptions that align with the user selections or descriptions. These descriptions can be used to generate various test problem ideas, which the user can select, thereby further focusing the generative LLM to accurately and reliably generate a problem description for the test problem. The problem description can include a call-to-action and well-defined input and output parameters along with any test problem computer code boilerplate portion, which can be implemented in a programming language of choice. Using such focused ML-based outputs, the technical solutions can create test cases for validating solutions to the test problem, using a language model and a specific system prompt for expected test case format. The test cases can be designed to be shared across one or more supported languages, with a parsing strategy in place to extract one valid test case for a solution testing. As the ML model can generate the computer code candidate solutions for the test problem, based on the descriptions and the boilerplate code, the test cases can be applied to verify and validate the generated candidate solutions for accuracy, thereby further increasing the accuracy and reliability of the solution. As a result, the technical solutions can efficiently, effectively, accurately, and reliably generate and validate a broad range of technical problems and the corresponding computer code solutions, while minimizing the computational and energy resources used in the process.

Referring back to system configurations described in examples 100-300 of FIGS. 1-3, the technical solutions can be provided or executed using, one or more processors 310 coupled with memory 325. For instance, computer code, instructions, or data for instructing a processor 310 to provide or execute the functionalities or components of the data processing system 102 can be stored or implemented memories 315 or storage 320. One or more processors 310 can fetch and execute the instructions, computer instructions and data to run or implement any data processing system 102 functions to perform the system operations. In doing so, the one or more processors 310 can be configured to perform any operations or functionalities of the data processing system 102 of the technical solutions. For example, the one or more processors can execute, operate, or run one or more instances of any one of: test case generators 202, test problem generators 220, code evaluators 270, candidate solution generators 206, test managers 230, code recorders 210, data repositories 160, TAEs 120, ML systems 140, including ML models 142 or timeline generators 274.

For instance, one or more processors 310 can be configured to cause the one or more ML models 142 to generate one or more test cases 204 for the test problem 226 and a candidate solution 208 comprising a computer code for the test problem 226. The one or more processors 310 can be configured to generate the one or more test cases 204, the candidate solution 208 comprising the computer code for the test problem 226 responsive to inputting one or more prompts 222 including a description of a test problem 226 for generating computer code into one or more ML models 142. For example, a processor 310 can execute any combination of a test problem generator 220, test case generator 202 and candidate solution generator 206 to trigger or utilize one or more ML models 142 to generate the one or more test cases 204, boilerplate 224 and candidate solutions 208 based on one or more prompts 222.

For example, an admin device 130 can access a data processing system 102 via an admin interface 106 to generate one or more test cases 204 and candidate solutions 208. For example, an admin can utilize an application of an administrator interface 106 to cause the one or more processors 310 to operate a test case generator 202, a test problem generator 220 and a candidate solution generator 206. The one or more processors 310 can cause the test problem generator 220 to allow an administrator user to enter one or more prompts 222 to describe a test problem 226. The prompt 222 can include a description of the test problem 226, such as a description of a hiring company, the essential duties of an open job position, or a description of a technical problem (e.g., software solution for a product or a service), which can include one or more parameters and one or more constraints for the solution. The test problem generator 220 can utilize the one or more prompts 222 as inputs to one or more ML models 142 to generate a more detailed and refined description of the test problem 226, as well as a boilerplate 224 that can include a portion of a computer code (e.g., function definitions, input parameters, and output parameters for the computer code).

The prompt 222 can be used by the candidate solution generator 206 to generate one or more candidate solutions 208 to the test problem 226 described by the prompt 222. The candidate solutions 208 can include computer code generated by an ML model 142 based on the prompts 222, including the detailed description of the test problem 226 to solve and the boilerplate 224. The candidate solutions 208 can be configured to be tested using input and output pairs of the test cases 204. The test case generator 202 can use any combination of (e.g., one or more of) boilerplate 224 or the prompt 222 as one or more inputs into one or more ML models 142 to generate the test cases 204 for testing the candidate solutions 208. The prompt 222 can be used by the test case generator 202 as an input into ML models 142 to generate the one or more test cases 204 for the generated candidate solutions 208.

The one or more processors 310 can determine that the candidate solution 208 satisfies a validity condition 272. This determination can be made responsive to evaluating the candidate solution 208. The candidate solution 208 can be evaluated by the code evaluator 270 using the one or more test cases 204 and the computer code of the candidate solution 208. For example, a processor 310 can execute a code evaluator 270 to determine that the candidate solution 208 satisfies one or more validity conditions 272 by applying test cases 204 to the computer code of the candidate solution 208 to check if the expected results match the results of the testing.

The validity conditions 272 can include execution of the computer code within a particular threshold amount of computing resources or time duration. For instance, an amount of memory, processing or time duration of execution can be measured and compared against threshold values for each of these parameters. Validity conditions 272 can be satisfied, or not satisfied, based on whether the measured validity condition values satisfy the respective thresholds. The validity conditions 272 can include, for example, time complexity testing, such as measuring the amount of computational time to execute a candidate solution 208 or can be determined by AI or ML models based on input data. For example, a validity condition 272 can include a time threshold within which a candidate solution 208 is expected to achieve a successful code execution. For example, the code evaluator 270 can identify or select from a plurality of potential candidate solutions 208 (e.g., versions of generated computer code) a particular candidate solution 208 that passes all of the test cases 204 within a shortest time period.

The one or more processors can store, in one or more data structures 242, the description of the problem (e.g., prompt 222) and the candidate solution 208 responsive to determining that the candidate solution satisfies the validity condition 272. For example, responsive to a code evaluator 270 determining that the candidate solution 208 satisfies one or more validity conditions 272, a test manager 230 can store the candidate solution 208, boilerplate 224, test problem 226 (e.g., descriptions) and any prompts 222 into a data structure 242 associated with the given test problem 226. For instance, data processing system 102 can store the prompts 222 (e.g., description of the test problem), the candidate solution 208, the boilerplate 224 and the test cases 204 into a data structure 242 of a solution set (e.g., test problem data structure), which can then be provided to client candidates for testing.

The one or more processors 310 can be configured to evaluate the candidate solution 208 using the one or more test cases 204 by executing the computer code using the code evaluator 270. For instance, the code evaluator 270 can execute the computer code of the candidate solution 208 generated by the ML model 142 and the candidate solution generator 206. The code evaluator 270 can evaluate the computer code by applying inputs of the test cases 204 and comparing the outputs produced by the computer code execution of the inputs to compare and match with the expected outputs for the given inputs. The one or more processors 310 can be configured to evaluate the candidate solution 208 responsive to inputting the one or more test cases 204 and the computer code to the one or more ML models 142. For instance, the candidate solution generator 206 or the code evaluator 270 can utilize an ML model 142 to evaluate or validate the candidate solution 208.

In some example, one or more prompts 222 can include a first one or more prompts 222 to be utilized by the data processing system 102. The one or more processors 310 can be configured to cause the one or more ML models 142 to generate a boilerplate 224 portion of a computer code for the test problem 226. The boilerplate portion can be generated responsive to inputting one or more second prompts 222 (e.g., different than the first one or more prompts 222) that can include a description of a test problem 226 into the one or more ML models 142. The one or more processors 310 can store the boilerplate 224 portion of the computer code in the one or more data structures 242. The boilerplate 224 portion of the computer code can include one or more parameters names and their corresponding definitions, one or more function names and definitions or a portion of the computer code that a client candidate can use to complete the drafting of the computer code of the client solution 212 on the client device 132.

In some examples, to cause the one or more ML models 142 to generate one or more test cases 204 for the test problem 226 and a candidate solution 208 for the test problem 226, the one or more processors 310 can be configured to cause the one or more ML models 142 to generate a first test case 204 of the one or more test cases 204. The one or more processors 310 can be configured to parse, responsive to generation of the first test case, the first test case 204. The one or more processors 310 can be configured to cause the one or more ML models 142 to generate the candidate solution 208.

The one or more test cases 204 can include a plurality of test cases 204. The one or more processors 310 can be configured to determine, responsive to generation of each of the one or more test cases 204, that the candidate solution 208 satisfies the validity condition 272 for each of the one or more test cases 204. In some examples, to store the description of the test problem 226 and the candidate solution 208, the one or more processors 310 can be configured to store the description of the test problem 226 and the candidate solution 208 responsive to determining that the candidate solution 208 satisfies the validity condition 272 for each of the one or more test cases 204.

The candidate solution 208 can include a first candidate solution 208. The one or more processors 310 can be configured to cause the one or more ML models 142 to generate a second candidate solution 208 prior to the first candidate solution 208. The one or more processors 310 can be configured to determine, responsive to evaluating the second candidate solution 208 using the one or more test cases 204 and second computer code corresponding to the second candidate solution 208, that the second candidate solution 208 does not satisfy the validity condition 272. The one or more processors 310 can be configured to cause the one or more ML models 142 to generate the first candidate solution 208 responsive to determining that the second candidate solution 208 does not satisfy the validity condition 272.

The one or more processors 310 can be configured to debug the second candidate solution 208. The one or more processors 310 can be configured to determine, responsive to debugging the second candidate solution 208, that the second candidate solution 208 includes an error. The error can include, for example, an erroneous output for one or more test cases 204, which can be indicative of the candidate solution 208 having at least a portion of the computer code that is incorrect. The one or more processors 310 can be configured to discard the second candidate solution 208 and cause the one or more ML models 142 to generate the first candidate solution 208. The second candidate solution 208 can be discarded responsive to the determination or detection of the error.

The one or more processors 310 can be configured to debug at least one test case of the one or more test cases 204.

The one or more processors 310 can be configured to determine, responsive to debugging the at least one test case 204, that the at least one test case 204 includes an error. The error can include, for example, an erroneous input and output pair, such that at least one output does not correspond correctly to an input of the test case 204. The one or more processors 310 can be configured to discard the at least one test case 204 and cause the one or more ML models 142 to generate a second test case 204 of the one or more test cases 204.

The one or more processors 310 can be configured to validate the at least one test case with the second candidate solution 208. The one or more processors 310 can be configured to compare one or more expected outputs of the at least one test case 204 with one or more outputs of the second candidate solution 208 based on one or more inputs of the at least one test case input into the second candidate solution 208.

The one or more processors 310 can be configured to validate a first test case 204 of the one or more test cases 204 with the candidate solution 208. The one or more processors 310 can be configured to debug, responsive to one or more outputs of the first test case 204 not matching one or more corresponding outputs of the candidate solution 208, the first test case 204. The one or more processors 310 can be configured to determine, responsive to debugging the first test case 204, that the first test case 204 includes the error. The error can include, for example, a mismatch between one or more inputs and outputs of the one or more test cases 204 in light of the operation of the candidate solution 208 behavior. The one or more processors 310 can be configured to discard the first test case 204 and cause the one or more ML models 142 to regenerate the first test case 204 for the candidate solution 208. For example, the one or more test cases 204 can include a plurality of test cases 204. The one or more processors 310 can be configured to initiate generation of the candidate solution 208 prior to the one or more ML models 142 completing generation of each of the plurality of test cases 204.

The one or more prompts can include first prompts 222. The one or more processors 310 can be configured to receive from a client device 132, a domain of the test problem 226 to be generated. The domain can include a technical field or a range of problems within which a test problem 226 is to be generated. The one or more processors 310 can be configured to generate, responsive to one or more second prompts 222 and the domain input into the one or more ML models 142, one or more short problem summaries corresponding to the domain. The one or more processors 310 can be configured to cause, responsive to the one or more second prompts 222 and a candidate short problem summary of the one or more short problem summaries input into one or more ML models 142, a description of the test problem 226 corresponding to the domain and the candidate short problem description. The one or more processors 310 can be configured to provide, for presentation at a client device 132, the candidate solution 208 responsive to determining that the candidate solution 208 satisfies the validity condition 272.

The one or more processors 310 can be configured to utilize one or more ML models 142. The one or more ML models 142 can include at least one of one or more generative pretrained transformer models or one or more large language models (LLMs). The one or more processors 310 can be configured to generate, by the one or more ML models 142 responsive to a prompt 222 comprising an indication of the test problem 226, a string of text comprising the description of the test problem 226. The one or more processors 310 can be configured to provide for display on a client device 132, the string of text.

The one or more processors 310 can be configured to generate a boilerplate 224 portion of the computer code according to the indicated type. The boilerplate 224 can be generated, by the test problem generator 220 or by one or more ML models 142, responsive to a type of the computer code indicated in the one or more prompts 222 and the string of text input into the one or more ML models 142. The one or more processors 310 can be configured to provide the boilerplate 224 portion for display on the client device 132.

The one or more processors 310 can be configured to receive, from the one or more ML models 142 responsive to parsing the candidate solution 208 of the one or more candidate solutions 208 for the test problem, the candidate solution 208 parsed into a JavaScript Object Notation (JSON) object. The one or more processors 310 can be configured to determine, using the one or more ML models 142, the JSON object and a test case 204 of the one or more test cases 204 executed in an execution environment (e.g., SETE 122), that the candidate solution 208 satisfies the validity condition 272.

The one or more processors 310 can be configured to receive an indication that a first test case 204 of the one or more test cases 204 or the solution is incorrect. The one or more processors 310 can be configured to generate a plurality of calls for the one or more ML models, each of the plurality of calls including or referencing the first test case 204. The one or more processors 310 can be configured to receive a plurality of results from the one or more ML models responsive to the plurality of calls. The one or more processors 310 can be configured to determine, based on the plurality of results, validity of the first test case 204.

Figure 4:
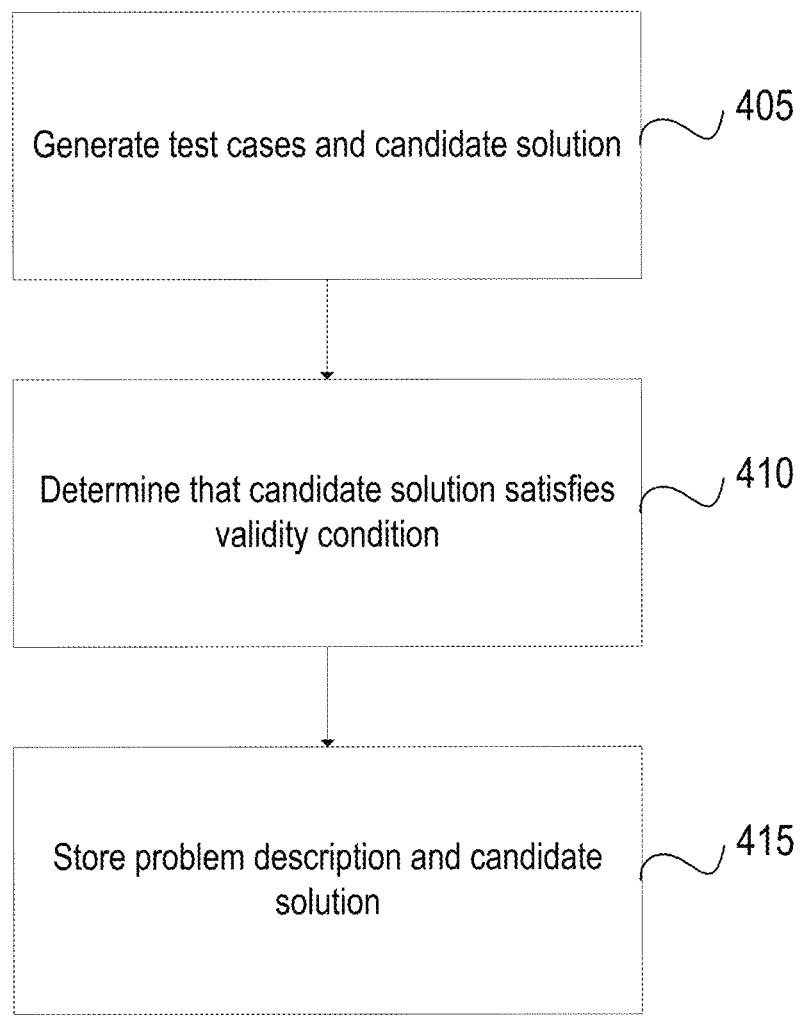
FIG. 4 is an example flow diagram of a method for automated generation, testing and evaluation of test problems and the computer code of their corresponding solutions.

FIG. 4 is an example flow diagram of a method 400 for automated generation, testing and evaluation of test problems and the computer code of their corresponding solutions. Method 400 can include acts or operations 405 through 415, which can be implemented, using a combination of features of designs and systems discussed in connection with FIGS. 1-3. At 405, the method can include generating one or more test cases and candidate solutions. At 410, the method can include determining that the one or more candidate solutions satisfies one or more validity conditions. At 415, the method can include storing the one or more problem descriptions and the candidate solutions.

At 405, the method can generate one or more test cases for testing candidate solutions and one or more candidate solutions to be tested with using test cases. The method can include one or more processors causing the one or more ML models to generate one or more test cases for the test problem. For instance, the one or more processors can run a test case generator to generate test cases based on the detailed description of the test problem. The one or more processors can cause the one or more ML models to generate one or more candidate solutions comprising one or more computer codes for the test problem. For instance, the one or more processors can generate a candidate solution generator to generate computer code candidates to address the test problem.

The generating of the one or more test cases for the test problem and the candidate solution can be done responsive to inputting one or more prompts including a description of a test problem for generating computer code into one or more ML models. The one or more ML models can include at least one of one or more generative pretrained transformer models or one or more large language models (LLMs), bidirectional encoder representations from transformers (BERT) models, generative pre-trained transformer (GPT) models, transformer-XL models, XLNet models, or any other type and form of AI or ML models.

Figure 9:
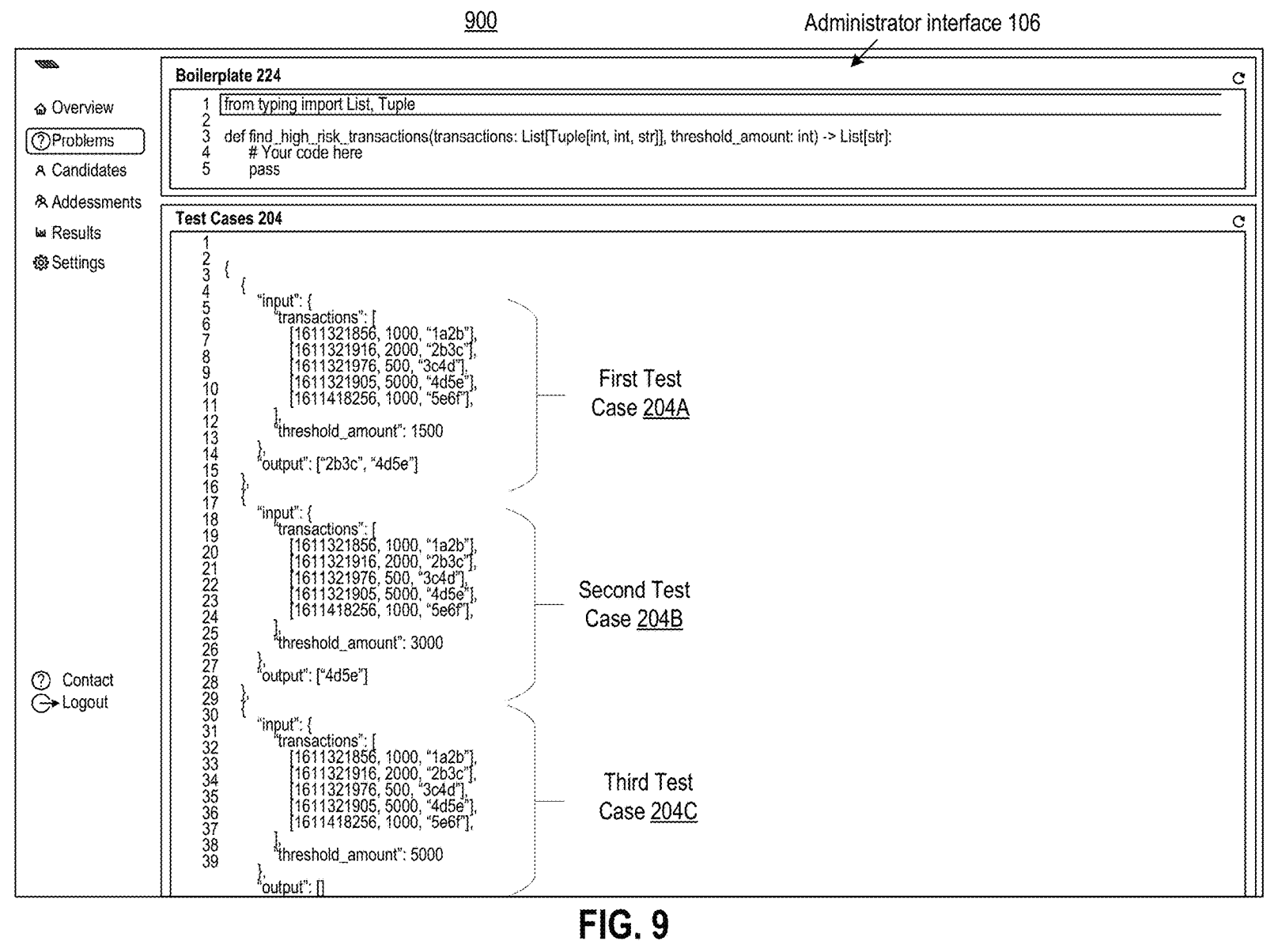

The one or more processors can cause the one or more ML models to generate one or more test cases for the test problem and a candidate solution for the test problem by extracting relevant data from the description and the one or more prompts. For instance, the candidate solution generator can extract information from the detailed description of the test problem and based on the extracted information and prompts, generate the computer code of the candidate (e.g., proposed) solution to the test problem. The relevant data can include keywords from the description, initial inputs within the boilerplate portion, outcomes for the test problem, among others. Using the inputs from the one or more processors, the one or more ML models can generate a first test case of the one or more test cases as shown in FIG. 9.

After generating the first test case, the one or more ML models can generate a second test case and so on. In this manner the one or more ML models can generate a plurality of test cases based on the description of test problem and initiate generation of the candidate solution prior to the one or more ML models completing generation of each of the plurality of test cases. Furthermore, the one or more ML models can receive feedback to improve the generation of the one or more test cases. For example, the one or more ML models can receive feedback from a computing device that can analyze the generated test cases for accuracy and applicability to the given description.

The method 400 can include debugging at least one test case of the one or more test cases. To debug the at least one test case of the one or more test cases, the one or more processors can analyze the syntax, runtime behavior, resource, and memory use, among others. While debugging, the one or more processors can determine that the at least one test case includes an error (e.g., Assertion failure, Syntax Error, Logical Error, Runtime Error). For example, a first test case can result in an assertion failure during execution of the candidate solution. In another example, a second test case can include a syntax error.

The method can include discarding the at least one test case that includes an error and generate a second test case of the one or more test cases. For example, the one or more processors can generate a second test case in response to a determination (e.g., by a test case generator or candidate solution generator) that the first test case includes an error. This can be determined, for example, by testing the test case against one or more known or verified solutions and receiving an unexpected or incorrect result or output. For example, after generating the first test case, the one or more ML models can parse the first test case. Upon successfully parsing the test case, the one or more ML models can generate the candidate solution by generating computer code to solve the test problem. The one or more ML models can use the one or more test cases, description of the test problem, and the boilerplate portion to generate the computer code. The one or more ML models can finalize the computer code to solve the test problem, thereby generating the candidate solution. Responsive to parsing the candidate solution of the one or more candidate solutions for the test problem, the one or more processors can receive from the one or more ML models the test cases parsed into a JavaScript Object Notation (JSON) object.

The method can include generating, by the one or more ML models responsive to a prompt that includes an indication of the test problem, a string of text that includes the description of the test problem. The one or more ML models can extract the relevant data associated with the indication of the test problem. For example, using the extracted relevant data, the one or more ML models can generate the string of text which includes the description of the test problem.

The one or more ML models can indicate a type of the computer code indicated within one or more prompts and the string of text input into the one or more ML models. For example, the one or more ML models can identify a type for the computer code by analyzing the one or more prompts. In another example, the one or more ML models can identify a type for the computer code by analyzing the string of text. By analyzing the string of text, the one or more ML models can identify the type based on key phrases within the string of text (e.g., "Write a function find_high_risk_transactions that takes two parameters). In some instances, the one or more prompts can indicate the type to be used as an input for the one or ML models.

The method can include generating, by the one or more ML models, a boilerplate portion of the computer code according to the indicated type. For example, the indicated type can be fraud transactions, therefore, the one or more ML modes can generate a boilerplate portion of the computer code in accordance with fraud transactions by including the imports, function definition, parameters, among others as shown in FIG. 7. In another example, the one or more processors can input one or more second prompts including a description of a test problem into the one or more ML models causing the one or more ML models to generate a boilerplate portion of a computer code for the test problem.

The one or more prompts can include first prompts. Each prompt in the first prompts can correspond to different description of a test problem. For instance, a first prompt can include a first description of a test problem, whereas a second prompt can include a second description of a test problem. The method 400 can include receiving, from a client device, a domain of the test problem to be generated. The domain can correspond to an area of computer science (e.g., Human-Computer Interaction, Artificial Intelligence, Cybersecurity, Data science, Computer Graphics, Distributed Systems, among others). For example, the domain received from the client device can be directed to artificial intelligence. In another example, the domain received from the client device can be directed to computer networks.

The method can include generating, responsive to one or more second prompts and the domain input into the one or more ML models, one or more short problem summaries corresponding to the domain. Prior to inputting the second prompts and the domain to the one or more ML models, the one or more processors can generate the second prompts according to the domain from the client device. For example, the one or more processors can generate the second prompt according to the domain. Once the second prompt is generated, the one or more processors can feed the second prompt and the domain to the one or more ML models.

The one or more short problem summaries can vary in difficulty in accordance with the second prompt and the domain of the test problem. For example, a first short problem summary can correspond to a first difficulty of the domain, whereas a second short problem summary can correspond to a second difficulty of the domain. The method can include the one or more processors to cause the one or more ML models to generate a description of the test problem corresponding to a domain of a test problem and the candidate short problem description. The description of the test problem can be generated responsive to the one or more second prompts and a candidate short problem summary of the one or more short problem summaries input into one or more ML models.

In another example, the candidate solution is a first candidate solution. The one or more ML models can generate a second candidate solution prior to the first candidate solution. For example, the one or more ML models can generate one or more candidate solutions for the description of the test problem. Using feedback and satisfying validity conditions, the one or more ML models can select an optimal candidate solution according to the feedback, satisfied validity conditions, and minimal errors present in the computer code.

The method can include determining that the second candidate solution does not satisfy the validity condition, by evaluating the second candidate solution using the one or more test cases and second computer code corresponding to the second candidate solution. For example, the one or more processors can execute the second computer code using the one or more test cases to evaluate the candidate solution. While evaluating the second candidate solution, the second candidate solution can not satisfy the validation condition.

When the second candidate solution does not satisfy the validity condition, the method 400 can include executing an application programming interface (API) to debug the second candidate solution. For example, executing the API, the one or more processors can detect syntax errors, runtime errors, logical errors, compilation errors, semantic errors, linker errors, concurrency errors, among others, during the debugging process.

The method can include determining that the second candidate solution includes an error upon detection of the error during the debugging process. For example, the one or more processors can determine that the second candidate solution includes a syntax error. In another example, the one or more processors can determine that the second candidate solution includes a runtime error. Once the second candidate solution has been determined to include the error, the one or more processors can discard the second candidate solution and cause the one or more ML models to generate the first candidate solution. By generating the first candidate solution, the one or more processors can replace the second candidate solution with the first candidate solution.

The method can include validating at least one test case with the second candidate solution. For example, the upon generation of the second candidate solution, the one or more processors can validate the second candidate solution with the at least one test case to identify accurate computer code within the at least one test case and the second candidate solution. Once the at least one test case and the second candidate solution are validated, the method 400 can include comparing one or more expected outputs of the one or more test cases with one or more outputs of the second candidate solution. For example, the one or more processors can compare an expected output from the at least one test case and an output of the second candidate solution. The one or more processors can detect errors in the at least one test case and replace an errored test case with a correct test case. In some examples, the comparison of the expected output of the at least one test case and the output of the second candidate solution can be based on one or more inputs of the at least one test case input into the second candidate solution.

For example, to validate and debug the one or more test cases, the one or more processors can validate a first test case of the one or more test cases with the candidate solution to analyze for inaccuracies and defects. The one or more processors can compare expected outputs of the first test case and outputs of the candidate solution. Upon detecting that the one or more outputs of the first test case do not match the one or more corresponding outputs of the candidate solution, the one or more processors can debug the first test case to detect errors within the first test case. Once an error is detected, the one or more processors can determine, responsive to debugging the first test case, that the first test case includes the error and discard the first test case and cause the one or more ML models to regenerate the first test case for the candidate solution.

For example, to validate the first test case of the one or more test cases, the one or more processors can receive an indication that the first test case of the one or more test cases or the candidate solution is incorrect. The indication can correspond to the first test case during the method 400. The test case with the indication can be used to generate a plurality of calls for the one or more ML models. Each ML model in the one or more ML modes can include the first test case. The one or more ML models can detect the indication in the plurality of calls and generate a plurality of results for the first test case. The one or more ML models can transmit the plurality of results to the one or more processors to determine a validity of the first test case.

At 410, the method can include determining that the one or more candidate solutions satisfies one or more validity conditions. The method can determine this by evaluating the candidate solution using the one or more test cases and computer code corresponding to the candidate solution. For example, the one or more processors can execute the computer code using the one or more test cases to evaluate the candidate solution. For instance, the inputs of test cases can be input into the candidate solution to compare the outputs of this execution with the expected outputs of the test case. If the provided outputs match the expected outputs form the test case, then the candidate solution or test case can be verified. While evaluating the candidate solution, the candidate solution can satisfy the validation condition. In another example, the one or more processors can execute the computer code using the one or more test cases to evaluate the candidate solution responsive to inputting the one or more test cases and the computer code to the one or more ML models. In yet another example, the performance considerations such as time of execution and amount of memory consumed can inform the evaluation of the client solution with the one or more test cases.

For example, the one or more processors can determine that the one or more candidate solutions satisfies the validity condition using the one or more ML models. In another example, the one or more processors can determine that the one or more candidate solutions satisfies the validity condition using test cases contained in the JSON object. In another example, the one or more processors can determine that the one or more candidate solutions satisfies the validity condition using a test case of the one or more test cases executed in an execution environment.

The one or more test cases can include a plurality of test cases. Therefore, the method 400 can include determining that the candidate solution satisfies the validity condition for each of the one or more test cases. For example, responsive to generation of each of the one or more test cases, the one or more processors can determine that the candidate solution satisfies the validity condition for each of the one or more test cases.

At 415, the method can include storing the one or more problem descriptions and the candidate solutions. For example, the one or more processors can store the problem descriptions and the candidate solution into a data repository. In another example, the one or more processors can store the problem descriptions and the candidate solution into one or more data structures such as a linked list, a stack, a queue, a tree, hash data structure, a heap, a matrix, among others.

In another example, the one or more processors can store in one or more data structures, the description of the problem and the candidate solution responsive to determining that the candidate solution satisfies the validity condition. In another example, to store the description of the problem and the candidate solution, the one or more processors can determine that the candidate solution satisfies the validity condition for each test case in the one or more test cases. In another example, the one or more processors can store the boilerplate portion within the one or more data structures.

The method can include extracting the one or more data structures to provide elements of the one or more data structures for the client device. For example, the one or more processors can provide the candidate solution, in response to determining that the candidate solution satisfies the validity condition, for the client device. In another example, the one or more processors can provide the string of text corresponding to the description, in response to determining that the candidate solution satisfies the validity condition, for the client device. In another example, the one or more processors can provide the boilerplate portion, in response to determining that the candidate solution satisfies the validity condition or providing the string of text.

In an example hiring process of field-specific professionals, such as software engineers, assessment of the field-specific abilities of a client candidate can be an important part of a candidate evaluation process. Traditional approaches of candidate technical skill assessment can involve question-answer sessions in an interview setting, which can be inefficient, time consuming, as well as costly, biased, inconsistent, poorly documented, and inflexible. Some enterprises can utilize computer-based testing, which is usually limited in a number of ways, including a narrow range of questions available, a lack of granularity in testing different skill sets at different skill levels and inability to dynamic adjustment of problems to utilize based on already exhibited client skill set. As a result, candidate testing is usually plagued with time and energy inefficiencies, poor candidate experience, misalignment with job expectations or lack of granular and informative test results.

Figure 5:
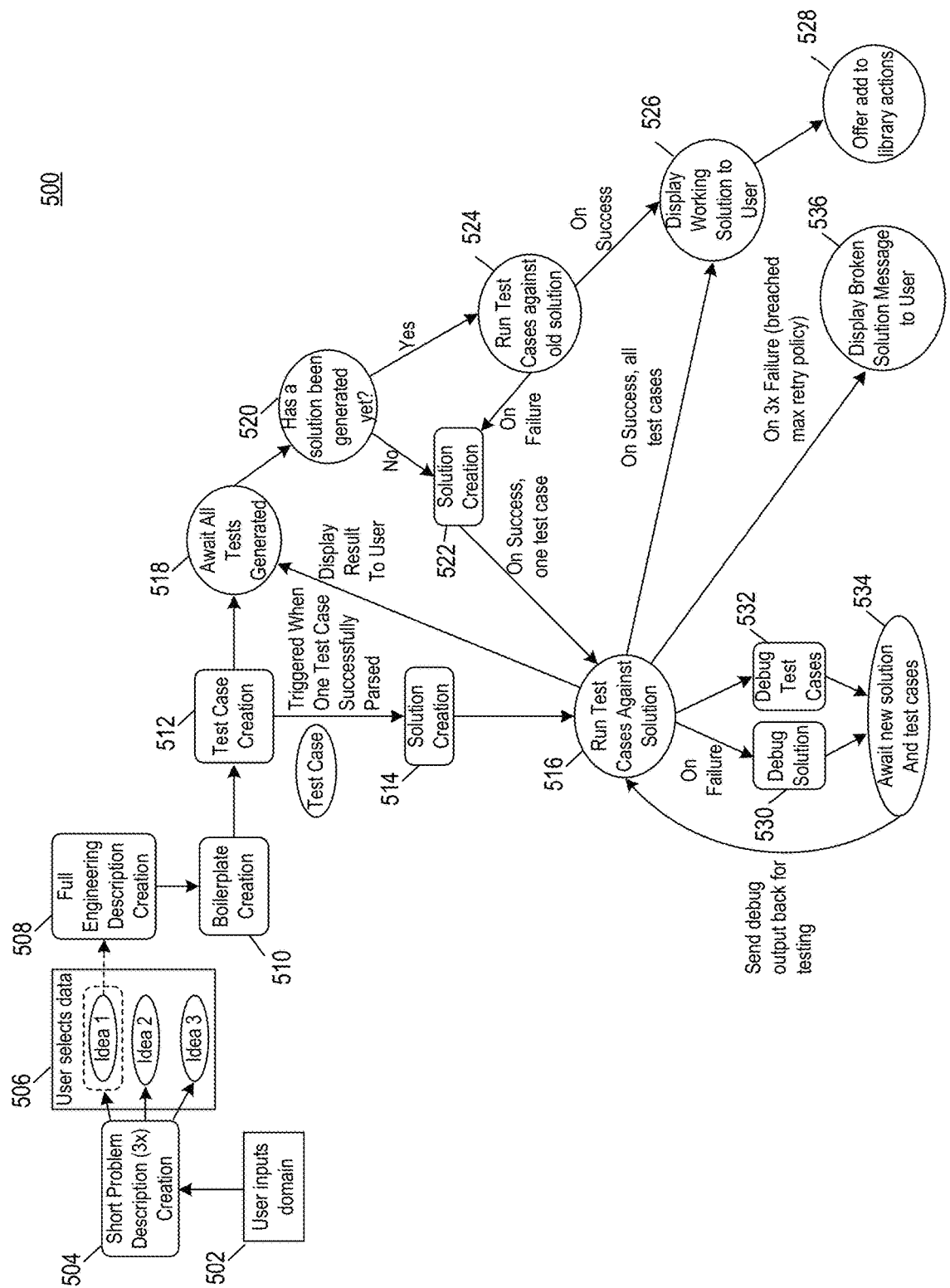
FIG. 5 is an example flow diagram of a method for generating and evaluating test problems and their corresponding computer code technical solutions.

Referring now to FIG. 5, an example flow diagram of a method 500 for generating and evaluating test problems and their corresponding computer code technical solutions is illustrated. The method 500 can include operations 502-536, which be implemented, using for example, technical components or features discussed in connection with data processing system 102, data processing system 102 or computing environment 300 discussed in connection with FIGS. 1-3. The method 500 can be implemented along or together with (e.g., utilizing or including) various elements or operations discussed in connection with method 400 of FIG. 4.

At 502, the method can include a data processing system 102 receiving a domain for a test problem. The domain can be received from a user, via one or more user inputs or selections on a graphical user interface (GUI). For instance, the method can include the user providing inputs or selections on the domain or field of a test problem in which the administrator is interested, via a graphical user interface (GUI) of an administrator interface 106 for generating test problems and solutions. An example of GUI for an administrator interface 106 or a reporting interface 108 that can receive user inputs is illustrated in FIG. 6.

Figure 6:
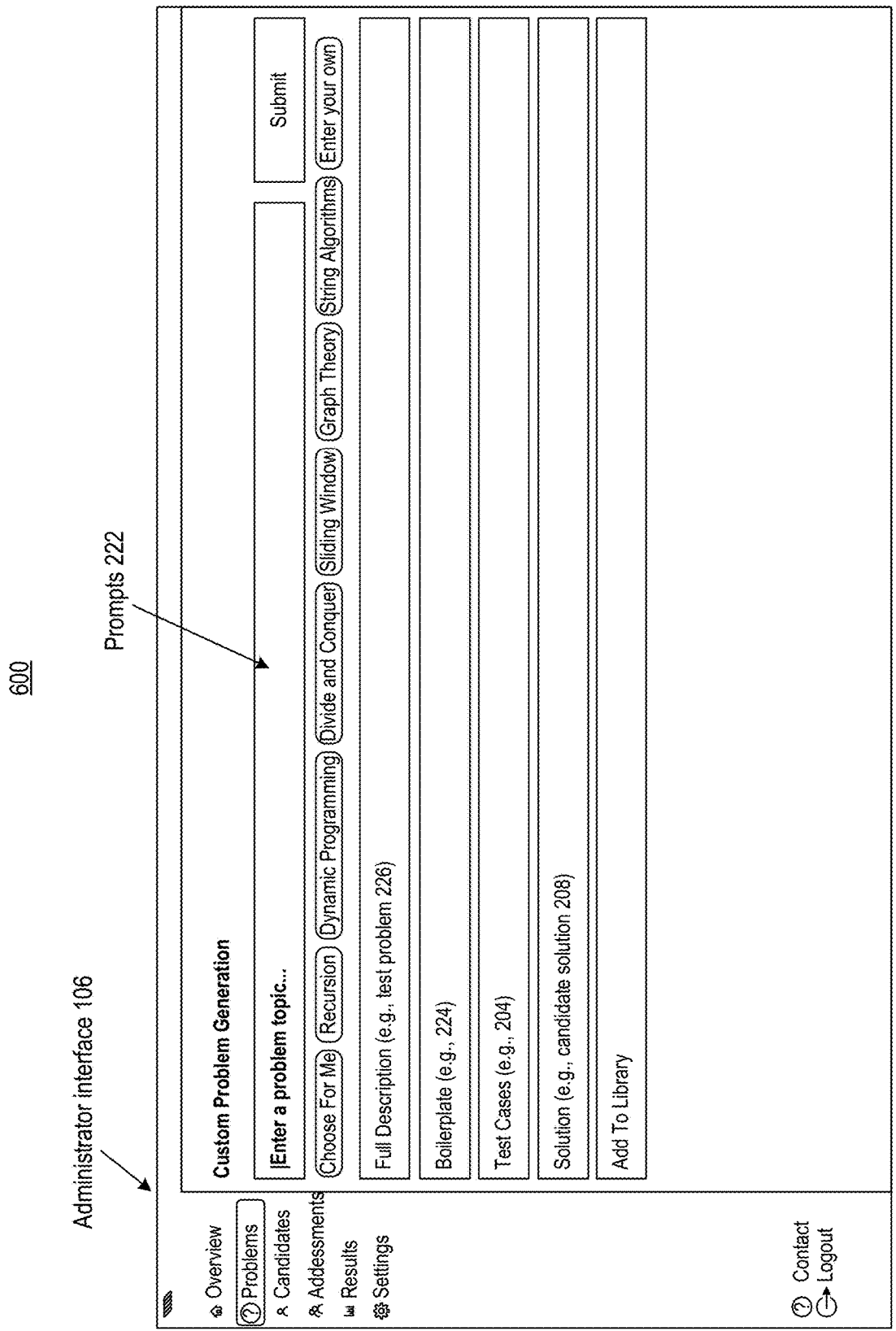
FIG. 6 is an example of a graphical user interface at an administrator interface function using which an automated problem creation process can be implemented.

FIG. 6 provides an example 600 of a GUI of an administrator interface 106 or a reporting interface 108 with which an automated problem creation process can be implemented. The GUI of the administrator interface 106 can include or provide one or more prompts 222 to facilitate receiving one or more problem selections from an administrator user to start creation of a new test problem 226, boilerplate 224, test cases 204 or candidate solution 208. For instance, an employer staff of an enterprise can log in to an administrator interface and provide one or more prompts 222 (e.g., inputs), such as a natural language description of the kind of a test problem the user desires to create. The description can be an incomplete and grammatically imperfect description or name for a problem domain or a general range of a technical space for a problem, along with any relevant data. For example, one or more inputs or selections provided by the employer staff can include a name of the employer organization, a partial description of the job opening, one or more technical aspects that the user desires test or to evaluate, and other information to guide the data processing system 102.

At 502, as shown in example 700 of FIG. 7, the employer staff can select from one or more prompts 222 (e.g., a predetermined list of field specific problem domains) a particular option for a test problem domain or field to use for testing. In some examples, the prompts 222 can include a list of domains for which tests can be generated, such as: recursion, dynamic programming, divide and conquer approach, sliding window problems, graph theory challenges, string algorithms, or an option for the user to specify one or more other field specific domains. Other domains can include, for instance, any topics related to computer science domains, electrical, mechanical, or biomedical fields, medical fields, business fields, legal fields, or any other field or discipline). The employer staff can select the domain or select a "choose for me" option which can cause the assessment system (e.g., data processing system 102) to make that decision on behalf of the employer staff. User inputs can be utilized, such as, for example a level of difficulty requested for the test problem 226 or a particular field of the technology to use.

FIGS. 30-31 illustrate examples 3000 and 3100 of user information for client candidates taking the test and test information for the test assigned to the client. As shown in example 3000 of FIG. 30, the user information can include a client candidate's name, an email address, a date of client profile, or other related client information. As shown in example 3100 of FIG. 31, a table of test information data can include a test identifier, a client candidate identifier, a test problem identifier, and a status of the test problem.

At 504, the method can include generation of one or more prompts 222 that can include short problem descriptions. The short problem descriptions can be generated, for example, based on the information (e.g., domain) entered at 502. For instance, when the user presses a submit button on a GUI of an administrator interface 106, data processing system 102 can use a test problem generator 220 to use, process or ingest the selected inputs (e.g., a text description and a choice for the problem topic) to generate short versions or summaries of a test problem 226. The data processing system 102 can utilize the test problem generator 220 to make one or more (e.g., three) simultaneous large language model (LLM) calls (e.g., API calls to ML system 140) to generate short descriptions of the test code problems that meet the desired description, parameters, or user preferences. Depending on the implementation, the number of simultaneous API calls to the ML model 142 can be adjusted (e.g., decreased or increased). The calls can be made to one or more ML models 142 (e.g., an idea-generating model for generating the problem idea or a general problem topic). The calls can include a prompt that instructs one or more ML models 142 to generate short (e.g., 2-3 sentence) descriptions of a test problem 226 (e.g., a textual description of a technical problem or computer software algorithm features). The calls can be performed with an increased temperature setting to allow the ML models 142 to perform more creatively in its question generation sequence.

Figure 8:
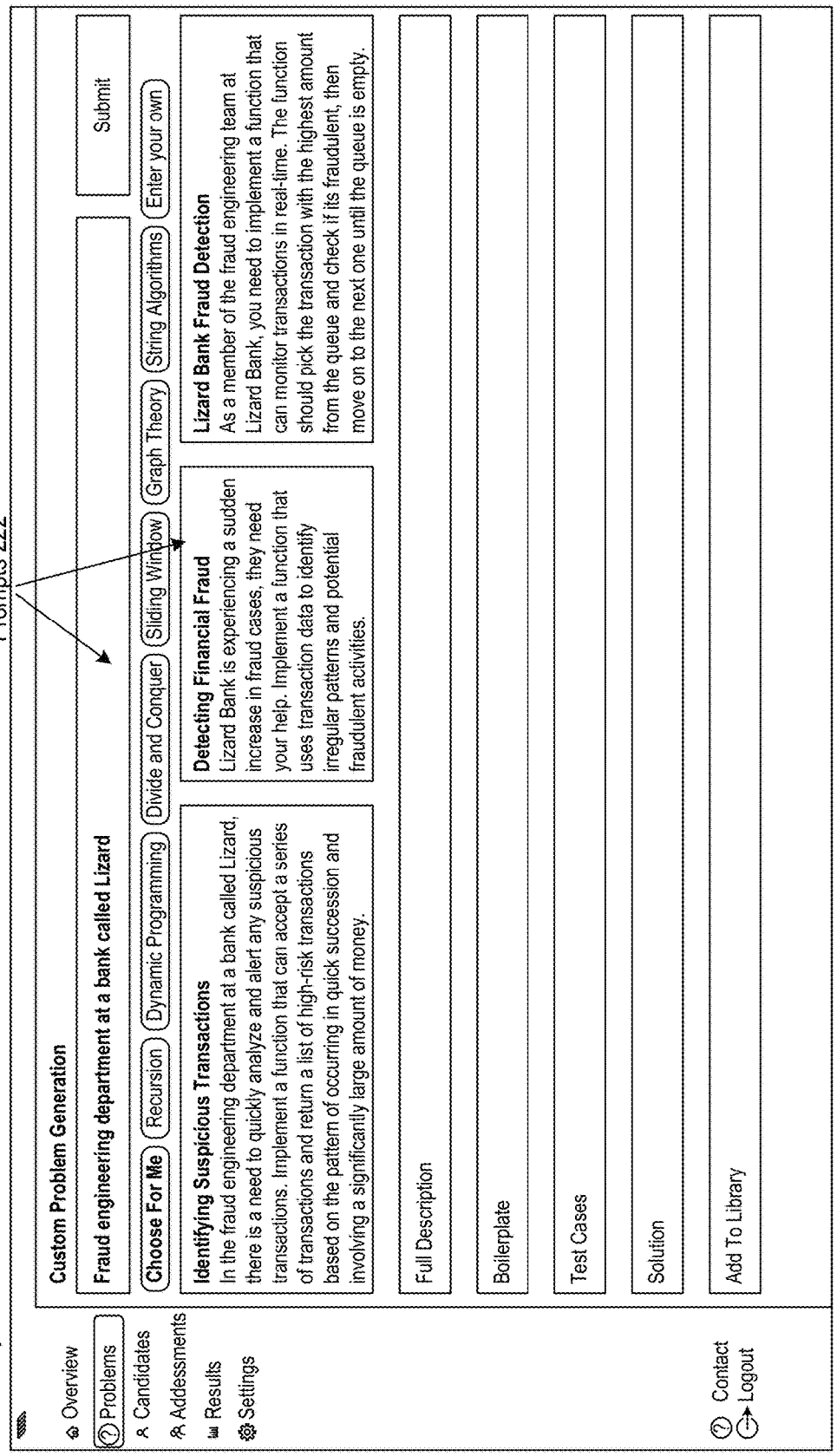

At 506, the method can include an administrator user selecting a particular short description of the idea, from a plurality of short description ideas generated by the ML system 140 based on the short description provided at 504. For example, as shown in example 800 of FIG. 8, the results from the ML system 140 provided as prompts 222 (e.g., multiple short descriptions of ideas for which to generate a test problem) can be streamed back to the front-end administrator interface 106. As shown in example 800 of GUI of administrator interface 106 in FIG. 8, prompts 222 can include different topics and short descriptions of test problems that can be generated. The test problem short descriptions can be outputs of ML models 142, which can be streamed or provided simultaneously to allow the user to read the problem ideas for selection. The administrator user can select a particular idea or a short description (e.g., by clicking on the item) to move to the next step of the test problem generation process, or the user can choose to generate new ideas, refining their inputs, providing feedback, or providing another user domain, as desired. Users can continue fine tuning the generation until a desired short summary is provided, from which to proceed to the rest of the generation process.

Figure 33:
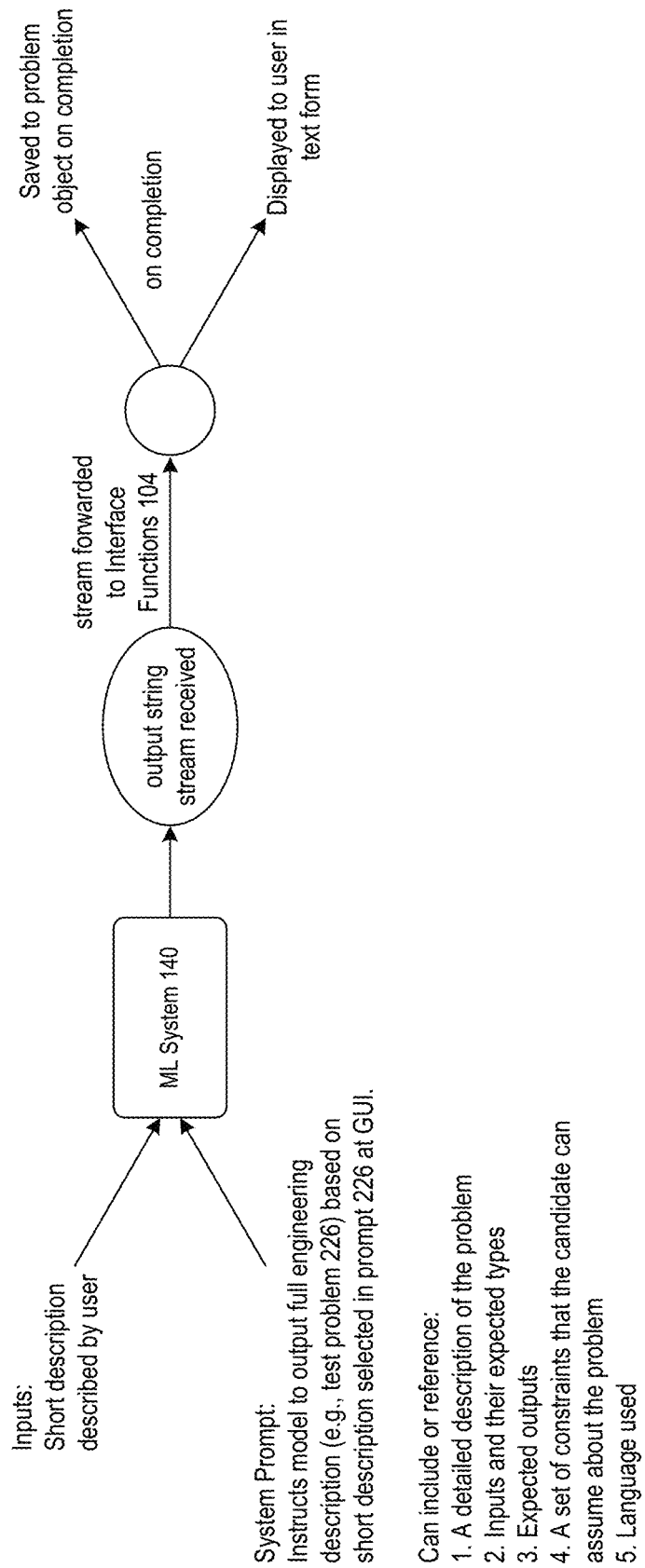
FIGS. 33-34 illustrate examples of flow diagrams of operations that a data processing system can take to generate a full engineering description of a test problem.
Figure 34:
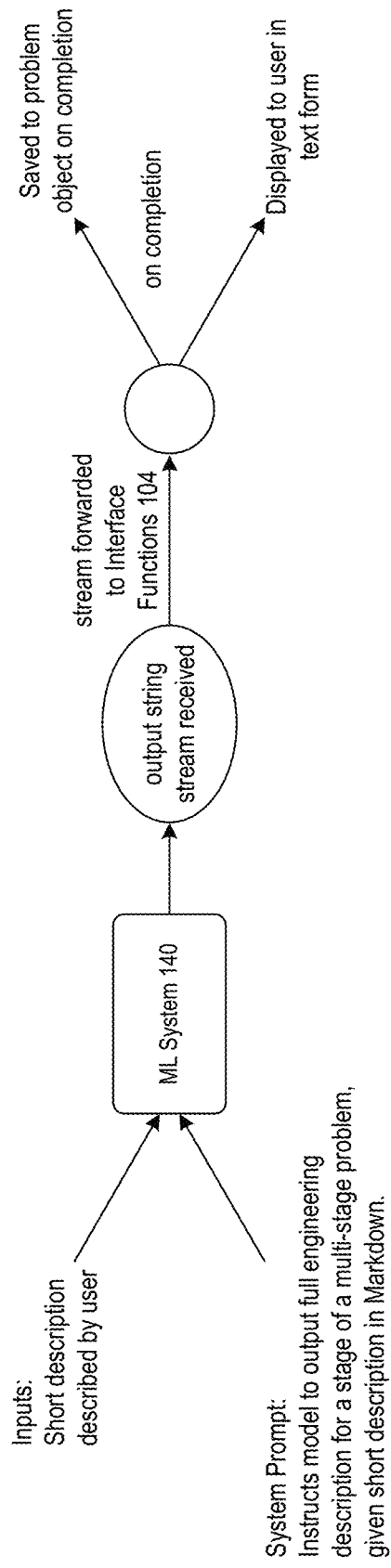

At 508, once a problem idea (e.g., a short description of a test problem idea) is selected, the data processing system 102 can implement the short description of the problem idea into a full-fledged field-specific test problem 226. Implementation of a problem idea into a field-specific test problem 226 can include one or more operations. As shown in FIG. 7, the data processing system 102 can create a complete engineering description for the selected idea. For instance, the administrator interface 106 GUI can generate or display a full description (e.g., test problem 226) listing a general problem description, list any inputs and expected outputs and identify any constraints for the test problem 226. This can be done by making a singular call to a large language model that is tasked with creating the full description, streaming back the response to the end user as it is generated. The data processing system 102 can task the ML model system 140 using one or more system prompts 222 that can describe the preferences or selections for generating the test problem 226. FIGS. 33-34 illustrate examples 3300 and 3400 of flow diagrams of operations that data processing system 102 can take to generate the full engineering description of the test problem.

In one example, the preferences of the output problem can include requesting or prompting the ML model system 140 to create a story-like problem, which can increase the probability that the output description can match the initial domain description provided by the user along with the initial problem description that was provided. Such prompts 222 can include a request for the words "implement a function" within its description text, which can allow for a consistent and useful call-to-action in the problem descriptions generated by the engine. A prompt 222 can also request or state that the model steers problems into having the user implement a function given a predefined header, which can fit a particular set coding assessment architecture of the shell or format used by the data processing system 102 for testing or drafting computer code.

In some implementations, aspects of the description and corresponding problem created by the engine may not fit the architecture of the function. In such instances, the shell or format the assessment system can include additional interfaces which the candidate can act (e.g., a frontend editor). Once the shell in such embodiments supports these mediums, the test problem generator 220 can allow for additional domains of test problems, and the type of test problem can be included in the description generation process, sourced from a user input or otherwise.

The prompt 222 with the problem description that is sent to the ML system 140 can seek the inputs and outputs from the data processing system 102 to be well formed and defined, which can assist with the rest of the engine process. The description can be returned by the ML model system 140 via a JSON object that can then be parsed at time of completion. The test problem generator 220 can handle parsing errors or issues by doing expression operations on the output string, as desired, to transform the description into a usable form.

At 510, after the test problem 226 (e.g., the problem description) is completed, the test problem generator 220 can transition to creating the boilerplate 224 to provide to the client candidate as a starting point for the client's (e.g., test taker's) solution. The boilerplate 224 can include libraries, data, initial portion of the problem setup or inform the candidate of the test problem desirable format. In an example, the boilerplate 224 (and later the candidate solution 208 or client solution 212) can be written in Python, although other languages or tools and settings can be utilized. The option can be presented to the employer staff to extend the solution to other languages, as languages can be changed based on user preference.

Figure 35:
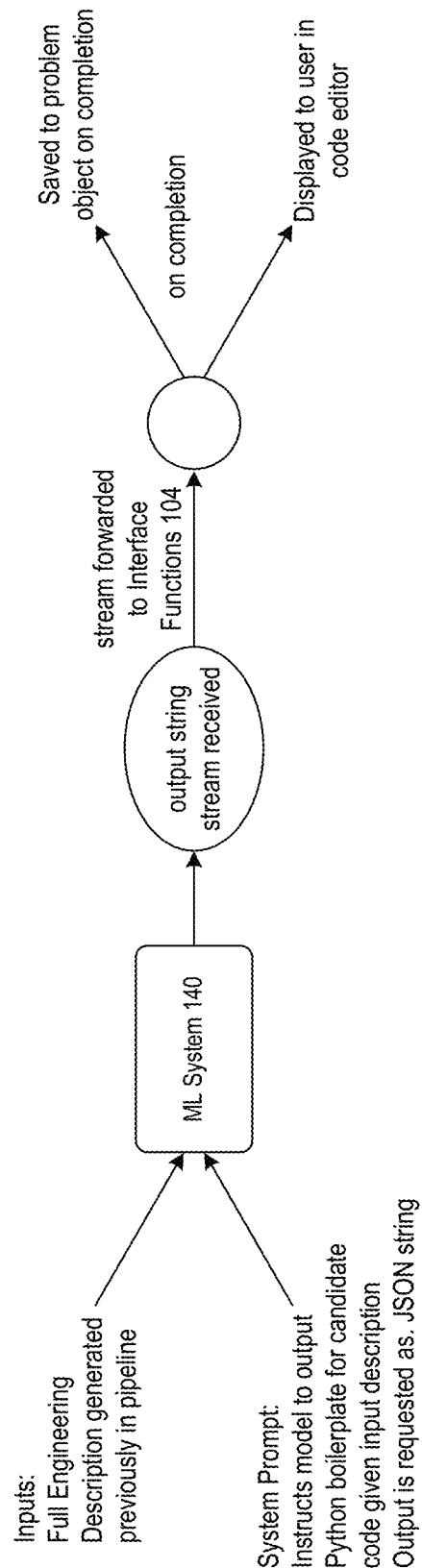
FIG. 35 illustrates an example of a flow diagram of operations that a data processing system can take to generate a boilerplate computer code for a test problem.

The boilerplate 224 can be created by a large language model that is provided with the engineering description created above and a system prompt as inputs. The system prompt can instruct the model to create a Python boilerplate for the input description. In the majority of cases, the generated engineering description can include a problem boilerplate 224, in which case the boilerplate model (e.g., ML model 142 for a boilerplate generation) can generate the boilerplate 224 from the description text, such as the boilerplate 224 of FIG. 7 generated for a full description text of a test problem 226, such as the full description of example 700 in FIG. 7. In cases in which the boilerplate 224 is not included in the generated test problem 226 description, the ML model system 140 can create a boilerplate 224 that corresponds to the listed inputs and expected outputs. The boilerplate 224 can be streamed back to the frontend (e.g., interface functions 104), as it is generated. FIG. 35 illustrates an example 3500 of a flow diagram of operations that the data processing system 102 can take to generate a boilerplate 224.

Figure 36:
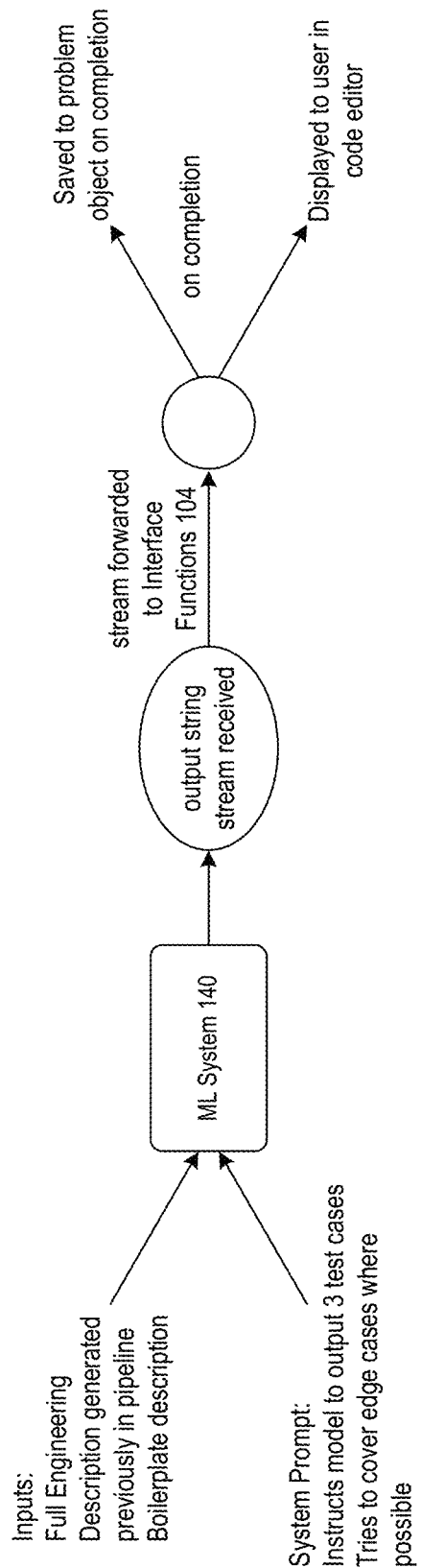
FIG. 36 illustrates an example of a flow diagram of operations that a data processing system can take to generate test cases for a test problem.

At 512, the ML model system 140 can generate one or more test cases 204 based on the created boilerplate 224 and the test problem 226 (e.g., problem description such as the one at FIG. 7). Test case 204 can include actions used to verify a specific feature or functionality via software testing. The test case 204 can include the steps, data, prerequisites, and postconditions used to verify a feature or an aspect of the computer code of the technical solution. This process can be executed by the data processing system 102 using one or more large language models of the ML system 140. FIG. 36 illustrates an example 3600 of a flow diagram of operations that the data processing system 102 can take to generate test cases 204.

The data processing system 102 can provide an ML model 142 with a created test problem 226 (e.g., the description) and a boilerplate 224, which can be used as inputs into the ML model 142, along with a system prompt. The data processing system 102 can utilize a test case generator 202 to provide prompts that can instruct the ML model 142 on the expected form for the test cases 204. The prompts 222 or instructions can include a list of JSON objects, where each object can include a test case 204. Such one or more JSON objects can include inputs and expected outputs that correspond to the given test problem 226 and the boilerplate 224. The test cases 204 generated by the test case generator 202 and the ML model system 140 can be shared between one or more languages eventually supported by the created problem. Accordingly, the generated test cases 204 can be limited by the number of constructs that can be utilized. For example, particular features, such as tuples can be excluded from generation as such features can utilize additional effort to be handled correctly in the different supported languages. An example implementation can allow constructs such as tuples to be used by providing functions configured to handle the constructs when running candidate code against the test cases.

At 518, the test case generator 202 can utilize one or more ML models 142 to generate all of test cases 204, which can be streamed back to the front-end (e.g., interface functions 104) for the end user upon their completion. For instance, the LLMs (e.g., 142) of the ML system 140 used by the data processing system 102 can take various time intervals to complete generating of the test cases 204 for various test problems 226.

In some examples, quick or timely generation and validation of the test problems 226 and the corresponding candidate solutions 208 using test cases 204 can be desired. In such instances, it can be beneficial to perform test case generation, candidate solution generation and candidate solution validation using test cases, all in parallel. The data processing system 102 can include a parsing strategy developed to extract each test case 204 from the test case generation as it is ready (e.g., once a single test case 204 is generated). In such instance, the single generated test case 204 can be used for the single generated candidate solution 208 (e.g., at 516) to save time, while other test cases 204, candidate solutions 208 are being generated. In doing so, the data processing system 102 can allow the user to more expediently receive the test problem for the solution testing.

Generating test cases 204 at 512 can be done using tokens. As each token generated by the LLM of ML system 140 can be returned to the front-end application (e.g., interface function 104), the data processing system 102 can add such tokens to a string that stores one or more received tokens. The data processing system 102 can display the updated string to the user, and simultaneously parse the resulting string to identify if a "valid" test case 204 has been produced in the resulting string. For example, the SETE 122 can perform this operation by attempting to parse the entire string. To the extent errors or issues are encountered in such an operation, the test case generator 202 can run expressions against the current string to identify a valid test case 204 object. For example, if the technical solution fails the parse, then the solution can iterate through the characters of the current string to look for open bracket characters and close such open bracket characters. Each time the assessment system finds an open bracket in a string, test case generator 202 can increment a counter, and each time it finds a close bracket, it can decrement the counter. When the counter iterates above 0 and then returns back to 0, test case generator 202 can determine that the test case is likely a valid test case 204. When such events occur, the test case generator 202 can consider the subset of the result string where the first open bracket and last close bracket occurred, inclusive, and attempt to parse the substring.

Figure 37:
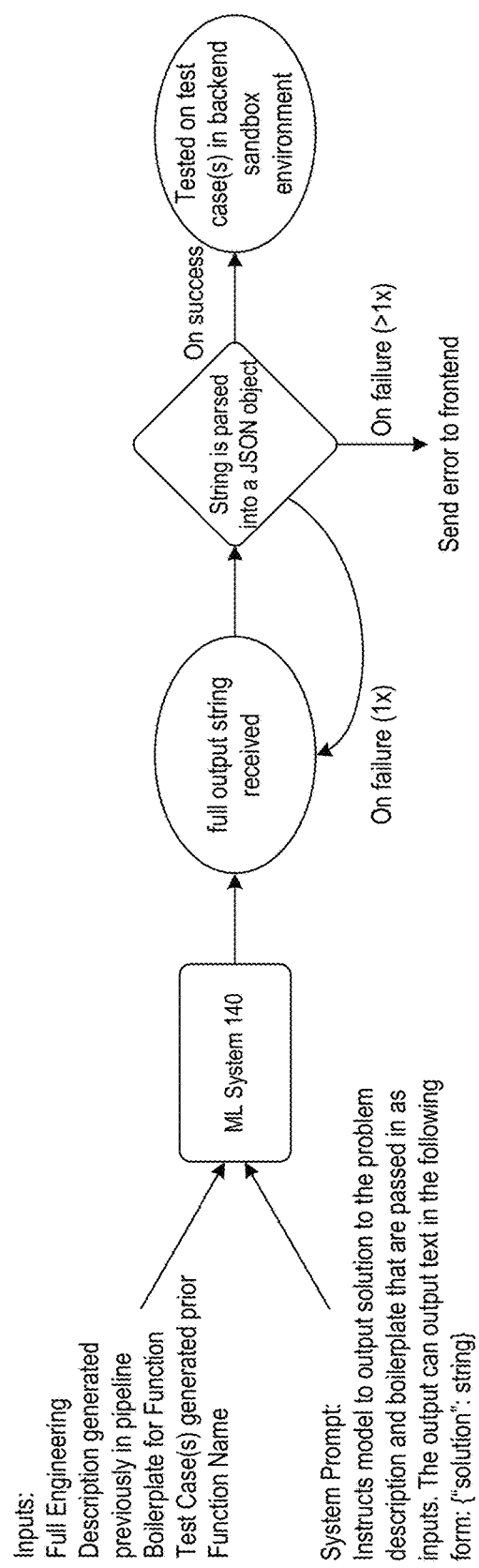
FIG. 37 illustrates an example of a flow diagram of operations that a data processing system can take to generate a candidate solution for a test problem.

At 514, the method can generate a candidate solution 208 when a first test case is successfully generated. For instance, if the test case generator 202 can automatically parse and find a valid test case 204, then the process can utilize a candidate solution generator 206 to generate a candidate solution 208. If the assessment system encounters errors or issues in parsing a valid test case 204, the process can wait for the test case 204 generation to complete and proceed to the solution stage with the entire list of generated test case objects. When test case 204 construction is complete, test cases 204 can be displayed to the user in a form of an administrator interface 106 that is similar to example 900 illustrated in in FIG. 9. As shown in FIG. 9, test cases 204 can be provided in order, such as test cases 204A, 204B and 204C, each of which can include one or more inputs and outputs that can be used for testing the candidate solutions 208 (e.g., or later client solutions 212). FIG. 37 illustrates an example 3700 of a flow diagram of operations that the data processing system 102 can take to generate a candidate solution 208.

At 514, the solution generation process can include verifying that a candidate solution 208 created by one or more large language models of the ML system 140 passes one or more test cases 204. By passing test cases 204A-C, the candidate solution generator 206 can determine that the computer code of the candidate solution 208 is semantically correct. Such validation or verification can be implemented using, for example, an iterative process, such as the one discussed below.

For example, a candidate solution generator 206 can use an ML model 142 (e.g., large language model) of the ML model 142 to extract a function name from the generated boilerplate 224. This task can be used to allow for the candidate solution 208 to use the same function name in its function signature and also allow the data processing system 102 to extract the same function name from the generation process, as the function name is to be stored in the problem object to be served on the solution's shell platform. This process can use the boilerplate 224 as an input along with a system prompt 222 instructing the LLM to output a JSON object that includes the function name. The data processing system 102 can then parse this output in the backend and record the function name.

After the function name is extracted, the problem creation engine can send the test problem 226 (e.g., problem description), boilerplate 224, and one or more identified test cases 204 (e.g., all test cases) to the large language model of the ML model system 140 as inputs. Along with these inputs, the candidate solution generator 206 can send a system prompt instructing an ML model 142 to create a candidate solution 208. The candidate solution 208 can be provided by the ML model 142 (e.g., LLM) via a JSON object, which can then be parsed by the data processing system 102. Depending on the implementation, computer languages or other software can be used as the default system tools to be used for the candidate solution 208 and the boilerplate 224 to be proposed to the client candidate.

At 516, after the technical solution is generated and extracted, the SETE 122 (e.g., test problem creation engine) can verify that the candidate solution 208 is correct for the given test problem 208. At this point, the SETE 122 can create a single string with a universal instruction prefix or code, such as the "universal Python prefix", which can be shared and placed as a prefix on one or more specific code or software tools used (e.g., Python code) before execution of the code in a sandboxed execution environment. After the Python prefix is fetched, the SETE 122 can append the LLM solution to the string. The SETE 122 can then fetch the universal instruction or code (e.g., universal Python suffix) and passing the aforementioned function name as a parameter. Such suffix can be similarly inserted universally on Python code run in the assessment system's sandbox environment. The code can then be complete to be run in the execution environment, along with the aforementioned test case object passed into the execution environment as an argument. The problem creation engine can then wait for execution to complete (e.g., execution time can be capped to a maximum of 10 seconds). Once execution returns, the problem creation engine can consider the results, and one of several next actions can occur.

At 518, if the candidate solution 208 had passed one or more input test cases 204 (e.g., thereby being validated), then the candidate solution 208 can be passed back to the frontend to display to the user, along on a message of how many test cases 204 were run. For example, if the SETE 122 was able to successfully parse the first test case, then just one test case was run. In some instances, the threshold issue of validation can include running all of the test cases 204 (e.g., three, four or whatever the number may be).

At 520, the method can verify if a candidate solution has been generated. For instance, in the event that all test cases arrived prior to generation of a first candidate solution 520, the process can trigger the candidate solution generator 208 to generate a candidate solution at 522. Once a candidate solution is generated at 522, the candidate solution and the test case can be sent to operation 516 to run the test case 204 against the candidate solution 208.

At 524, the method can run test cases against a prior candidate solution 208. For instance, if a candidate solution 208 has passed one or more prior test cases 204, the process can run the next candidate solution 208 against this candidate solution. If just one test case was run, then the solution section can wait for test case generation to complete. For example, once all test cases complete, the backend service can append the Python prefix and suffix to the generated code and run the resulting code against all test cases in the sandboxed environment. For example, if all test cases pass (or the original pass included all test cases), then the SETE 122 can complete validation of the test process as its generation process and the test problem can be ready to be added to the user's problem library (along with more options, discussed later).

At 526, if all test cases 204 are successfully run against the candidate solution 208 and the candidate solution 208 and the test cases 204 are all successfully tested, then the solution can be displayed back to the user (e.g., administrator). For instance, a prompt 222 with an indication about the successful validation of a candidate solution 208 for a test problem 226 can be displayed. At 528, the prompt 222 can include a request or an offer to include the candidate solution 208 into a data structure 242 of the test problem 226 and the candidate solution 208 for future client candidate testing. FIG. 32 illustrates an example 3200 of a GUI display of a table of information on the working solution that can be presented to the administration. The table of the working solution can identify the problem identifier, duration of the test and the test stages 236.

At operations 530-532, if the solution does not pass all test cases, or the solution did not pass the first test case, then the candidate solutions generator 206 or the test case generator 202 can attempt to debug the generated content (e.g., candidate solution 208 or the test cases 204) that were created up to this point in the process. The SETE 122 can debug the test cases 204 (e.g., at 532) or debug candidate solutions 208 (e.g., at 534) by inspecting multiple parts of the generation process, both with respect to the test cases, and the candidate solution. As either the test case 204 or the candidate solution 208 produced by the LLM may be incorrect, SETE 122 can perform one or more tests to identify which of the test case 204 or the candidate solution 208 is faulty.

Figure 38:
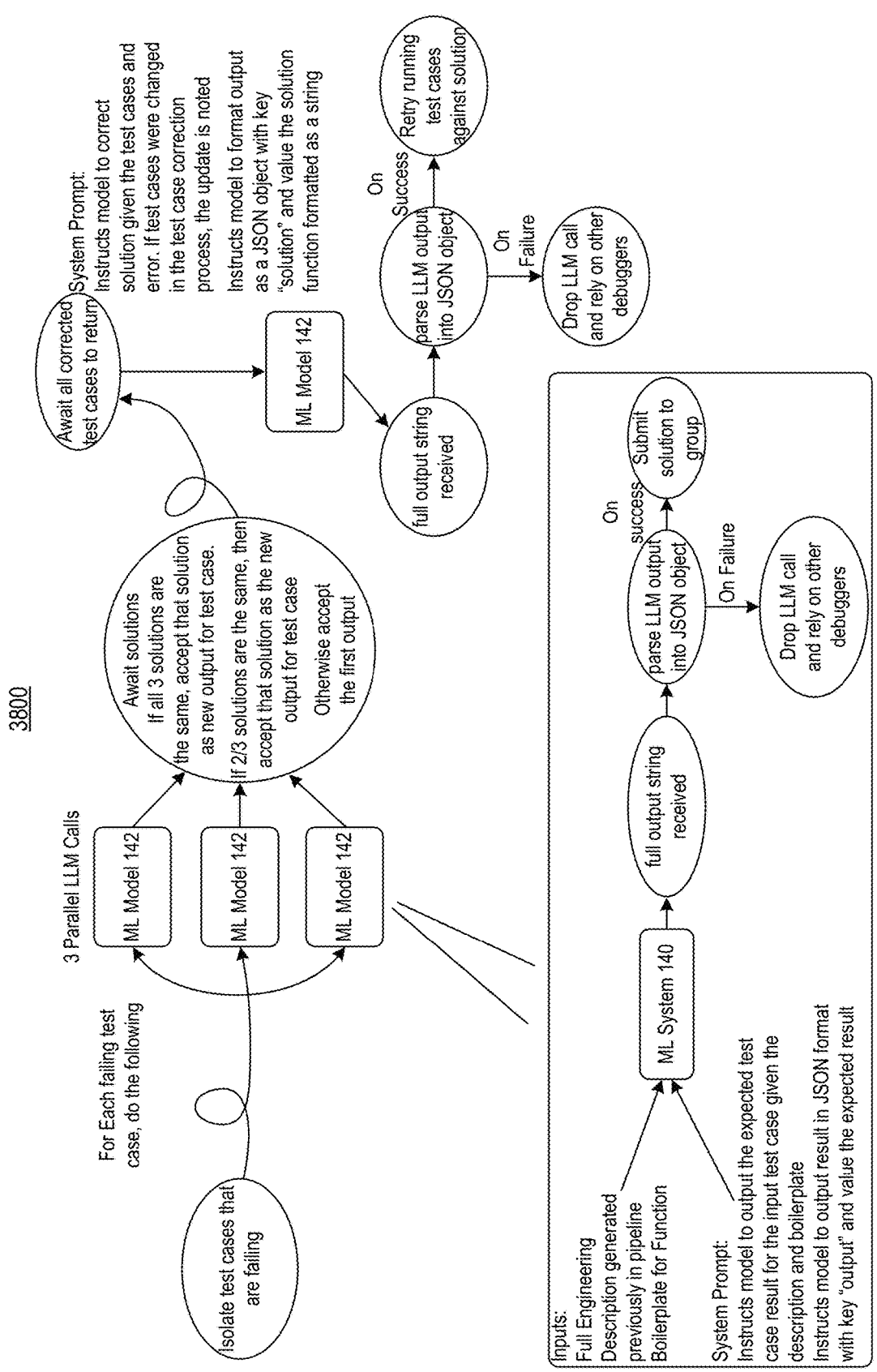
FIG. 38 illustrates an example of a flow diagram of operations that a data processing system can take to debug failures with respect to the test cases.

At 532, a series of API calls from the test case generator 202 to ML models 142 can be used to verify the correctness of the generated test cases 204. FIG. 38 illustrates an example 3800 of a flow diagram of operations that the data processing system 102 can take to debug any failures with respect to the test cases 204. For each test case 204, up to the current point in the process, an API call to an ML model 142 can be used. For instance, three parallel LLM calls can be used. The inputs to such an LLM call can include the data structure 242, which can include the test problem 226 (e.g., description), the generated boilerplate 224, and the inputs of the relevant test case 224. Alongside these inputs can be a system prompt instructing the ML model 142 to return the expected output for the input in this case. The ML model 142 output can be then parsed and compared to the originally generated output for each test case. If the two output values match, then the test case can be considered "safe" and valid. If the labels do not match, then the newly generated label can be recorded and set as the output for the relevant test case. The original solution can be then run against these test cases and the process repeats up to k iterations (In an example, k=2).

At 530, if all generated test cases 204 have been marked as valid or altered, a new candidate solution 208 can be generated using a same or a similar system prompt 222 and same input types as with the prior candidate solution 208. The same candidate solution 208 can be then evaluated against the same test cases 204 or against the new test cases 204. The SETE 122 then can extract the LLM solution and test it by running, for example, the previously described code execution process. If the candidate solution passes, then the SETE 122 can return the candidate solution to the user at the administrator interface 106.

If there is an error (syntax, runtime or otherwise) during the execution process, the error can be recorded and then sent back to a "debugging" model, along with the problem description and attempted solution. The attached system prompt instructs the LLM to act as a debugging tool and to fix the original mistake. For example, if there was no error but not all test cases pass, a similar process can be followed with the debugging model, except instead of the error stack trace, the failing test cases are passed into the model.

At 534, the data processing system 102 can determine that a test problem is erroneous and provide a notification that the test problem and solution generation was not successful. For example, the process can continue a set number of "i" times (e.g., i=3 times). If the threshold i is exceeded for the number of attempts to debug the test case 204 and the candidate solution 208, and yet the attempts remain unsuccessful, then at the latest attempt, SETE 122 can return to the user at the administrator interface 106 a notification of a failed state, as shown at 536.

In some implementations, the user can restart or retry any section (description, boilerplate, test cases, or solution) at any time. For instance, when a section is retried, all data at and after that section can be removed and the process can restart from that current section.

Figure 10:
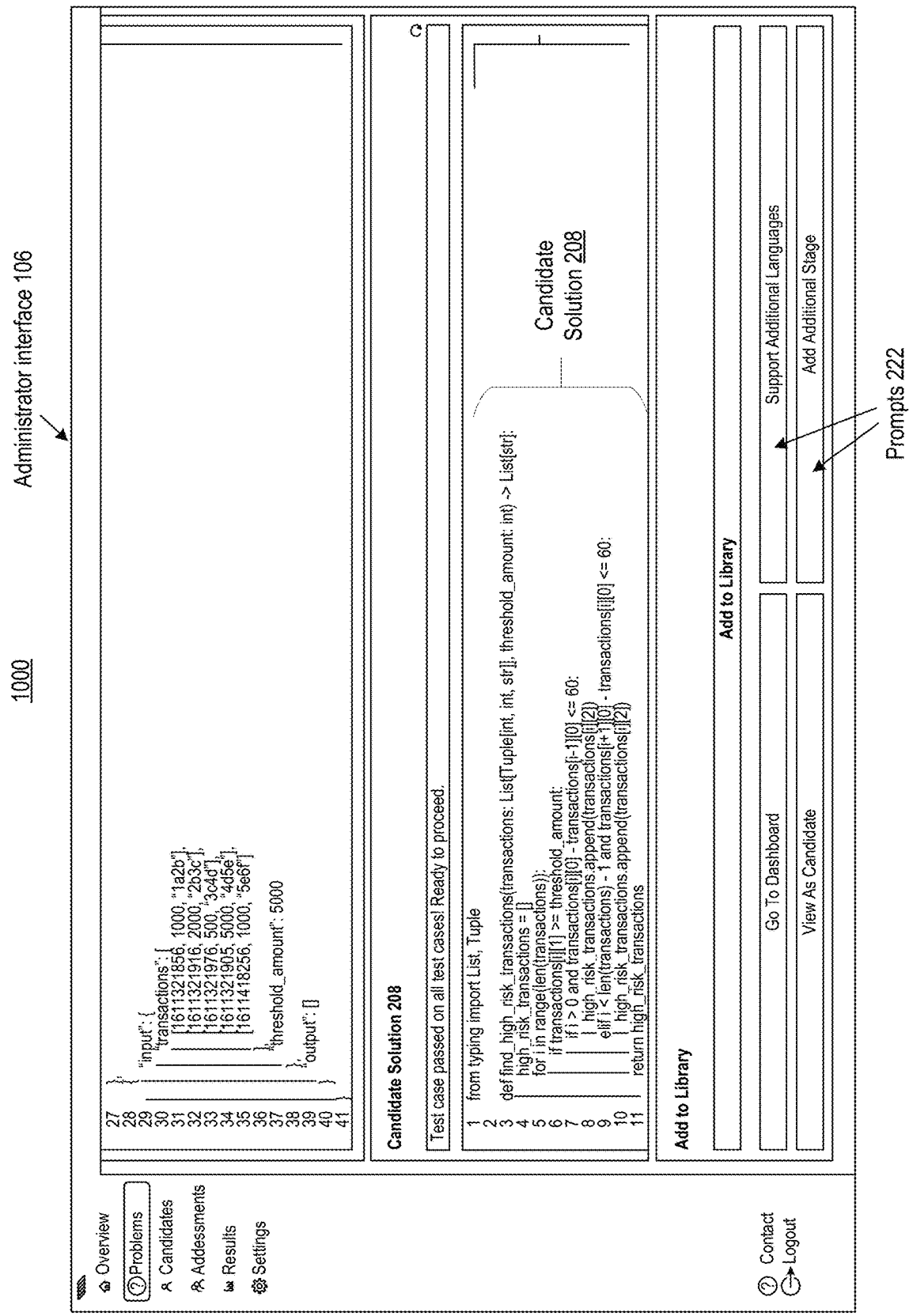
Figure 11:
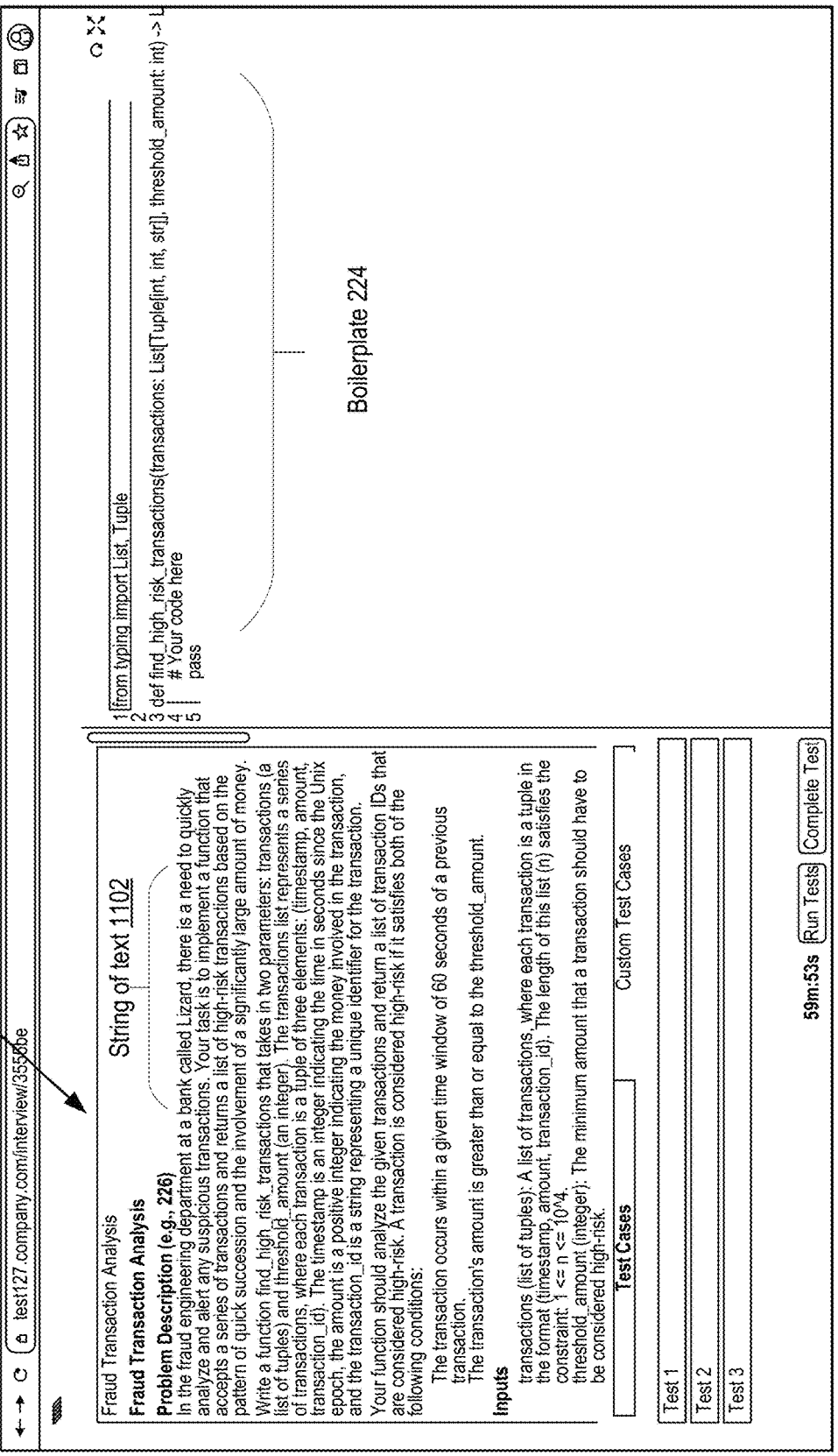
Figure 12:
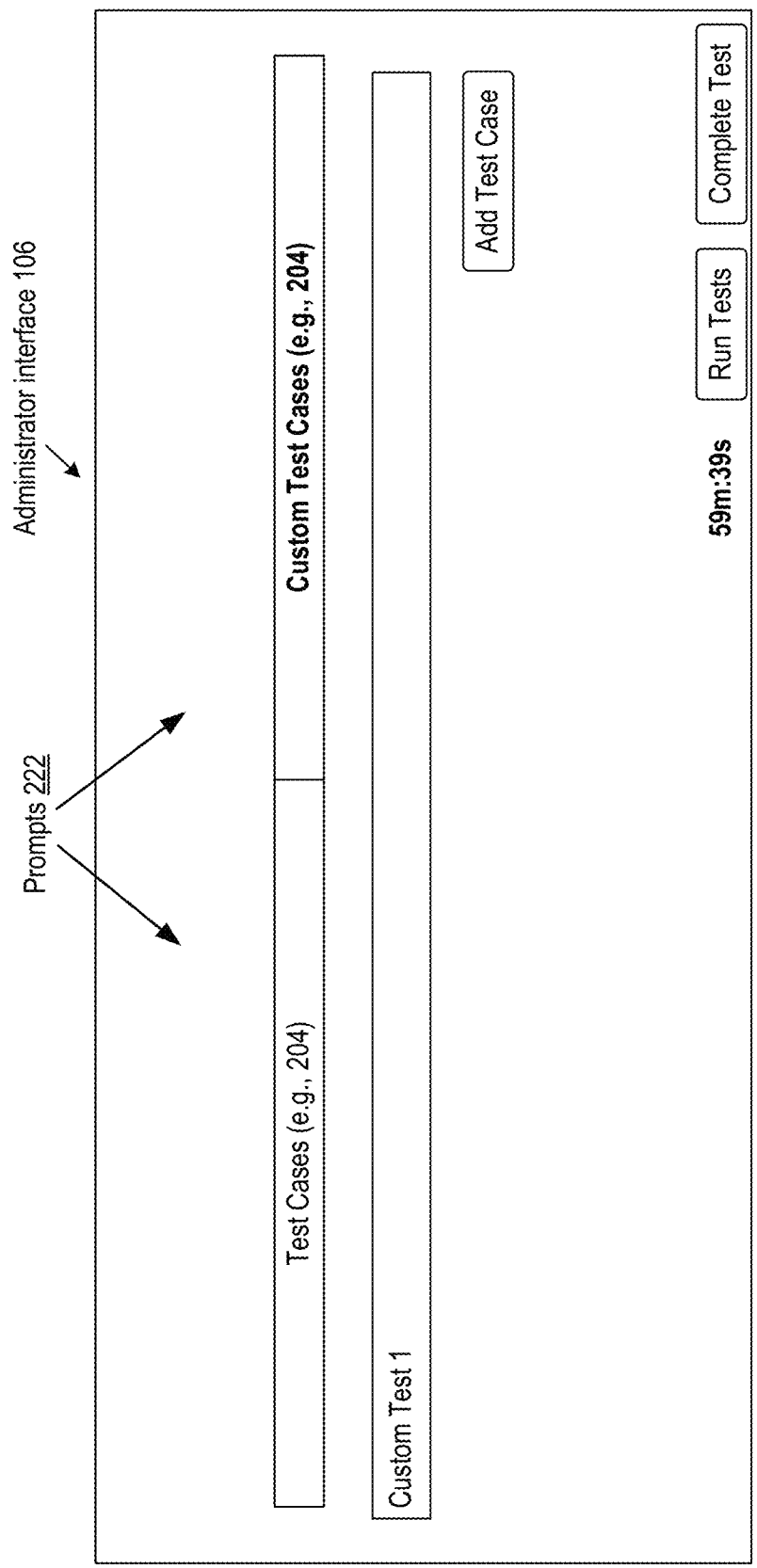

After the problem is completed, the TAE 120 can offer a variety of prompts 222 of next steps for the user to further assist with test problem generation. The completed problem can be saved to a library of solutions. Examples of ML generated test problems 226, boilerplates 224 and test cases 204 are illustrated in examples 1000, 1100 and 1200 of GUI examples of administrator interface 106 or reporting interface 108 in FIGS. 10, 11 and 12. At FIG. 10, example 1000 of a GUI of an administrator interface 106 can provide a candidate solution 208 along with the computer code. The GUI can provide an indication that the test cases were passed, along with a prompt 222 to add the candidate solution 208 to the library of data structures 242. At FIG. 11, example 1100 of a GUI of an administrator interface 106 can provide prompts 222, such as a detailed problem description (e.g., test problem 226) and a boilerplate 224 for the test problem. Prompts 222 can prompt the user to proceed with running tests using test cases 204. At FIG. 12, example 1200 of a GUI of an administrator interface 106 can provide prompts 222 for the user to run ML generated test cases 204 or custom design a test case 204 to complete the testing.

One operation offered by the data processing system 102 after the initial generation of the problem can be the ability to support the problem in more than one programming language. If the user wants to select more than one programming language, the solution can display a popup (e.g., 222) that lets the user pick which additional languages they wish to be supported. Once those languages have been chosen, the information can be then relayed to the backend service, where the problem generation engine picks up the task. The problem generation engine works in parallel for each additional language selected by the user.

For each language, the SETE 122 can first use a boilerplate translation LLM (e.g., ML model 142) to create a new boilerplate in the relevant language. The original boilerplate 224 (In an example, created in Python) is passed into the ML model 142, along with a system prompt instructing the model to translate the boilerplate 224 into the desired programming language. The ML model 142 can output the results in a JSON format, which can be then parsed to extract the new boilerplate 224.

After the new boilerplate has been created, the solution generation process discussed in connection with FIG. 5 can be engaged and run using the new programming language. The same debugging and iterative process can be followed for each of the operations in different languages. A difference can be that the presentation of this process to the user in the frontend may be altered. The correct solutions can be relayed back to the frontend generation (or the retry threshold is exceeded, which can be then flagged to the user). This process allows for smooth support for the assessment system's employer staff to create custom problems in a variety of languages.

The data processing system 102 can give the user the ability to generate synthetic results for their newly generated custom problem. This can be done by synthetically mimicking a client candidate's attempt to solve the problem, and then passing the signals into the results process of the assessment system to describe more extensively how these signals are generated. The data processing system 102 can create two types of synthetic results: a positive result and a negative result. The positive result features the case when the candidate creates a correct solution. The negative result features the case when the client candidate fails to find the correct solution. In some embodiments, data processing system 102 can provide different types of results beyond these two example options. For instance, the synthetic results can be created in Python, and this can be changed to a different language, depending on implementation.

The process to create synthetic results initially creates an attempt at solving the problem. In the positive result case, the previously generated solution can be used as the initial attempt. In the negative result case, a large language model can be used. The model can be given the input of the problem description and boilerplate, and the system prompt instructs the model to write a clearly incorrect solution to the given problem. The output can be delivered in JSON and processed by the assessment system to extract the requested output.

The example process can iterate over the solution character by character to produce snapshots, which are used by the result system. For each character, a snapshot can be appended to a list, where each snapshot holds the code written to that point along with a corresponding timestamp. The synthetic timestamp can be created by adding 400 ms to the previous snapshot time. The timestamp generation process can be more complex to more accurately mimic the candidate's software development process. This group of snapshots can be then sent into the results process to generate synthetic results, which are displayed to the user.

In an example, the above problem creation process 500 can be used to generate asynchronous assessments served on the data processing system 102 platform. The data processing system 102 could be used to generate problems that can be delivered in live interviews, such as for example, generate and provide processes in real-time and during an ongoing test. In an example, the data processing system 102 can create algorithm-related problems that have a function header and standardized inputs and outputs. For example, a surrounding platform can support serving algorithm-based questions. The platform can be modified to support different mediums of problems, including but not limited to, frontend modules, data science questions and other fields. In various implementations, the data processing system 102 can be used to cover these non-technology test problems, such as test problems in medicine, business, law, or any other field. The core engine of creating relevant problems, writing tests and solutions to those engineering problems can be used, along with LLM validators to check the initial work done (and fix issues if preferred) is a novel concept and translates to these other domains.

C. Testing and Evaluation of Dynamically Generated Multi-Stage Test Problems

The technical solutions can include the functionality to generate and validate multi-stage (e.g., dynamic) test problems and their corresponding solutions for multi-stage client candidate testing. Dynamic test problems can include a plurality of test problem stages 236, each one having one or more test problems 226, potentially related to the test problems in preceding stages. The data processing system 102 can provide a test manager 230 with a stage selector 232 to select individual test stages 236 to serve to the client candidate (e.g., test taker) based on the performance of the client candidate in the preceding test stages 236. The technical solutions can facilitate the selection of upcoming test stages 236 based on the preferences of a test provider (e.g., enterprise admin) to test any particular skill or field at any particular difficulty level, as desired. In doing so, the technical solutions can allow the test provider to test client candidates for particular skill sets and particular skill levels, while also allowing for satisfaction of testing time-related constraints (e.g., to select test stages 236 based on the amount of remaining test time). The test problem stage selections can be implemented in an automated fashion (e.g., without a human intervention), allowing for a machine generated, fully customized and fully automated multi-stage testing process in which tested subject matter can be adjusted according to the client candidate performance or test provider's preferences, during the course of the test. In some implementations, the client candidate may perceive the multi-stage test as a single ongoing process, which in fact is a multi-stage test that is dynamically adjusted according to the results of testing as the evaluation proceeds.

Automatically generating multi-stage computer coding test problems with stages selectable based on the client candidate performance can be a challenge. Manual test problem creation and serving to client candidates falls short for several reasons. Analyzing client candidate performance and timely generating next stage test problems can be time consuming and not achievable within an ongoing testing time. Moreover, if a client candidate performs well in a prior test stage, such as by solving a first stage of a multi-stage test problem correctly and in a short time, the client candidate can be unable to showcase remaining potentially valuable skills to the test provider. For this reason, manual tests often fall short of testing the entire scope of the client candidate's abilities. In addition, when a client candidate performs poorly in a prior test stage, the test can fail to cover some other tasks or fields in which the candidate might excel, which also fails to reveal to the test provider the entire scope of the client candidate's abilities. In addition to being limited to only a set range of tasks that they can test, these manual solutions, when implemented on computing stations, are also compute and resource intensive as they take additional computational resources and steps to complete, while also being incapable during-the-test adjustments to the scope of the test, based on the ongoing client candidate performance.

Using ML models to create multi-stage test problems and solutions is challenging due to various ML-related performance issues, such as hallucinations and drifting, which result in inaccurate ML outputs and unreliable results. These performance issues can trigger additional computational steps, adding to computational and energy inefficiencies of the system, in addition to adversely affecting the user experience. To overcome these challenges, the technical solutions can employ validity conditions for testing or validating the test problem stages to increase the accuracy and reliability of the ML-based determinations in analyzing the computer code generated by the client candidates during the testing process and more accurately assessing the client candidate skills. Using these techniques, the data processing system 102 can accurately assess the performance of the client candidate during the testing process, allowing for a more meaningful selection of the next test stage test problems based on the more accurate client candidate performance in the prior stages. In doing so, the technical solutions can improve both the quality and the scope of the client candidate testing, while also improving the reliability and accuracy of its determinations, while also increasing the computational and energy efficiencies of the system.

The dynamic problem can include a series of stages, where each stage can be operated separately by the data processing system 102. Each stage can be processed as an individual test problem 226 with its own test cases 204, boilerplate 224, prompts 222 and candidate solutions 208, each of which can be stored into a data structure 242 of one or more data structures 242 of a multi-stage test problem. At the conclusion or in the midst of an ongoing test of each test stage 236, the technical assessment engine 120 can analyze the results of the stage and make a determination of which, if any, test stages 236 to pursue for the remainder of the testing period. Information available to the TAE 120 can include detected observations, such as actions (e.g., keystrokes or user selections) captured or AI-driven observations of the candidate's behavior, methodology, approach, and success in pursuing such stage.

For instance, the technical assessment engine 120 can generate each test stage 236 of the multi-stage test problems 226 in the same way as generating individual (e.g., static or a single-stage) test problems 226, as discussed in connection with example flow diagram 500 of FIG. 5. When an admin completes the creation of a first test problem 226, the admin can extend this test problem 226 to multiple test stages 236, to make the test more adjustable and dynamic. For instance, when dynamic problem creation begins, initial prompts 222 provided to the admin interface 106 can be same as prompts 222 at the start of the single-stage test problem creation discussed in the example flow diagram 500 of FIG. 5. The admin user can receive an input bar asking for a domain or a suggested field in which to create the test problem. If a static problem was created with a certain set of assumptions, a follow up can include continuing with the same assumptions, dropping one or more of the assumptions or adding an additional type of input. As in a single or a static test problem (e.g., a single stage), the admin user can have the ability to request a certain computer science topic be tested by the assessment. The user can select one of the options, write in their own concept, or allow the data processing system 102 to select for them via the preference of the large language models used in the idea generation process.

Depending on implementation, a desirable feature of the design of dynamic problems served can be the concept of reusing the function header of a previous stage. This can be utilized when the client candidate is expected to expand on their existing code for the function that was solved in a previous stage, or instead if the client candidate should be provided with a new boilerplate 224 to complete a new function. Either type of a test problem or a question can be created in the context of dynamic problems. In an example, the data processing system 102 can request that an admin user to select either to reuse the existing code of the previous stage, or to not reuse the same code and pursue a new starting point. In an example, this selection can be made automatically by the data processing system 102.

Once these inputs have been selected, the admin user clicks the submit button, such as in examples discussed in connection with FIGS. 6-12. For instance, the SETE 122 can use the ML system 140 as in the example flow diagram 500 of FIG. 5 to create three algorithm problem ideas for the admin user at the administrator interface 106. There can be variations in the inputs to accommodate the user choices described above as well as provide the context from the previously generated static problem (which can be herein referred to as a "stage"). The system prompts 222 in the admin interface 106 can instruct the model to specifically create follow-ups for the input problem, which can allow the data processing system 102 to provide reasonable follow up ideas to the admin user. Once the admin user selects a short description of the problem idea that they desire to pursue, the SETE 122 can follow create the full engineering problem as described in connection with FIG. 5. Variations to the process can include the case where the user wishes to use the previous function as the base code for the current stage. In such instances, the data processing system 102 can run additional verification, via candidate solution generator 208, to test that the same function header can be used for the upcoming stage.

In some instances, there can be a preference that any languages that are supported for one stage of a dynamic problem can be supported for all stages of a dynamic problem. This can be fulfilled before a dynamic problem created by the custom problem engine can be added to the user's library. This process can continue until the user is satisfied with their dynamic problem. The system can include a binary setting for dynamic problems called check time complexity in which time duration of the processing of the client solution 212 can be used as a way to measure the efficiency of the computer code of the client solution 212. For instance, client solution 212 can be executed for a time duration which can be compared with the time duration of the candidate solution 208 generated by the data processing system 102 for the same test problem 226. Such settings, along with other problem settings, such as duration of execution, can be edited within the problem page in the platform.

Once an admin user adds a dynamic problem to their library, it can be then ready to be served on the data processing system 102 platform (e.g., via test manager 230) to candidates. The employer staff can have options to configure how test manager 230 will serve dynamic problems to client candidates. Related to the functionality of dynamic problems is also the ability of the data processing system 102 to assist candidates on completing the test stages 236 when the client candidates are not able to complete problems independently, such as by providing assistance during on ongoing test, as described, for example, in section F.

The data processing system 102 can act as a dynamic problem engine to generate, validate, and serve test stages 236 of a dynamic test problem 226 sequentially as the client candidate passes each stage. More specifically, the client candidate can begin the assessment with a first stage 236 of the dynamic problem. Depending on the implementation there can be no information on the following test stages 236, or the number of stages that are included within the assessment. In some embodiments, this information could be provided to the candidate to help them understand the full content of the assessment.

The test manager 2360 can utilize the client interface 110 to provide the test problems 226 to the client candidate during the test period. The client interface 110 can include a code editor application to allow the client candidate to generate the computer code for the client solutions 212 of the test stages 236. The client candidate can have the ability to run or validate the computer code of the client generated client solution 212 using the test cases 204 that are attached to the current test stage (e.g., stored within data structure 242 for the test problem). When the user successfully passes one or more (e.g., all) of the test cases 204 of a given test stage 236, the test manager 230 can use a stage selector 232 to identify or select additional test stages 236 for the client candidate.

The data processing system 102 can utilize, for example, SETE 122, TAE 120 or code evaluator 270 to evaluate the client solution computer code for a processing run time of the client candidate solution. For instance, a binary flag for a "check time complexity" can be checked or evaluated. If this flag is set to true, the data processing system 102 can be tasked with checking if the client candidate has achieved a predetermined (e.g., optimal) threshold runtime for the current test stage 236. The data processing system 102 can be aware of the given runtime threshold. For instance, during (or after) the test problem generation process, the data processing system 102 can determine the runtime of each test stage 236 in a dynamic problem. The runtime can include measuring a time duration of execution of the candidate solution 208 of each individual test stage 236 that has passed the test cases 204. The time duration of such candidate solutions 208 can be used as a benchmark time duration. If a client solution 212 executes within a time period that is shorter than the time period of the candidate solution 208, then the client solution 212 can be determined to be a superior solution than the one generated by the system. In some embodiments, time thresholds can be determined based on the time duration of executing the candidate solution 208 using test cases 204, such as a time duration that is 0.8, 0.9, 1.0, 1.1, 1.2, 1.3, or 1.5 of the candidate solution 208 runtime duration. In an embodiment, static (e.g., single stage) test problems 226 can be measured for time complexity even if not part of a dynamic problem.

Acceptable or optimal runtime duration can be determined by the data processing system 102 at the relevant time by making three API calls in parallel to LLMs of the ML system 140. Each call can be made with a high temperature setting, such as a temperature setting that is increased from that of other operations, such as generation of test cases 204 or test problems 226. The ML model 142 calls can each be provided the identical inputs and system prompts. The inputs to the ML models 142 can include stage description, test cases 204, and candidate solutions 208 or client solutions 212. The system prompt 222 can prompt the ML model 142 to return a JSON object that contains the runtime of the solution algorithm in a notation that can be recognized by the data processing system 102. For example, after one or more (e.g., all three) ML model 142 calls are complete, the data processing system 102 can parse their results and compare their outputs. In the case where one or more (e.g., all three) model calls are identical, that output can be used as the optimal runtime of the problem. In the case where the models disagree, if two of the three models returned the same answer, then that answer can be returned to the user. In the case in which all three models disagree with one another, the output of the first model can be used as the label. In an embodiment, a more complex operation can be executed to check the runtime of the model, including measuring the runtime across different input lengths. The calculated time complexity of the stage can be then displayed to the user within the problem page. The admin user can manually change the optimal time complexity if they would like to relax the constraints, or the calculated runtime is incorrect.

In the code editor at the client interface 110, if the check time complexity flag is on, the data processing system 102 can use a large language model to measure the time complexity of the current code. This can be done in a similar fashion to the process described above, although, based on implementation, a model call can be used to calculate the runtime, and that model's output can be treated as the label for the current runtime. While this calculation is occurring, the candidate can receive a loading prompt 222. For instance, if the calculated runtime is slower than the optimal runtime, the candidate can receive a prompt 222 alerting the client candidate that their algorithm is correct but that the solution can have an improved runtime. This can encourage the candidate to search deeply for a better algorithm to show off their skills.

When such a prompt is shown, the candidate can have the option to skip the time complexity check and proceed to the next stage. This allows the candidate to escape cases where the optimal time complexity for a problem was incorrectly computed or inputted incorrectly by the evaluator. It also allows the candidate to proceed to the next part of the problem if they are unable to find the optimal solution. If the candidate selects this option, their selection can be noted and later revealed to the evaluator in the results stage.

If the check time complexity flag is disabled, or if the candidate has already achieved the threshold (e.g., optimal) time complexity, or if the candidate skips the time complexity check and proceeds to the next stage of the question, then the test manager 230 can serve the following test stage 236 of the dynamic problem to the client. Test manager 230 can do so by fading out the prior description and streaming in the new description of the question for the user to read. Descriptions from previous stages can remain available to read by the candidate, if desired, or for reference.

In some implementations, each stage can have a flag on whether to produce a new boilerplate 224 or to use the existing code from the previous stage as a starting point for an upcoming test stage 236. If producing a new boilerplate 224 is selected, then the data processing system 102 can also stream in the new boilerplate 224 to the candidate. In some cases, the test manager 230 can continue to serve each test stage 236 sequentially until either the client candidate runs out of allotted time for the assessment (e.g., in which case the assessment automatically completes), or the client candidate passes all stages, in which case the client can receive an additional message alerting them that they've reached the end of the problem and can submit their assessment. In some implementations, the computer code from prior stages 236 can be not editable in subsequent test stages 236.

In some implementations, dynamic problem test stages 236 are not served in order. There can be some test stages 236 that are more desirable to use than other test stages 236, due to the type of subject matter that they cover or a level of ability that they can reveal. In some implementations, the data processing system 102 can allow the test stages 236 to be served directly to the user, regardless of order.

The data processing system 102 performs this using large language models that determine the priority ranking of each stage available to be served as it can be time to serve a new stage. More specifically, when a user completes a problem stage (and passes time complexity checks, etc.), the data processing system 102 can make a call to a large language model of the ML system 140. This call can pass in the remaining test stages 236, the current user code, and the time remaining as inputs. The call can include a system call that instructs the ML model 142 to choose the test stage 236 that is of the highest priority to serve to the candidate. The priorities can be set based on importance or selection of skills to test. The system call can instruct the ML model 142 to make this decision based on the variety of topics covered by the remaining test stages 236, the current perceived performance of the candidate (their quality of their code). In some embodiments, such a decision can be executed through other means, for example, the end user could create a mapping of priority for each stage available in the problem. For instance, the end user could create a "tree" of problems to serve the candidate based on their current performance, and the data processing system 102 can traverse that tree based on the candidate's performance in the midst of an assessment.

Also desirable to the problem selection process can be the ability to select the next stage of a problem given the user's test results. Qualitatively, the data processing system 102 can be tasked with identifying whether client candidate is proficient in programming in general, and also in which specific areas the client candidate is most adept. Dynamic problems can be desirable in this effort, as they can deeply investigate various skills in a specific area. For example, if a client candidate passes through database management challenges within a first minutes of an interview, it can be worthwhile for the solution to challenge the client candidate further in the area of database management during the testing process.

Test manager 230 can perform such skill-based selection of test stages 236 in an embodiment in which a test manager 230 can utilize an LLM to determine the following test stage 236 based on the skills covered in prior test stages 236 and the candidate performance in such test stages 236. For instance, inputs of such an LLM called within the backend service can include the details and test results of the previous test stages 236 passed, as well as the timestamps 216 marking time locations at which those tests were passed. The system prompt 222 attached to these inputs can instruct the ML model 142 to choose a remaining stage to present to the client candidate next, and that its choice should be rooted in diving deeper into a skill that the client candidate has proven proficient in. For example, the test manager can generate or attach tags or categories of what skills or fields are to be tested at each test stage 236 of a test problem 226 before serving the test problem to client candidates. This could improve the quality of selection by the decision model of the test manager 230.

In an embodiment, data processing system 102 can utilize identified sets of skills or field areas to test to create or generate test stages 236 (e.g., test problems 226) in which these skills or fields are particularly tested. This can allow the stage selector 232 to more easily make selections or decisions for test stages 236 to provide to the client. For instance, during test creation stage, SETE 122 can utilize ML models 142 and identified skills or fields as inputs to generate particular test problems 226 for the given test stages 236 to cover the given skills and field areas.

The ability to dynamically serve various test stages 236 can allow the data processing system 102 to test various skills of a client candidate more thoroughly. For instance, a client candidate testing can span from solely algorithmic questions to those involving frontend development, databases, data science and more. The current capability of the solution in this medium can be relevant, as the diversity of skills increases (e.g., a candidate can make a great front-end engineer, but can be poor in database management skills).

Referring now to FIG. 13, an example 1300 of a results data structure 1302 (e.g., current attempts table) for storing client candidate actions is illustrated. Results data structure 1302 can include any collection of results from a single-stage or multi-stage testing of a client candidate using a test problem 226. Results data structure 1302 can include results data types 1304, such as types of entries for particular client tests. Results data types 1304 can include identifiers of the attempt, latest code of the user, list of snapshots of the code, information on the test cases, actions taken by the user during test cases and others. Data entries 1306 can include detailed entries for the results data types 1304. Data entries 1306 can include, for example, snapshots of the client's computer code, information on the test stage 236, user identifier, timing information and other data. While a client is working on dynamic problems, the client's actions can be saved to a results data structure 1302, which can be updated throughout the test and stored in the data repository 160. The current attempts table can include, for example, one row for each interview and stage. These signals are then processed in the test results generation and assessment processes, such as those discussed in connection with Sections D and E.

Figure 14:
FIGS. 14-15 are examples of graphical user interfaces at a client interface function for generating test problems and candidate solutions.
Figure 15:
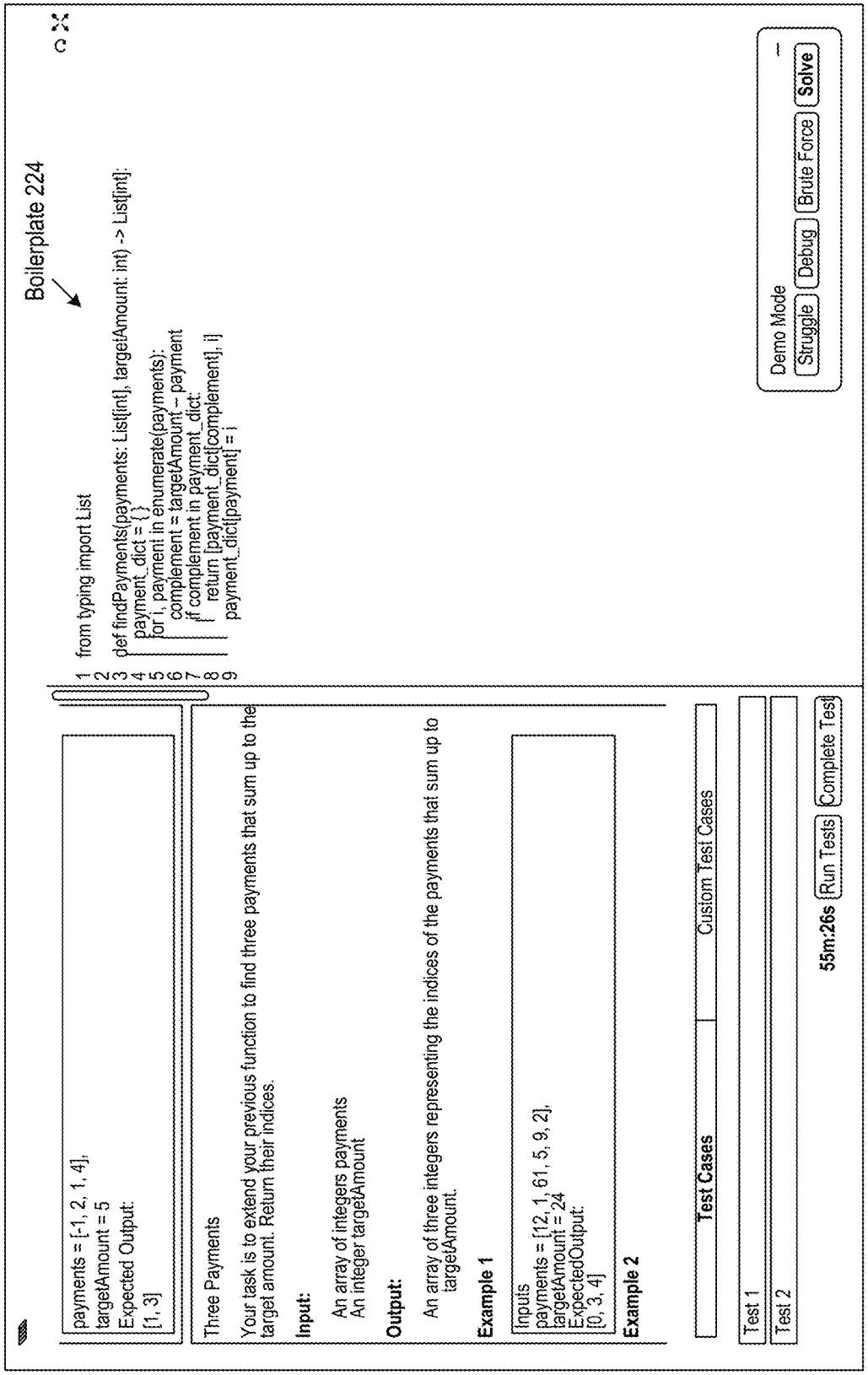

Examples of test stages 236 of multi-stage test problems 226 can be illustrated, for example, using an example GUI of a client interface 110 shown in FIGS. 14-15. In FIG. 14, an example 1400 of a client interface 110 GUI presenting a test stage 236 of a multi-stage problem is presented. The test stage 236 can refer to a preceding test stage 236 and identify inputs and outputs. In FIG. 15, an example 1500 of a client interface 110 GUI can present a boilerplate 224 for the test stage 236.

In one example, data processing system 102 can be implemented on one or more processors 310 of a computing environment 300 coupled with memory 315. The memory 315 can include instructions, computer code and data to trigger or cause implementation of operations of a data processing system 102 via one or more processors 310. The one or more processors 310 can be configured, via computer code, instructions, or data in the memory 315, to implement functionalities for generating, validating, and implementing multi-stage test problems 226.

The one or more processors 310 can be configured to provide, to a client device 132, one or more first data structures 242 for a first test stage 236 of a test problem 226 that can include a plurality of test stages 236. The one or more first data structures 242 can include a description of a test problem 226 for generation of a client solution 212 for the first test stage 236 at the client device 132. The one or more data structures 242 can include one or more test cases 204 to evaluate the client solution 212. The one or more processors 310 can execute a test manager 230 to provide the one or more first data structures 242 of the first test stage 236. The test manager 230 can manage the one or more test stages 236 of a multi-stage testing for a client candidate at a client device 132. The test problem 226 can correspond to a candidate solution 208 generated by the SETE 122 during the generation or preparation of the test problem 226. The one or more data structures 242 can include a plurality of test problems 226 corresponding to a plurality of test stages 236 for testing a plurality of skills of a client candidate.

The one or more processors 310 can be configured to receive from the client device 132, a client data structure 242. For instance, upon completion of the first test stage 236 by the client candidate at the client device 132, the test manager 230 can receive the data structure 242 with the client's computer code for the first test stage 236. The client data structure 242 can include the client solution 212 including a client computer code generated at the client device 132 for the first test stage 236. The client data structure 242 can include information about testing or validating of the client computer code, including test cases 204 and results of testing the client computer code with the test cases. The client data structure 242 can include entries corresponding to actions taken by the client candidate while generating the client solution 212, including keyboard entries, device input selections, selections of applications or features or materials used.

The one or more processors 310 can be configured to determine, by evaluating the client solution 212 using the one or more test cases 204, that the client solution 212 satisfies a validity condition 272 for the first stage indicated by the description. For example, the test manager 230 can utilize a code evaluator 270 to evaluate the client solution 212 computer code using one or more test cases 204 via a test case generator 202. The code evaluator 270 can run the client solution 212 against one or more test cases 204 with which the candidate solution 208 for the same test stage 236 was successfully run during the generation of the test problem 226. The validity condition can include or correspond to any of: a threshold runtime condition for the client solution 212 (e.g., a time duration it takes to execute the computer code of the client solution 212), an amount of memory 320 utilized by the client solution 212 (e.g., during the execution of the client solution computer code), a time interval taken to complete the client solution 212 (e.g., a time duration it took the client candidate to draft the computer code of the client solution 212), or a level of performance of the client solution (e.g., how many test cases 204 the client solution 212 passed, or how many inputs and outputs of the test cases 204 are matching the correct or expected outcomes).

The one or more processors 310 can be configured to provide, to the client device 132, one or more second data structures 242 for a second test stage 236 of the test problem 226. The one or more processors 310 can provide the second one or more data structures 242 of the second test stage 236 based on determining that the client solution 212 satisfies the validity condition 272.

The one or more processors 310 can be configured to determine that the client solution 212 satisfies the validity condition 272 for the first stage 236 responsive to inputting the client solution 212 and the one or more test cases 204 into one or more machine learning (ML) models 142. For instance, the test cases 204 used to validate the candidate solutions 208 for the test stage 236 of the test problem 226 can be used to validate the client solutions 212 for the same test stage 236 of the same test problem 226. Runtime conditions for the test cases 204 validations of the client solutions 212 can be compared with the runtime conditions for the same test cases 204 of the candidate solutions 208.

The one or more second data structures 242 can be a portion of the first one or more data structures 242, as all of the data structures 242 of a single multi-stage test problem 226 can be organized into a single data structure for the entire multi-stage problem. The one or more second data structures 242 of the second test stage 236 can include a second description of the test problem 226 for generation of a second client solution (e.g., 208 or 212) for the second test stage 236 at the client device 132. The second one or more data structures 242 can include one or more second test cases 204 to evaluate the second client solution 212.

The one or more processors 310 can be configured to identify a boilerplate 224 portion of the client computer code for at least the first test stage 236 of the test problem 226. The boilerplate 224 can include a portion of the computer code for the first test stage 236 and present the boilerplate 224 to the client device 132 to use for generating the client solution 212 for the first test stage 236. For example, the same boilerplate 224 can be used for generating the first client solution 212 for the first test stage 236 as well as for generating the second client solution 212 for the second test stage 236 of the test problem 226. In some examples, a different boilerplate 224 can be used for the first test stage 236 than for a second test stage 236. In some examples, the second boilerplate 224 for the second test stage 236 can be derived or generated based on at least one of the first boilerplate 224 of the first test stage 236 or the candidate solution 208 of the first test stage 236.

The one or more processors 310 can be configured to identify a boilerplate 224 portion of computer code for the first test stage 236. A code evaluator 270 can be used by the one or more processors 310 to evaluate the client solution 212 for the first test stage 236 using at least the boilerplate 224 portion and the one or more test cases 204. The test manager 230 can identify a second boilerplate 224 portion of computer code for the second test stage 236. The test manager 230 can select the second boilerplate 224 from the second data structure 242 for the second stage of the multi-stage test problem 226. The test manager 230 can utilize the code evaluator 270 and one or more ML models 142 to evaluate a second client solution 212 including a second client computer code generated at the client device 132 for the second test stage 236 using at least the second boilerplate 224 portion and a second one or more test cases 204.

The one or more processors 310 can be configured to identify a plurality of code portions (e.g., 214) of the client computer code for the first test stage 204 and a plurality of timestamps 216 for the plurality of code portions (e.g., 214). For instance, a code recorder 210 can record the code portions 214 and the timestamps 216 for each of the code portions of the client solution 212. Each of the plurality of code portions 214 can be associated with a corresponding timestamp 216 of the plurality of timestamps 216 for the respective code portion 214. The one or more processors 310 can be configured to generate, using the plurality of code portions 214 and the plurality of timestamps 216, the description for the second test stage 236 of the test problem 226.

The one or more processors 310 can be configured to generate the description for the second test stage 236 of the test problem 226 based on inputting the plurality of code portions 214 and the plurality of timestamps 216 into the one or more ML models 142. The one or more processors 310 can be configured to determine a level of performance (e.g., evaluation parameters 262) of the client solution 212 for the first test stage 236. The evaluation parameters 262 can be determined based on at least one of: an output value of a runtime of the client solution, a time of completion of the runtime, a memory usage of the runtime, or a measure of a code quality of the client solution. The one or more processors 310 can generate, based on the level of performance (e.g., 262) for the first stage, a description for a second test stage 236 of the test problem 226.

The client solution 212 can be a first version of the client solution 212 for the first test stage 236. The one or more processors 310 can be configured to receive from the client device 132, during a time period for generating the client solution 212 for the first test stage 236, a second version of the client solution 212 for the first test stage 236 to evaluate using the one or more first test cases 204. The first version and the second version can be two versions of the computer code generated by the client candidate during the testing procedure. The second version can be generated prior to completion of the first version of the client solution 212. The client can utilize a test manager to activate the code evaluator 270 or the TAE 120 to determine the evaluation parameters 262 of the client solution 212 or execute test cases 204. The one or more processors 310 can be configured to generate, using the second version of the client solution 212 and the one or more first test cases 204, an evaluation of the second version of the client solution 212. The evaluation can include execution or processing of any combination of test cases 204 or one or more validity conditions. The test manager 230 or the TAE 120 can provide, to the client device 132, the evaluation of the second version during the time period. The time period can correspond or include the time period during the testing of the client candidate. For instance, the second version can be a draft version of the document that is not yet completed and which the client candidate can execute to evaluate the progress during the testing process.

The one or more processors 310 can be configured to determine, based on the second version of the client solution 212 and the one or more first test cases 204, that the second version of the client solution 212 does not satisfy the validity condition 272. For instance, the TAE 120 can determine that the second version of the computer code of the client solution 212 (e.g., the second version being a version of the computer code that is not yet complete or finalized) does not pass the validity conditions 272. The TAE 120 or the test manager 230 can provide, for display at the client device 132, a notification (e.g., a prompt 222) that the second value does not satisfy the validity condition 272.

The one or more processors 310 can be configured to generate, using a validated solution for the first test stage 236 and the one or more first test cases 204 input into one or more machine learning (ML) models 142, the threshold runtime condition of the first test stage 236. The threshold runtime condition can correspond to a value of a runtime of the validated client solution 212 using the one or more first test cases 204. The one or more ML models 142 can be one or more large language models (LLMs). The one or more processors 310 can be configured to determine that the client solution 212 satisfies the validity condition 272 using at least a prompt 222 to the one or more LLMs.

The one or more processors 310 can be configured to determine a level of performance (e.g., evaluation parameters 262 or scores 260) of the client solution 212 for the first test stage 236. The level of performance (e.g., 262) can be determined based on one or more of a runtime of the client solution 212, a time of completion of the runtime, a memory usage of the runtime, or a measure of a code quality of the client solution. The one or more processors 310 can be configured to select, from the plurality of stages ordered according to a plurality of levels of performance (e.g., 262), the second test stage 236 of the plurality of test stages 236, based on the level of performance of the plurality of levels of performance.

The one or more processors 310 can be configured to identify a time duration of a testing period for generating a plurality of client solutions 212 for the plurality of stages. For instance, the test manager 230 can determine a time interval of a remaining amount of the time duration of the testing period following the determination that the client solution 212 satisfies the validity condition 272. The stage selector 232 can select, from the plurality of test stages 236 corresponding to a plurality of time intervals, the second test stage 236 according to the time interval of the remaining amount of the time duration. For instance, each of the plurality of test stages 236 can be associated with a given time duration. The stage selector 232 can select the second test stage 236 to present to the client candidate based on the remaining time duration in the testing period and the time durations for the test stages 236, so as to give the client candidate a sufficient amount of time to complete the second test stage 236.

The one or more processors 310 can be configured to determine a first level of difficulty of the client solution for the first test stage 236. For instance, the test manager 230 or the TAE 120 can determine the difficulty of the first test stage 236. The test manager 230 or the TAE 120 can utilize the stage selector 232 to select, from the plurality of test stages 236 corresponding to a plurality of levels of difficulty, the second test stage 236 based on the first level of difficulty and responsive to the client solution 212 for the first test stage 236 satisfying the validity condition 272.

Figure 16:
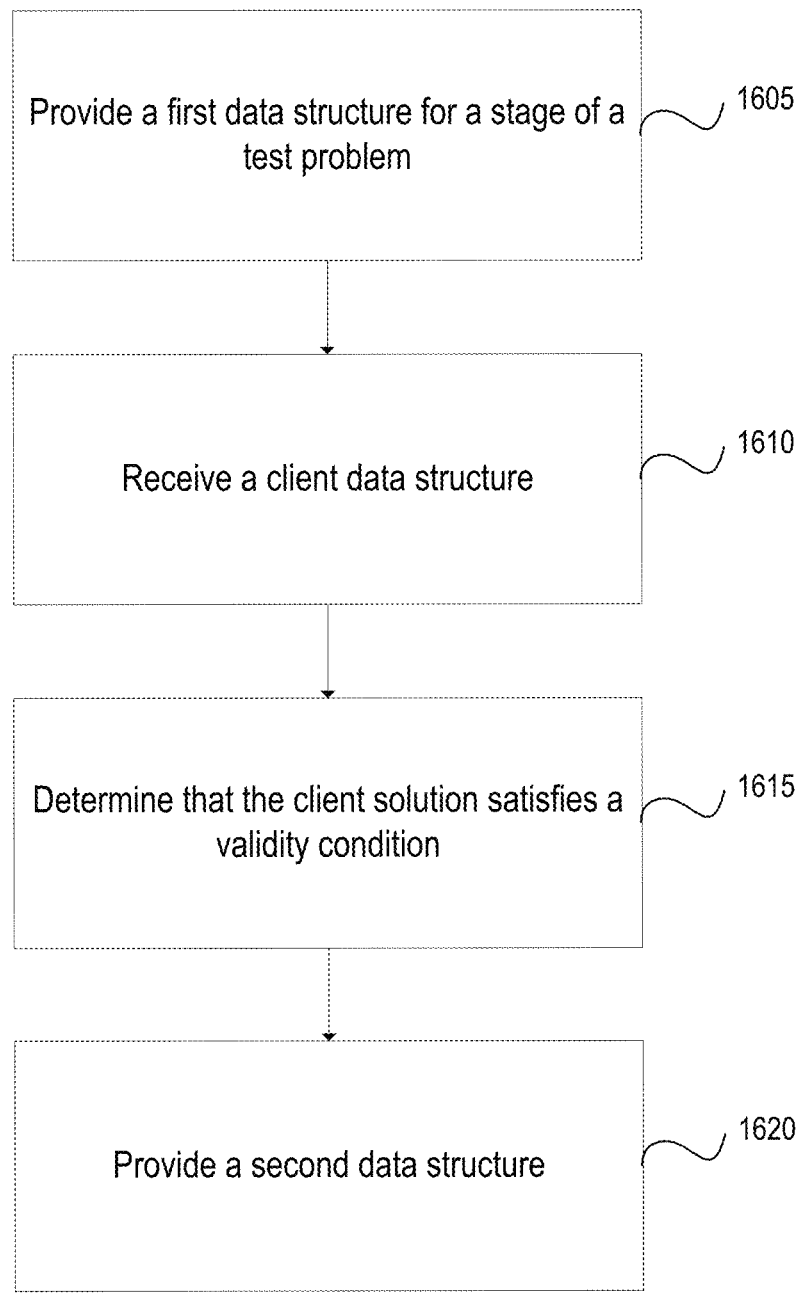
FIG. 16 is an example flow diagram of a method for testing and evaluation of dynamically generated multi-stage test problems.

FIG. 16 is an example flow diagram of a method 1600 for testing and evaluation of dynamically generated multi-stage test problems. Method 1600 can include acts 1605 through 1620, which can be implemented, for example, using a combination of features of designs or systems discussed in connection with FIGS. 1-3. Method 1600 can be implemented along with, or using, operations or actions discussed in methods 400 and 500, or vice versa. At 1605, the method can include providing, to a client device, one or more first data structures for a first stage of a test problem. At 1610, the method can include receiving, from the client device, a client data structure. At 1615, the method can include determining, that the client solution satisfies the validity condition for the first stage indicated by the description. At 1620, the method can include providing, to the client device, one or more second data structures for a second stage of the test problem.

At 1605, the method can include providing, to a client device, one or more first data structures for a first stage of a test problem. For example, one or more processors can provide the one or more first data structures for the first stage of the test problem. The one or more first data structures can correspond to the first stage of the test problem. The one or more first data structures can include a description for generation of a client solution for the first stage at the client device and one or more test cases to evaluate the client solution. The description can include a string of text to generate a client solution for the first stage of the test problem.

The test problem can include a plurality of stages. For example, the test problem can include stages 1-3 that are independent from each other in terms of topics and problems solved. In an example, the test problem can include stages 1-5 that are related to each other and share the same theme and the same boilerplate (e.g., parameters, variables, or functions). In an example, the test problem can include stages 1-10 that can be a combination of related test problems and independent problems. Each stage in the plurality of stages can differ from a prior or a subsequent stage. For example, a test problem can include stages 1-4. The first stage can differ from the second stage in terms of the scope of the issues or evaluation parameters covered. Each stage in the plurality of stages can include a different level of difficulty, different test problem description, and different test cases to evaluate the client solution at each given stage.

The method can include identifying a boilerplate portion of the client computer code for at least the first stage of the test problem. The boilerplate portion of the client computer code can be associated with the one or more first data structures. For example, the one or more first data structures can include the boilerplate portion for the first stage of the test problem, the description for the first stage at the client device, and the one or more test cases to evaluate the client solution. The method can include presenting the boilerplate to the client device to use for generating the client solution for the first stage.

The method can include determining a first level of difficulty of the client solution for the first stage. For example, the one or more processors can determine a first difficulty for the client solution for the first stage based on a domain for the test problem. In another example, the one or more processors (e.g., TAE) can determine a first difficulty for the client solution for the first stage based on a previously completed stage of the test problem. Each stage in the plurality of stages can include a corresponding difficulty. For example, the first stage can include a first difficulty, the second stage can include a second difficulty. The second difficulty and the first difficulty can be the same or different.

The method can include identifying a time duration of a testing period for generating a plurality of client solutions for the plurality of stages. For example, the one or more processors can identify a longer time duration when the test problem includes a higher number of stages. In another example, the one or more processors can identify a shorter time duration when the test problem includes a lower number of stages. The method can include identifying a time duration of a testing period for generating a plurality of client solutions for the plurality of stages based on the level of difficulty for each stage. For example, the one or more processors can identify a longer time duration for each stage with a higher level of difficulty.

The method can include identifying a plurality of portions of the client computer code for the first stage. Each portion of the plurality of portions can be different within the client computer code. For example, a first portion of the client computer code can correspond to a boilerplate portion. For example, a second portion of the client computer code can correspond to a client solution to the test problem.

The method can include identifying a plurality of timestamps for the plurality of portions. Each of the plurality of portions can associate with a corresponding timestamp of the plurality of timestamps for the respective portion. For example, the one or more processors can identify a first timestamp for a given 1-3 lines of code within the client computer code within the client solution. In another example, the one or more processors can identify a second timestamp for a given 5-10 lines of code within the client computer code within the client solution. In an example, the one or more processors can identify a third timestamp for one or more characters added to the text, one or more menu selections by the client candidate or one or more application actions performed by the client (e.g., opening of browser application and conducting a search). For example, one or more processors can identify a fourth timestamp at which one or more edits were applied to previously input lines of code.

The method can include generating the description for the second stage of the test problem. For example, the one or more processors can feed the plurality of portions and the plurality of timestamps associated with the client computer code into the one or more ML models to generate the description of the second stage of the test problem. The one or more ML models can ingest the plurality of portions and the plurality of timestamps. Once ingested, the one or more ML models can determine a second stage for the test problem and generate the description for the second stage. In another example, the one or more ML modes can assign an easier second stage based on the timestamps associated portion of the client computer code to complete the first stage. The one or more ML models are one or more large language models (LLMs). In another embodiment, the one or more ML models can determine a second stage for the test problem from one more existing previously created test problems that are stored in data structures that are available to it.

At 1610, the method can include receiving, from the client device, a client data structure. The client data structure can include the client solution. For example, the client device can transmit the client data structure to the one or more processors to extract the client solution. The client solution can include a client computer code generated at the client device for the first stage. For example, upon extraction of the client solution, the one or more processors can parse the client solution to identify the client computer code generated at the client device for the first stage. The client solution can be a first version of the client solution for the first stage. For example, the client solution can be a plurality of versions during a time period. Each version of the client solution can include a different client computer code to solve the test problem.

The method can include receiving, from the client device, during a time period for generating the client solution for the first stage, a second version of the client solution for the first stage to evaluate using the one or more first test cases. The second version can be generated prior to completion of the first version of the client solution. The method can include generating, using the second version of the client solution and the one or more first test cases, an evaluation of the second version of the client solution. The method can include providing, to the client device, the evaluation of the second version during the time period.

At 1615, the method can include determining that the client solution satisfies the validity condition for the first stage indicated by the description. The validity condition can correspond to at least one of: a threshold runtime condition for the client solution, an amount of memory utilized by the client solution, a time interval taken to complete the client solution, or a level of performance of the client solution. For example, the validity condition of the first stage can correspond to the threshold runtime condition for the client solution. In another example, the validity condition can correspond to the mount of memory utilized by the client solution. In still another example, the validity condition can correspond to successfully processing a certain number or certain percentage of the test cases.

The method can include determining a time interval of a remaining amount of the time duration of the testing period following the determination that the client solution satisfies the validity condition. For example, the one or more processors can calculate the remaining amount of time during the time period once the client solution satisfies the validity condition to determine the time interval. In another example, the one or more processors can recalculate the time interval for each occurrence of the client solution satisfying the validity condition.

The method can include determining that the client solution satisfies the validity condition using at least one prompt to the one or more LLMs. Using the prompt, the one or more LLMs can evaluate the client solution to determine that the client solution satisfies the validity condition. For example, the one or more processors can transmit a first prompt to the one or more LLMs to determine that that client solution satisfies the validity condition. In another example, one or more processors can evaluate the client solution using the one or more test cases to determine that the client solution satisfies the validity condition.

The method can include evaluating the client solution for the first stage using at least the boilerplate portion and the one or more test cases. For example, the one or more processors can use the boilerplate portion to evaluate the client solution by detecting if the boiler plate portion included changes not in accordance with the one or more test cases. In another example, the one or more processors can use the one or more test cases to evaluate the client solution by comparing the outputs of the client candidate solution with the one or more test cases.

The method can include determining that the client solution satisfies the validity condition for the first stage responsive to inputting the client solution and the one or more test cases into the one or more ML models. For example, the one or more processors can input the client solution and the one or more test cases into the one or more ML models to determine that the client solution satisfies the validity condition.

The method can include determining, based on the second version of the client solution and the one or more first test cases, that the second version of the client solution does not satisfy the validity condition. For example, the one or more processors can evaluate the second version of the client solution similar to the first version of the client solution. The second version of the client solution can correspond to additions, deletions, or regeneration of computer code within the client solution. The method can include providing, for display at the device, a notification that the second version of the client solution does not satisfy the validity condition. For example, the notification can indicate that the second version of the client solution does not satisfy the validity condition.

The method can include generating the threshold runtime condition of the first stage. The threshold runtime condition can correspond to a value of a runtime of the validated solution using the one or more first test cases. The runtime condition can include a determination of a time duration that one or more test cases can be successfully executed by a computer code solution. In some examples, this can be implemented by executing test cases using a solution (e.g., 208 or 212) and measuring a time period. In some cases, ML models 142 can be utilized to determine the runtime condition. For example, using a validated solution for the first stage and the one or more first test cases input into one or more machine learning (ML) models, the one or more processors can generate the threshold runtime condition of the first stage by executing the validated solution for the first stage against the one or more first test cases.

The method can include determining a level of performance of the client solution for the first stage based on one or more of a runtime of the client solution, a time of completion of the runtime, a memory usage of the runtime, or a measure of a code quality of the client solution. For example, the one or more processors can determine a high level of performance of the client solution based on the low runtime of the client solution, and a low time of completion. In another example, the one or more processors can determine a low level of performance of the client solution based on a low quality of the code quality and a high memory usage of the runtime.

The method can include selecting, from the plurality of stages ordered according to a plurality of levels of performance, the second stage of the plurality of stages based on the level of performance of the plurality of levels of performance. Each level of performance can correspond to a stage. For example, a low level of performance can correspond to a first stage within five stages. In another example, a high level of performance can correspond to a fifth stage within five stages. In yet another example, the one or more processors can determine a low level of performance for the client solution. Based on the determination, the one or more processors can select the second stage corresponding to a lower level of performance for the client solution.

The method can include selecting, from the plurality of stages corresponding to a plurality of time intervals, the second stage according to the time interval of the remaining amount of the time duration. For example, the one or more processors can select a subsequent stage with a first level of difficulty when there is a low time interval of the remaining amount of time. In another example, the one or more processors can select a subsequent stage with a second level of difficulty when there is a high time interval of the remaining amount of time.

The method can include selecting, from the plurality of stages corresponding to a plurality of levels of difficulty, the second stage based on the first level of difficulty and responsive to the client solution for the first stage satisfying the validity condition. For example, the one or more processors can select the second stage based on a high first level of difficulty and responsive to the client solution satisfying the validity condition. In another example, the one or more processors can select the second stage based on a high first level of difficulty and responsive to the client solution not satisfying the validity condition.

The method can include generating, based on the level of performance for the first stage, a description for a second stage of the test problem. For example, upon evaluating a client solution for a first stage, the one or more processors can generate the level of performance for the first stage. Using the level of performance, the one or more processors can generate a description for the second stage of the test problem. The method can include selecting, based on the level of performance for the prior stage, a description for a second stage of the test problem. The second stage can be selected, from a plurality of pre-generated candidate options for the second stage, based on the level of performance of the candidate in the prior stage. For instance, in response to candidate performing at a satisfactory level with respect to a plurality of parameters or dimensions (e.g., topics), the data processing system can prioritize testing dimensions or topics not tested in the preceding stage. As a result, the data processing system can select, from a plurality of stage test problem options, a stage option that is configured to focus the testing on the desired aspects, skills or test dimensions.

At 1620, the method can include providing, to the client device, one or more second data structures for a second stage of the test problem. For example, the one or more processors can provide the one or more second data structures, responsive to determining that the client solution satisfies the validity condition. The one or more second data structures can include: i) a second description for generation of a second client solution for the second stage at the client device and ii) one or more second test cases to evaluate the second client solution.

The method can include identifying a second boilerplate portion of the client computer code for at least the second stage of the test problem. The second boilerplate portion of the client computer code can be associated with the one or more second data structures. For example, the one or more second data structures can include the second boilerplate portion for the second stage of the test problem, the description for the second stage at the client device, and the one or more test cases to evaluate the client solution.

The method can include presenting the second boilerplate to the client device to use for generating the client solution for the second stage. For example, the one or more processors can present the second boilerplate for the second stage to the client device. The method can include evaluating a second client solution that can include the second client computer code generated at the client device for the second stage using at least the second boilerplate portion and a second one or more test cases.

D. Assessment of Computer Code Performance Using Event Timelines

The technical solutions can autonomously record a timeline of the client candidate progress in drafting or generating a client solution 212 for a test problem 226 during the testing period to improve the accuracy in detecting and analysis of the client candidate's skills and abilities. Prior solutions dealing with the client candidate skill assessment typically fail to analyze the client performance based on timestamped actions taken by the client during the course of the testing period. Such solutions are therefore generally limited to merely adjudicating the final result of the client's work product, failing to take in consideration various cues or hints from actions taken by the client during the course of the test, to provide a more meaningful assessment of the client's skills or performance. For instance, during a testing process a client can be stuck on a particular issue for longer than anticipated, which can indicate a difficulty with a particular type of subject matter, even if the user ends up getting the correct result. Likewise, some portions of the test problem can take the client candidate less time than anticipated, which can be indicative of an increased level of comfort with a given subject matter. In addition, an order of actions can be indicative of a particular way in which the client candidate resolves certain issues, allowing for analysis of the client candidate's work process, all of which prior technical solutions fail to take into account during performance analysis. The technical solutions of the present disclosure record the code portions 214 of the client solution 212 along with timestamps 216, allowing the data processing system 102 to track of the client candidate's steps and methodologies in creating a client solution 212. These timestamped code portions can be used to generate an event timeline 276 that the data processing system can utilize to break down the client's work into tasks that are indicative of the candidate's performance and skills.

The data processing system 102 can utilize a code recorder 210 to record code portions 214 of the client solution 212 along with timestamps 216. The data processing system 102 can utilize a timeline generator 274 to generate an event timeline 276 using the code portions 214 and the timestamps 216. The data processing system 102 can utilize the TAE 120 and the event timeline 276 to identify or detect specific events or actions of the client from which the TAE 120 can determine specific actions or intent of the client with respect to particular steps or portions of the client solution 212 generation from the activity (e.g., event timeline 276), during the candidate solution 212 drafting. Based on the timestamped actions and the order of events, the data processing system 102 can infer cues about the client candidate's performance and more meaningfully and accurately assess or evaluate the client candidate's performance and skills.

A client candidate can authenticate to a client profile or a client account gaining access to the client interface 110 to start the testing interview with the test problems 226 provided by the test manager 230. The client candidate can select a programming language from the list of one or more choices that have been allowed by the employer staff during problem creation. When the client candidate clicks the button to begin the interview, the interview and recording process by the code recorder 210 can begin, as shown for example in FIGS. 6-10.

The client candidate can take steps to solve the test problems 226 within the code editor application of the client 110 and surrounding application pages (e.g., code evaluator 270 or other features). Core recorder 210 can record all actions taken by the client candidate as the client candidate attempts to solve the test problem 226. For example, the code recorder 210 can record every keystroke written into the editor, every copy action, every paste action, any backspace or delete action, any application feature selection, any time the browser tab that the client works in is focused or unfocused, any time the browser tab the client works in is used for particular purposes (e.g., do a search or review a document), every time the client evaluates the client solution 212 or runs test cases 204 (along with the test case results), and other auxiliary actions (client candidate resets code to the original boilerplate), or any other action that the client can take on the code of the client solution. Each of these actions can be recorded along with, for example, code portions 214 from a preceding recording event and any timestamps 216. A pause in activity by the client candidate is represented by the lack of any recorded activity during a time period.

These recorded data or signals can be stored in a database (e.g., data repository 160) that can be part of the data processing system 102. The keystrokes of the client candidate can be saved as one or more objects with one or more attributes. For example, an object can include two attributes: a code attribute that can include the state of the client candidate code, and timestamp attribute that can indicate the time of the entry or the snapshot. In an embodiment, the code attribute stores the entire client candidate code (e.g., a computer code string). In an embodiment, the code attribute stores a change in the code from a previous entry allowing the data processing system 102 to recreate the snapshot form the change to the prior entry at a later date, thereby saving only the difference from the last recorded snapshot. This approach can save memory space and reduce processing resources in the database, especially at large scale.

User actions can be used to save actions or data corresponding to activities that fall out of conventional keystrokes or mouse actions, such as the copy action, paste action, tab unfocus action, and tab refocus action. These attributes can use a shared object shape to record desired attributes (e.g., the copy object records what text was copied and the timestamp, the tab unfocus records the timestamp of when the tab went unfocused, etc.). Snapshots, user actions, and other details (such as what time the assessment started) can be saved in the "current attempts" table, such as that of a results data structure 1302 in FIG. 13. For each stage of the assessment (e.g., if the given problem is dynamic) there can be one row in the current attempts table holding this information for each given test stage 236.

FIG. 17 illustrates an example 1700 of a submission table of a test. FIG. 17 shows a submission table example with result data for various test case runs during the testing process. This data can be used for the timeline construction and for understanding of the client candidate's journey to solving the problem. Saving test case run results data can include an additional complexity due to the variation of languages, problems, and other factors. The submissions table in example 1700 can include details, such as how many test cases 204 have been passed, how many test cases 204 were run, the test case inputs, the expected outputs (e.g., the golden label outputs), any errors that occurred during the run process (syntax, runtime or otherwise), and other information. These signals can be recorded to be processed by LLMs at a later time. The process of data capturing can continue until the client candidate submits the problem for evaluation using the corresponding user interface element.

After the client candidate submits the problem, the data processing system 102 can process the signals captured to create the event timeline 276. The event timeline 276 can be generated using timeline generator 274 along with LLMs of the ML system 140. For instance, the timeline generator 274 can utilize a generative AI or any other one or more ML models for creating the event timeline 276 or inferring actions from the timeline data.

The processing stage can include the data processing system fetching the requested or desired data from the current attempts table (e.g., see FIG. 15), submissions table (see FIG. 17), and additional inputs. For each test stage 236, the data processing system 102 can filter the list of snapshots (e.g., keystrokes, inputs, or other client device actions). The filtering process can occur across two dimensions, including a time-based dimension (e.g., using timestamps 216) and a dimension of character differences (e.g., changes in the computer code text across the snapshots).

The data processing system 102 can iterate through the snapshots of the computer code of client solution 212, adding snapshots to a new list (e.g., event timeline 276) during the course of the testing, as the client candidate generates the computer code of the client solution 212. During this process, the code recorder 210 or the timeline generator 274 can populate the event timeline 276 using data from snapshots of the computer code that satisfy code selection criteria 218. Code selection criteria 218 can be based on the amount of new content between the snapshot or based on time duration between the snapshots. For example, the code recorder 230 or the timeline generator 274 can determine to include into the event timeline 276 data of those snapshot that occurred outside of a predetermined time duration (e.g., snapshots that have occurred more than 1500 ms following a prior snapshot whose data is included). The code recorder 230 or the timeline generator 274 can determine to include into the event timeline 276 data of the snapshot whose change in the computer code from a prior included snapshot data is greater than a threshold number of characters. For instance, the timeline generator 274 can choose to include into event timeline 276 data a snapshot that has 8 or more characters changed between the current snapshot and the last snapshot added to the new list (e.g., event timeline 276). In some configurations, the first snapshot and last snapshot can be added to the new list regardless of the criteria 218. Other parameters, time periods, and limits for code selection criteria 218 can be implemented in various implementations. The new list (e.g., event timeline 276) can be used as a list of relevant snapshots that can be indicative of the client candidate actions while creating the candidate solution, which can be for determining client candidate performance and skill levels.

The data processing system 102 can add the data from the criteria 218 based selected snapshots to the event to the list of snapshots of the event timeline 276. The data processing system 102 can iterate over the list of snapshots (e.g., 276) and the list of submissions (e.g., of user actions) from a table of entries from the client candidate 132. The entries in the event timeline 276 can correspond to or indicate actions taken on the computer code, which can be distinct from the overall user actions that the client candidate can take during the course of the testing. In some examples, there can be a combined list of snapshots and submissions that can include the attributes from both of the lists saved within their respective tables.

The data processing system 102 can then iterate through the combined list and remove any instance of multiple submissions occurring in a row, while keeping the last submission. This can be performed as there may be no change between the consecutive runs or snapshots of the computer code, leading to two consecutive snapshots without any edits to the code. In some examples, data processing system 102 can include criteria 218 that can check the test case results of the consecutive submissions to see if the test case results match, before removing items from the list. For example, the timeline generator 274 can include a snapshot data into the event timeline 276 responsive to determining that the test case results between the current snapshot and a prior snapshot included in the event timeline 276 are different from each other.

Such pre-processing operations can be performed for various reasons. For instance, by removing items in the resulting actions list (e.g., event timeline 276) less input can be sent to LLMs of the ML system 140 for processing or analysis, which can save LLM-related computations for the data processing system 102. For instance, by reducing the amount of input sent to LLMs of the ML system 140, the ML models 142 can achieve increased accuracy and better quality in their analysis, as only entries that are relevant to user activities with respect to generating the client solution 212 are included (e.g., and timestamped) allowing for an analysis in which client's thought process and problem solving abilities can be identified and quantified more accurately.

The processing can be modified to improve the resulting timeline. If the system desires to further reduce the LLM compute processing, the data processing system 102 can increase the amount of filtering performed. For instance, depending on the performance of the LLMs, it can be beneficial to send additional or all inputs to the model to improve the resulting timeline.

Figure 39:
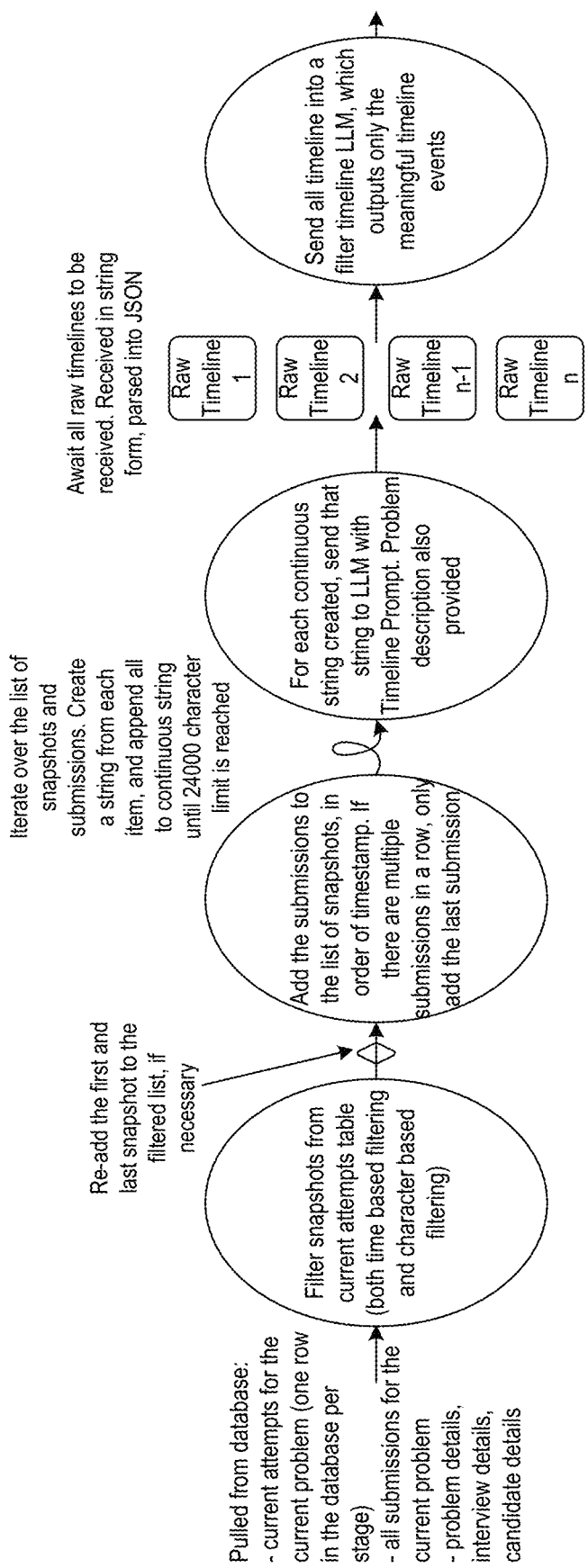
FIG. 39 illustrates an example of a flow diagram of operations that a data processing system can take to create a string of actions or items based on a character limitation.

For example, following the pre-processing, the data processing system can send the list (e.g., event timeline 276) to one or more LLMs of the ML system 140 for analysis. For instance, one or more ML models 142 can transform the event timeline 276 from its list of objects into a string that can be shared with the ML model provider. Since the LLM can have a limited context, the data processing system 102 can iterate over event timeline 276, transforming the current action to a string and appending it to a new string, until the "context length limit" of the string for the LLM input can be breached. The context length limit can be implemented to facilitate the context lengths of the ML model 142 to not be breached. In one example, this limit can be set to 24000 characters. The value can be tuned in various implementations and may be beneficial to dynamically calculate the number of tokens in the present resulting string every k iterations for a more exact estimate of the current context length of the resulting string. FIG. 39 illustrates an example 3900 of a flow diagram of operations that data processing system 102 can take to create a string of various actions or items based on a character limitation.

While appending actions to the resulting string, the snapshot data can be stringified with the raw timestamp and code. In an example, the timestamp can be converted into a time elapsed string with a particular format, for example minutes and seconds (e.g., MM:SS), which can assist the LLM in its evaluation. In the case of submissions, the data processing system 102 can append a subset of the object's attributes to the resulting string. For instance, the data processing system 102 can select the number of test cases passed, the total number of test cases, the details of any test cases that did not pass (expected result, actual result, console logs), and the stack trace of any error that occurred when the test cases were run.

Once a resulting string reaches the context length limit or the actions array is depleted, the data processing system 102 can send the actions string to the large language model along with a system message. The system message can explain how the snapshots and submissions are passed into the model. Then the message can instruct the ML model 142 to create a JSON object of timeline results. Each object the ML model 142 can create can include a timestamp, title, and text. The ML model 142 can be prompted to choose a timestamp in the middle of the action that it is describing. In some examples, this prompt can ask the LLM to provide additional attributes as part of this timeline object. For example, the system can prompt the LLM to select or highlight part of the code that can be relevant to the timeline item, so that a helpful example code section can be presented to the end user (e.g., admin of the test) providing evidence or support for a given analysis or determination of the client candidate skill set or ability.

The data processing system 102 can perform such a process for each resulting string until the actions list (e.g., event timeline 276) is depleted. The data processing system 102 can change the prompts for timeline calls to ML system 140 after the first iteration. For instance, the data processing system 102 can alert the LLM that it is starting in the middle of an interview and can record actions from the start to the end of the timeline. The data processing system 102 can await results from one or more (e.g., all) of the calls to the ML system 140. Once the data processing system 102 has received the results, the data processing system 102 can parse the outputs of each and can add the objects to a resulting string. If any of the LLM calls fail or cannot be properly parsed, the data processing system 102 can retry their calls k times (e.g., two calls can be made) until the solution gets an action it can parse. If the call continues to fail after the set threshold number of iterations (e.g., k+1), the data processing system 102 can keep the output string for the next section. After this, the list of all snapshots of all user actions can be received and the list of events can be filtered using an LLM call. Inputs can include the list of objects and a system message. This system message can instruct the relevant LLM that it can receive a large list of timeline items and that these items are likely to have overlap. In some implementations, a part of the LLM's task can be to reduce the list of original timeline items to a filtered list that is cohesive, relevant, and specific. In some implementations, this process can be implemented in multiple steps, including to use an LLM as a "verifier" to check that one or more (e.g., all) relevant parts of the assessment are reflected in the resulting filtered timeline.

The output of this LLM can be then parsed and the output from such an LLM can be used as the final timeline that can be utilized by the ML system 140 to analyze the client candidate performance. For instance, the final timeline can include an event timeline 276. For instance, the final timeline can include a timeline that is extracted from the event timeline 276, such as a timeline of a subset of events from the event timeline 276. The filtered timeline can include one or more (e.g., all) of the same attributes as the original timelines that were produced. The resulting timeline can provide a cohesive review of the testing interview, including steps taken by the client candidate, the client candidate's reaction to test case errors, breakthrough moments in the solution drafting, the client candidate's debugging process, and troubleshooting abilities, computer code, algorithmic or language fluency, or any additional insights.

At this point, the timeline can be ready to be served to an employer staff user. The data processing system 102 can save the timeline in a completed interviews table, along with the other results created in the processing step. FIG. 18 illustrates an example of a data table 1800 that can be provided to the employer staff user (e.g., admin) following the completion of the test. For instance, after the timeline (e.g., 276) is created, the data processing system 102 can send the timeline to one or more LLMs of the ML system 140 to identify the highlight items of the interview. The highlight items can include the portions of the event timeline 276 (e.g., a series of actions or one or more code portions 214) that are indicative of particular client candidate qualities or skills. The system prompt attached to this call prompts the LLM to identify the most desired moments of the event timeline 276 that can be highlighted to the evaluator (e.g., admin or enterprise staff).

The resulting timeline (e.g., 276) and highlight timeline (e.g., specific portions of the event timeline 276 that provide example of skills or abilities of the client) can be included in the data processing system's presentation of interview results. For instance, administrator interface 106 can include one or more prompts 222 providing outputs including event timeline 276 or its portions (e.g., code portions 214 corresponding to the highlighted timeline features) which can be presented to the evaluator of the client candidate's performance. In the evaluator-facing frontend, the timeline and highlighted timeline can be used in the following forms.

Figure 19:
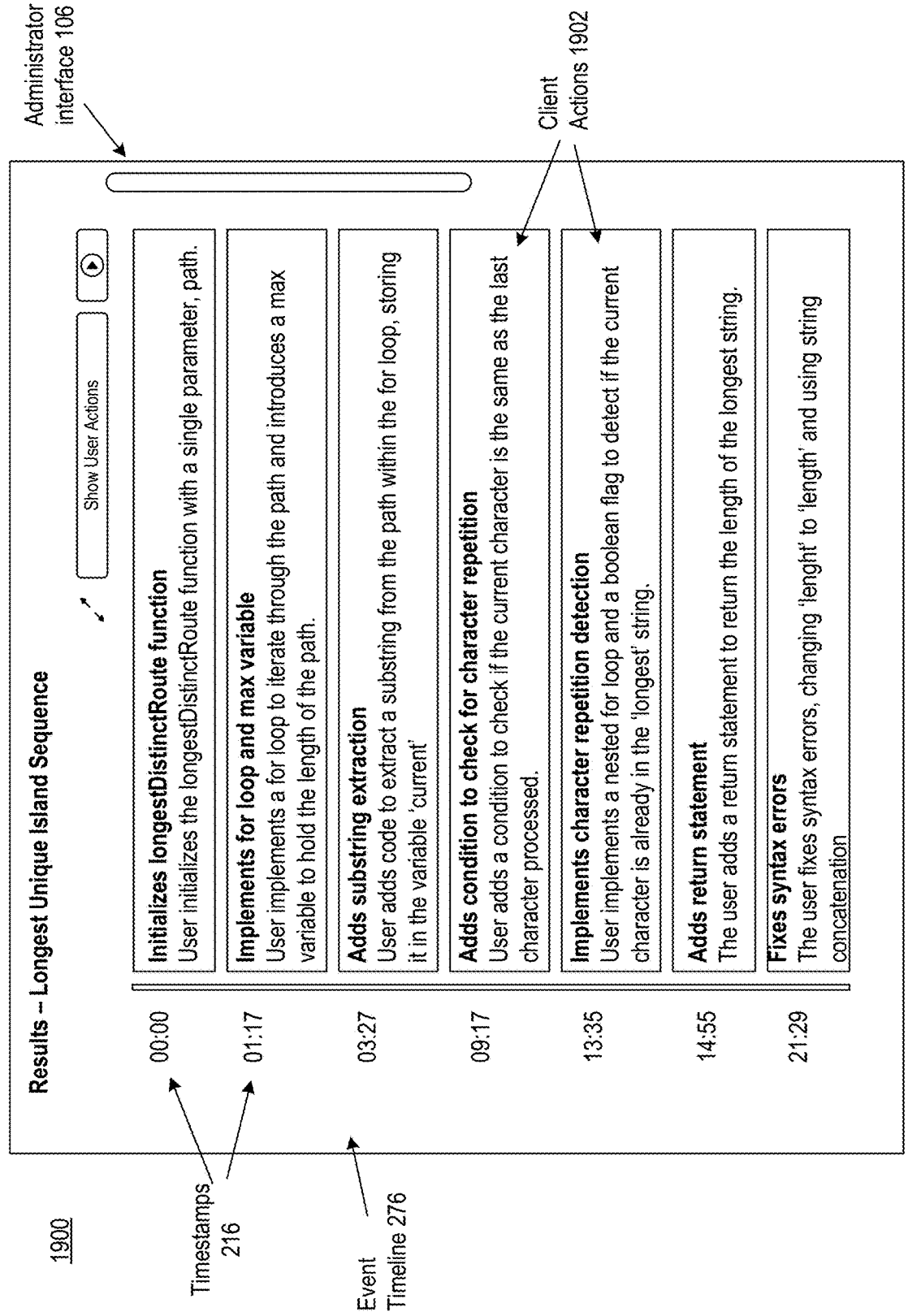
FIGS. 19-20 are examples of test result outputs that can be provided to the administrator following the completion of the test.
Figure 20:
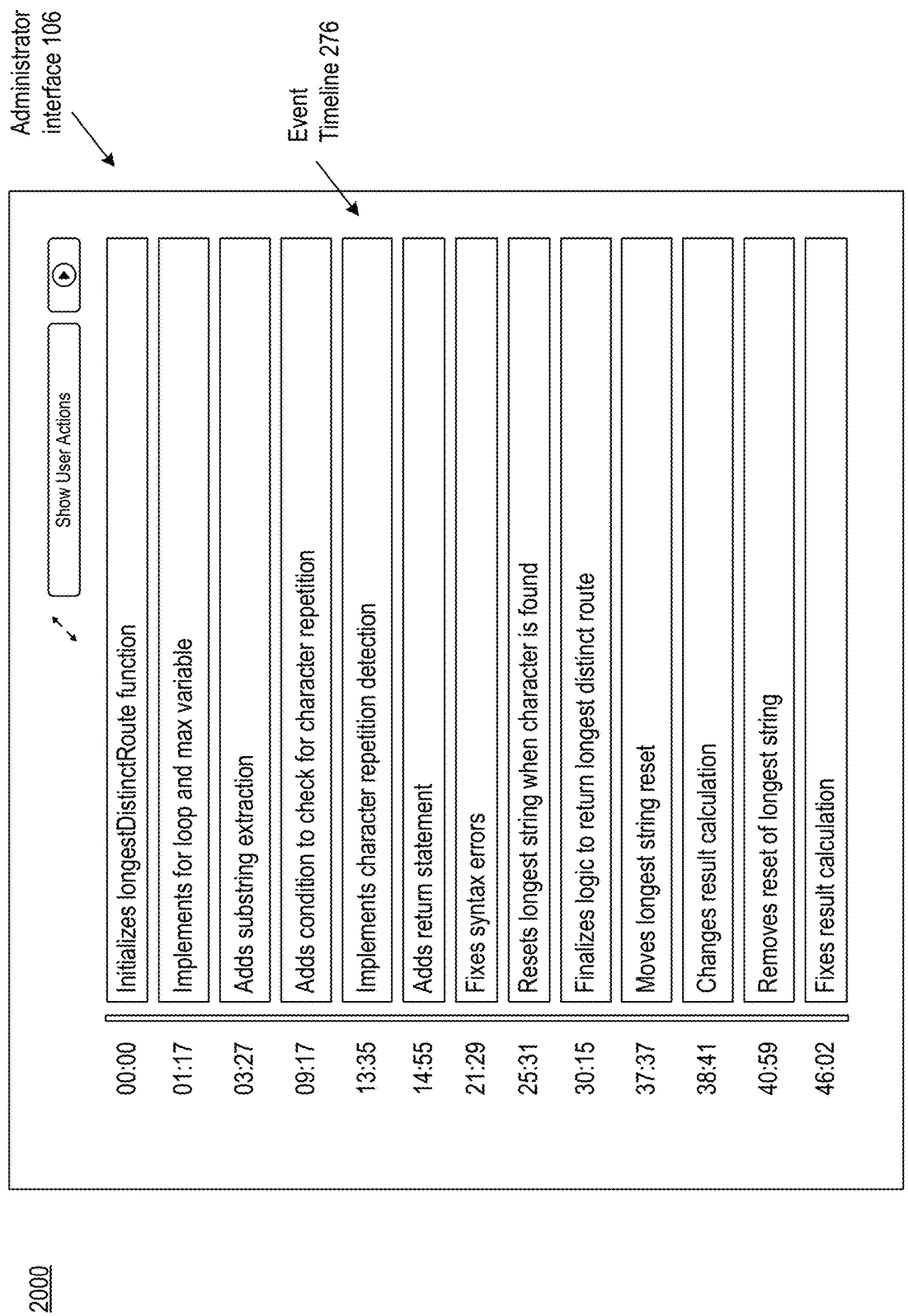

The event timeline 276 can be parsed and displayed to the admin user (e.g., evaluator of the test taker's performance) in an administrator interface 106. The event timeline 276 can be displayed in a vertical format with a list of titles, such as for example shown in example test results output 1900 of FIG. 19 and example test results output 2000 of FIG. 20. In test results outputs 1900 and 2000, the GUI of interface functions 104 can present client actions 1902, which can include ML model generated descriptions of certain portions of the event timeline 276. For instance, client actions 1902 can be generated by the TAE 120 and can include, or correspond to, the code portions 214 of the highlighted parts of the timeline. Client actions 1902 can include, or correspond to, descriptions of specific series of actions or tasks (e.g., mouse clicks, keystrokes, or menu selections) that the client candidate performed at the given portion of the timeline (e.g., as identified by timestamps 216). For instance, the data processing system 102 can translate the raw timestamp of each timeline item into a time elapsed value in the form of, for example MM: SS, allowing the evaluator to identify when the timeline action occurred. The evaluator (e.g., the admin) can then select onto any particular portion of the timeline and view a detailed description of the timeline action. The admin can select and review or display timestamped snapshots of the steps (e.g., snapshot changes) showing the order in which the client candidate performed given actions in the given time frame. Using these prompts 222 or outputs, the admin can replay or observe the client performance through the timestamped snapshots, following the client candidate's actions as they occurred during the given portion of the test indicative of the particular skill or performance.

In an example, the client candidate submissions may not be added to the timeline view. This can occur when the timeline generator 274 is aware of the submission time and the results are integrated within the event timeline 276. In some examples, these submissions can be added to the timeline itself. In an example, client candidate actions can be integrated within the event timeline 276. Processing can be done on the raw client candidate actions to reduce the list to actions (e.g., the event timeline 276) into a list of a subset of events that are useful to the evaluator (e.g., highlighted list or subset of code portions 214). For instance, the data processing system 102 can present two types of objects: the time away objects from the application and foreign pastes objects. The time away objects can be created by reducing consecutive "tab unfocused" and "tab focused" actions into a single object with an attribute representing the difference in milliseconds between the two events. The foreign paste objects can be defined as paste actions that contained data that was not part of a previous copy recorded during the current attempt. These resulting client candidate actions (e.g., code portions 214) can be sorted by timestamps with the rest of the timeline and can be presented, in order, to the user (e.g., admin) based on the timestamps 216. The user can click on specific timeline actions and the corresponding timestamp can be displayed in the code editor on the analysis page.

The highlight timeline can provide or can be used by the admin interface 106 to provide, a recap playback. The recap playback can be provided by the technical assessment engine 120 and can play back each keystroke, entry, or action of the client candidate in a presentation editor of the admin interface 106. The data processing system 102 can consider the highlight items while the snapshots are being played back to the evaluator. When the playback recap function approaches a highlight timeline item, the playback speed is slowed down, and the highlight timeline item title and text are dynamically displayed on the screen. In an example, the recap playback mode reduces the speed of the playback 3000 ms before the highlight timeline item timestamp and continues at that reduced speed until 3000 ms after the highlight timeline item timestamp. In an example, the speed of playback as well as the time to reduce speed can be adjusted by the admin user. The highlight timeline items can include data about the section of code they were referring to, and this code can be highlighted or brought into view by the admin interface 106 or its application functions.

The timeline creation process can occur following the client candidate's completion of the assessment (or anytime the analysis process is re-run by the evaluator). There may be no constraint for the client candidate needing to complete the assessment before starting the timeline process, and in some embodiments, the timeline can be created and used while the client candidate is still working on the assessment. For instance, the same technology could be applied to a live interview, where an evaluator can be watching a client candidate work on the coding problem live. Creating a timeline of events while the event is unfolding can assist the evaluator in taking notes of the client candidate's process or cause the note-taking process to be automatic entirely. The timeline in such a case can be run at times, such as every set (e.g., number n) of milliseconds, or can be run manually by the evaluator at any time. For instance, such a function can be executed in a hybrid interview, in which the client candidate first works asynchronously in an assessment environment, and then a live evaluator enters to discuss the client candidate's solution or dive deeper on the problem.

In such a scenario, a timeline of user actions can be created in the time before the evaluator is scheduled to join, and the resulting timeline can quickly educate the evaluator on the client candidate's steps and actions before the interactive assessment begins. While assessments served to client candidates within the data processing system 102 can be timed, there may be no limited time desired to create the timeline. The data processing system 102 can be applied to "take-home" assessments in which the client candidates have a large or unlimited amount of time to work on the given challenges. In such applications, the event timeline 276 can be used by the ML models 142 to detect the series of actions or activities that are indicative of cheating, such as using external sources to import portions of text in sudden time outbursts, following extended time periods in which no meaningful time entries were made, or when client candidate is utilizing other applications, such as web browsers for searching the web for answers.

In one example, one or more processors 310 of a computing environment 300 coupled with memory 315 can include instructions, computer code and data to trigger or cause implementation of operations of a data processing system 102 for generating one or more timelines of events. For instance, the one or more processors 310 can be configured, via computer code, instructions or data in the memory 315, to implement operations to generate timelines of all client candidate actions, such as keystrokes, user selections, application uses that can be used to generate event timelines 276, timelines of highlight events (e.g., highlight timelines) or any other timestamped collection of data corresponding to a test of a client candidate or skills exhibited by the client candidate during the testing period.

The one or more processor 310 can be configured to identify a plurality of entries of a computer code for a client solution 212 of a test problem 226 created during the testing period. The entries can include keystrokes, input device actions (e.g., mouse selections of features, such as menu buttons, on a GUI of a user interface) or any other actions taken by a client candidate at a client device during the testing period of the client candidate. Each entry of the plurality of entries can correspond to a portion of the computer code that is associated with a timestamp 216 within the testing period.

The one or more processor 310 can be configured to select, from the plurality of entries, a subset of the entries, each entry of the subset of the entries can be selected using one or more code selection criteria 218. Each of the entries of the subset of the entries can be selected based on a difference between a first timestamp 216 of the entry and a second timestamp 216 of a preceding entry of the subset that satisfies a time selection criterion 218. Each of the entries of the subset of the entries can be selected based on a difference between a first portion of the computer code of the entry and a second portion of the computer code of a preceding entry of the subset that satisfies a code selection criterion 218. The code selection criteria 218 can include a threshold minimum number of characters that are different between two portions (e.g., snapshots) of the computer code or a threshold minimum time duration that has passed between the two portions of the computer code.

The one or more processor 310 can be configured to generate, using one or more prompts 222 and the subset of the entries input into one or more machine learning (ML) models 142, a timeline of events (e.g., 276) indicative of actions taken at the client device during creation of the computer code for the client solution. For instance, the subset of the entries can generate an events timeline 276 that can indicate computer code changes of increased relevance to determination of the skills of the client candidate, based on the criteria 218. For example, the events timeline 276 can include a highlighted list of events that is indicative of timestamped entries exhibiting specific client candidate skills, such as skills in development of computer code targeted, sought, or tested by the test problem 226. For example, the events timeline 276 can include a timeline of actions from which the highlighted list of events can be generated, such as using one or more ML models 142.

The one or more processor 310 can be configured to provide the timeline of events (e.g., 276) and the actions for display. For instance, TAE 120 or timeline generator 274 can generate the event timelines 276 and can provide at least a portion of the timeline of events for display in a GUI of an administrator interface 106. The event timeline 276 can be presented as a collection of events (e.g., a table or a graphical representation) associated with timestamps 216 and descriptions of the selected events relevant to assessment of skill level of the client candidate.

The one or more processor 310 can be configured to retrieve, from a storage device (e.g., data repository 160), the plurality of entries organized in a chronological order and indicative of a plurality of actions. The plurality of actions can include the actions that include at least one of: a keystroke of a keyboard of the client device, a copy action performed at the client device, a paste action performed at the client device, a menu selection at the client device, a user interface window selection, a click of a pointing device, or testing of the client solution using one or more test cases. The timeline of events comprising such actions can be provided for display on an administrator interface 106 or reporting interface 108. For example, the admin can have access to the reporting interface 108 and use it to receive reporting or feedback information from the data processing system 102.

The plurality of entries can include a plurality of snapshots of the computer code created using the client device during the testing period. For instance, the snapshots can be snapshots of the computer code at given timestamped time frames. The one or more processors 310 can be configured to generate the timeline of events (e.g., 276) using the plurality of snapshots input into the one or more ML models 142.

The one or more processors 310 can be configured to identify, from the plurality of entries, a first entry having a string of characters of the first portion of the computer code. The one or more processors 310 can be configured to determine a test stage 236 of the client solution 212 using the string of characters of the first entry. The one or more processors 310 can be configured to identify, from a storage device, a plurality of data structures 242 for the plurality of entries. Each of the plurality of data structures 242 can include a timestamp attribute having a timestamp 216 and a code attribute indicative of a respective state of the computer code for the respective timestamp 216. The one or more processors 310 can be configured to generate, using the plurality of data structures 242, a list of actions, such as the actions of the client candidate indicative of the level of skills or evaluation parameters 262.

The one or more processors 310 can be configured to identify performance data including at least one or more of: a test case 204 input for the client solution, a test case 204 output for the client solution, data on a test case 204 applied to the client solution, data on a test case 204 that the client solution satisfied, data on a test case 204 that the client solution did not satisfy, data on an error for the client solution 212, metrics on consumption of computing resources (e.g., amount of compute processing or amount of memory utilized), a time it takes to run or execute the client solution 212, or data on a warning for the computer code of the client solution 212.

The one or more processors 310 can be configured to generate, using the plurality of data structures 242 corresponding to the performance data, a list of submissions for the client solution 212. The one or more processors 310 can be configured to generate the plurality of entries using at least the list of actions and the list of submissions.

The one or more processors 310 can be configured to compare the difference between the first timestamp 216 and the second timestamp 216 with the time selection criteria 218. For instance, the time selection criteria 218 can include a minimum time duration between the first timestamp 216 and the second timestamp 216. The one or more processors 310 can be configured to select, from the plurality of entries (e.g., code portions 214), the subset of the entries based at least on the comparison.

The one or more processors 310 can be configured to compare the difference between the first portion of the computer code of the client solution 212 from a first snapshot and the second portion of the computer code of the client solution 212 from a second snapshot with the code selection criteria. The code selection criteria 218 can include a minimum number or amount of computer code that differs between the two snapshots of the computer code, such as at least 4, 6, 8, 10, 12, 16, 18, 20, 24, 30, 40, 50 characters or more than 50 characters. The one or more processors 310 can be configured to select, from the plurality of entries, the subset of the entries based on the comparison.

Figure 40:
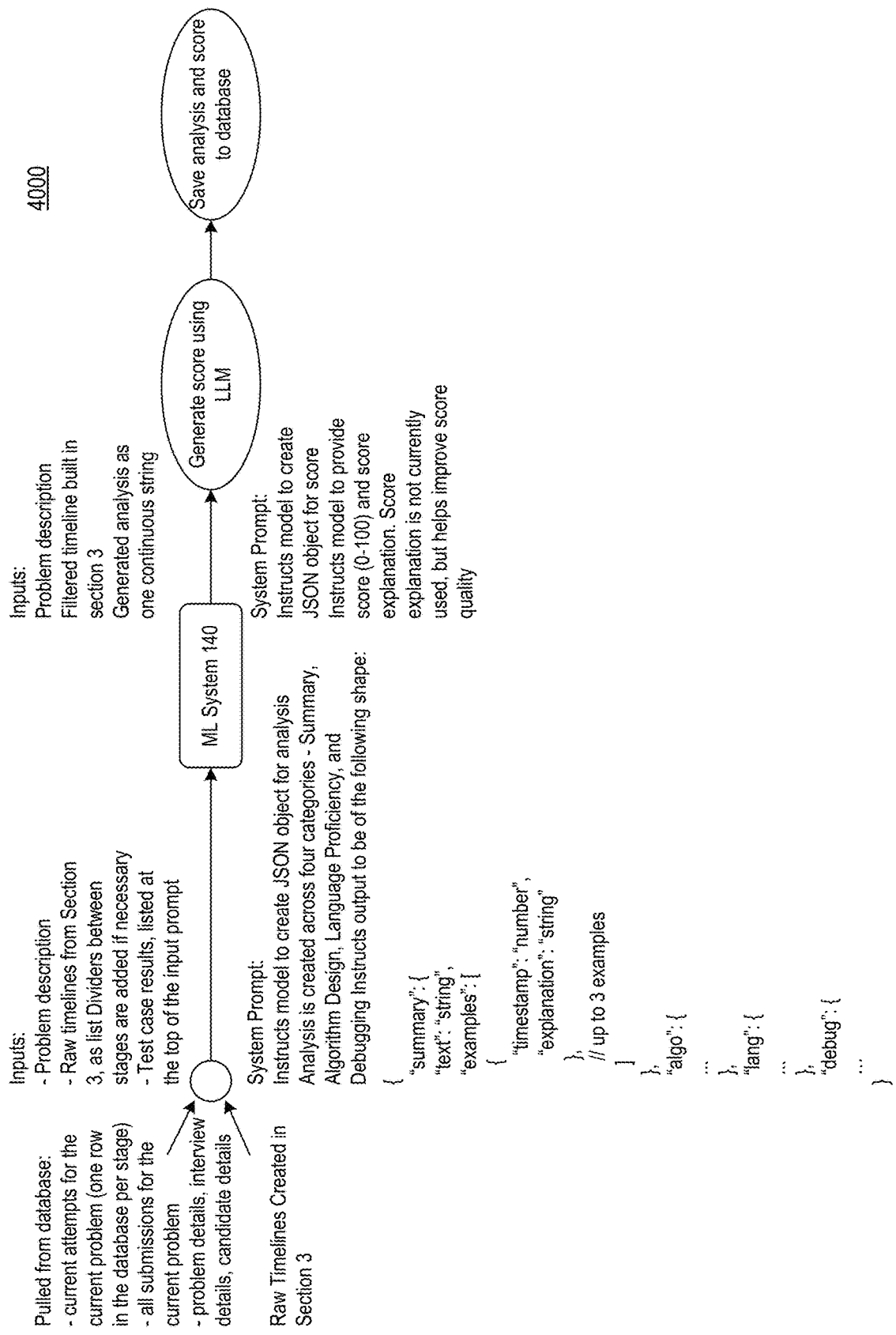
FIG. 40 illustrates an example flow diagram of operations that a data processing system can take to generate an analysis and a score for a client candidate test.

The one or more processors 310 can be configured to generate, using the one or more ML models 142, a plurality of data structures 242 for a plurality of events of the timeline of events (e.g., 276). Each event of the timeline of events (e.g., 276) can correspond to one or more actions of the plurality of actions taken at the client device 132 during creation of the computer code for the client solution 212. The one or more processors 310 can be configured to identify, using the plurality of data structures 242 and the one or more ML models 142, a subset of the plurality of data structures 242 corresponding to the subset of the entries. Each data structure 242 of the one or more data structures can correspond to one or more actions of the plurality of actions identified by comparing a score 260 to a threshold for actions indicative of the performance of a test taker at the client device 132. For instance, a score 260 can be generated based on at least a subset of the event timeline 276. The score 260 can be compared to a threshold for a level of relation or correspondence of an action to a skill sought or desired to be tested using the test problem 226. FIG. 40 illustrates an example flow diagram 4000 of operations that data processing system 102 can take to generate an analysis 266 and a score 260 for a client candidate test.

The one or more processors 310 can be configured to generate, based at least on the one or more actions and the one or more ML models 142, an annotation comprising a text on performance of a test taker at the client device. The text can be indicative or descriptive of actions, abilities, skills, or performance of the test taker at the client candidate exhibited with respect to the actions taken at the client device 132 during creation of the computer code for the client solution 212. The text can include a description of actions of the test taker implemented across the plurality of entries.

The one or more processors 310 can be configured to generate, from the timeline of events (e.g., 276), a visual representation indicative of the actions taken at the client device 132 according to timestamps 216 of the actions. The one or more processors 310 can be configured to display the visual representation of the actions according to the timestamps 216. The one or more processors 310 can be configured to provide, based at least on the timeline of events (e.g., 276) and the actions, a metric (e.g., a score 260 for an evaluation parameter 262) indicative of performance of a test taker at the client device 132 during creation of the computer code.

Figure 21:
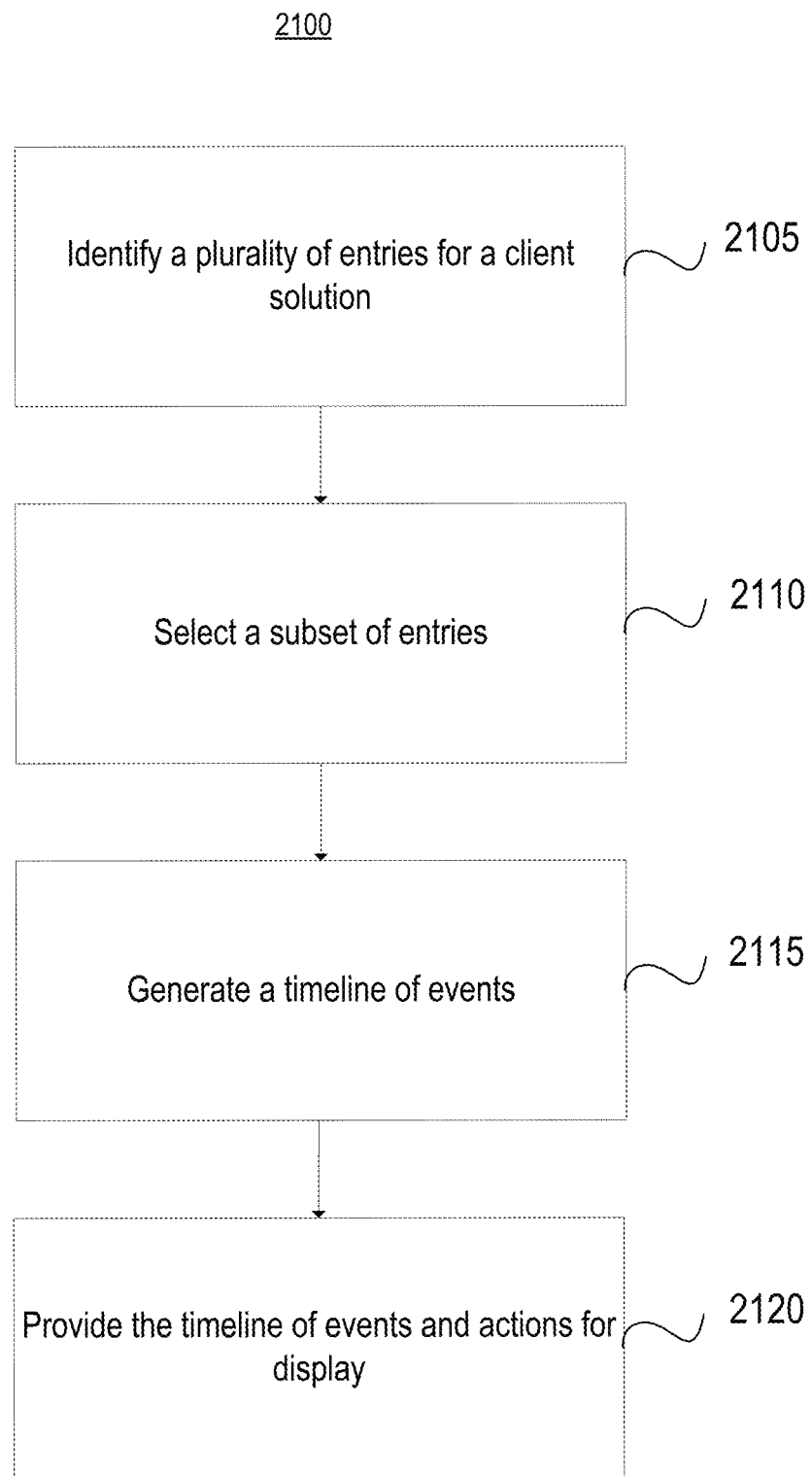
FIG. 21 is an example flow diagram of a method for an assessment of computer code performance using event timelines.
Figure 22:
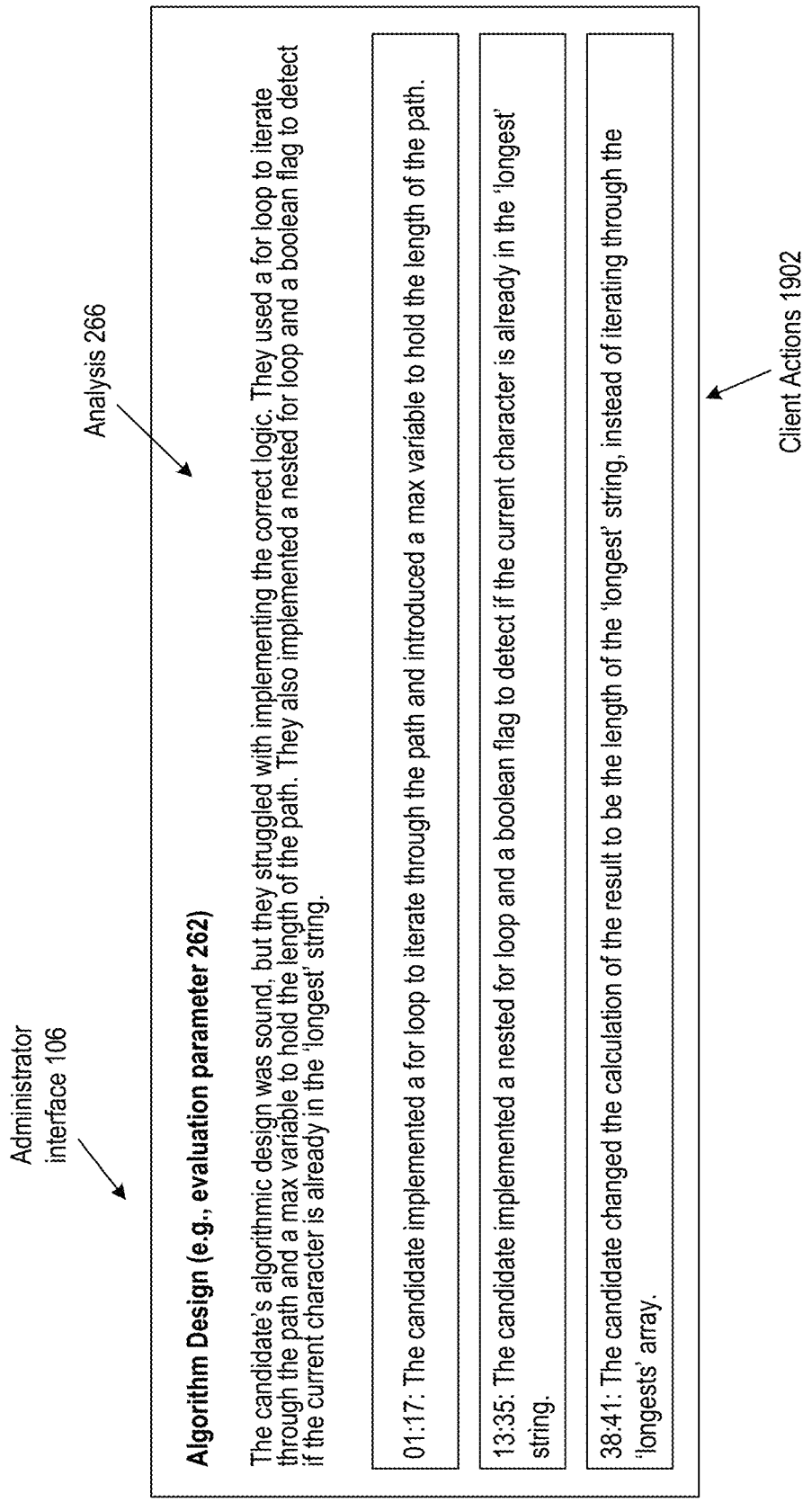
Figure 24:
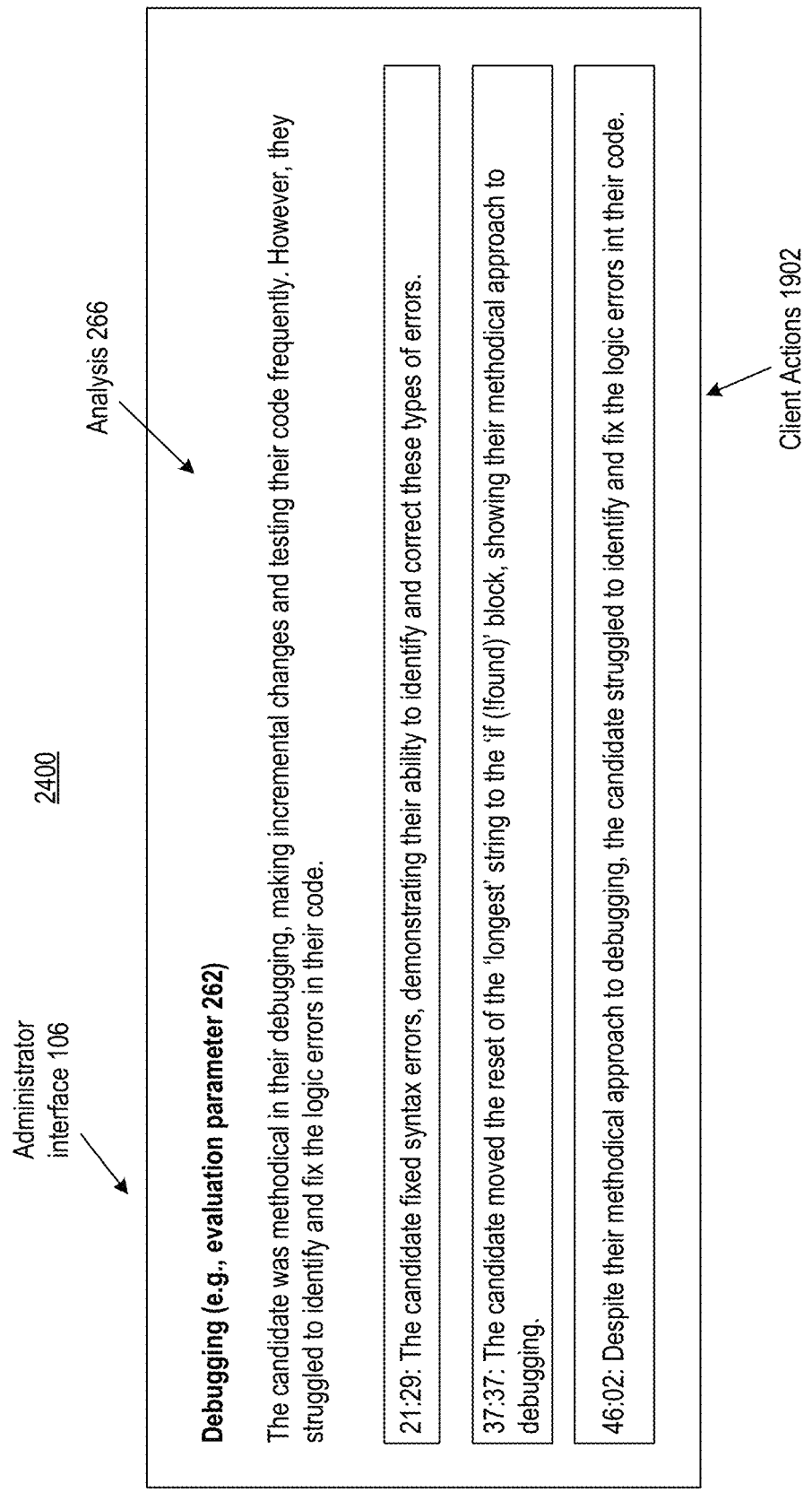
Figure 25:

FIG. 21 is an example flow diagram of a method 2100 for an assessment of computer code performance using ML-generated timelines. Method 2100 can include acts 2105 through 2120, which can be implemented, for example, using a combination of features of designs or systems discussed in connection with FIGS. 1-3. Method 2100 can be implemented alongside with, or including or using any operations or acts of methods 400, 500 or 1600 and vice versa. At 2105, the method can include identifying a plurality of entries of a computer code for a client solution of a test problem created using a client device during a testing period. At 2110, the method can include selecting, from the plurality of entries, a subset of the entries. At 2115, the method can include generating a timeline of events indicative of actions taken by the client candidate during creation of the computer code for the client solution. At 2120, the method can include providing the timeline of events and the actions for display.

At 2105, the method can include identifying a plurality of entries of a computer code for a client solution of a test problem created by a client candidate during a testing period. For example, the one or more processors can identify a first entry of the computer code for the client solution.

In another example, the one or more processors can identify a second entry of the computer code after identifying the first the computer code. Each entry of the plurality of entries can correspond to a portion of the computer code that is associated with a timestamp within the testing period. For example, the first entry of the computer code corresponds to a first stage of the test problem with a timestamp of the submission. In another example, the second entry of the computer code can correspond to a second stage of the test problem with a timestamp of submission.

The method can include identifying, from the plurality of entries, a first entry having a string of characters of the first portion of the computer code. For example, the first entry can include a string of characters in the first portion of the computer code corresponding to a first stage of the computer code. The method can include determining the state of the client solution using the string of characters of the first entry. For example, the string of characters within the first entry can correspond to a state of the test problem based on the execution of the first entry of the client solution.

The method can include identifying, from a storage device, a plurality of data structures for the plurality of entries. For example, a first data structure can include the first entry of computer code. In another example, the second data structure can include the second entry of computer code. Each of the plurality of data structures can have a timestamp attribute. The timestamp attribute can include a respective timestamp and a code attribute indicative of a respective state of the computer code for the respective timestamp. The method can include generating, using the plurality of data structures, a list of actions.

At 2110, the method can include selecting, from the plurality of entries, a subset of the entries. For example, the one or more processors can select at least three entries from the plurality of entries. In another example, the one or more processors can select at least four entries from the plurality of entries. Each entry of the subset can be selected based on a difference between a first timestamp of the entry and a second timestamp of a preceding entry of the subset that satisfies a time selection criterion. The entries can be selected based on a difference between a first portion of the computer code of the entry and a second portion of the computer code of a preceding entry of the subset that satisfies a code selection criterion. The plurality of entries can include a plurality of snapshots of the computer code created using the client device during the testing period. The plurality of snapshots can capture one or more portions of computer code during the testing period.

The method can include comparing the difference between the first timestamp and the second timestamp with the time selection criteria. For example, the one or more processors can use the time selection criteria to identify differences between the first timestamp and the second timestamp. The method can include selecting, from the plurality of entries, the subset of the entries based at least on the comparison. Using the identified differences, the one or more processors can select the respective subset of entries that satisfies the time selection criteria.

The method can include comparing the difference between the first portion and the second portion with the code selection criteria. For example, the one or more processors can use the code selection criteria to identify differences between the first portion and the second portion. The method can include selecting, from the plurality of entries, the subset of the entries based on the comparison. Using the identified differences, the one or more processors can select the respective subset of entries that satisfies the code selection criteria.

At 2115, the method can include generating a timeline of events indicative of actions taken by the client candidate during creation of the computer code for the client solution. For example, the one or more processors can generate the timeline of events, using one or more prompts and the subset of the entries input into one or more machine learning (ML) models. In another example, the one or more processors can generate the timeline of events using the plurality of snapshots input into the one or more ML models 142. In another example the one or more processors can generate a plurality of data structures for a plurality of events of the timeline of events using the one or more ML models 142. Each event of the timeline of events can correspond to one or more actions of the plurality of actions taken at the client device during creation of the computer code for the client solution.

The method can include generating an annotation that can include a text on performance of a test taker at the client device with respect to the actions taken at the client device during creation of the computer code for the client solution. For example, the one or more processors 310 can generate the annotation based at least on the one or more actions and the one or more ML models 142. The text can include a description of actions of the test taker implemented across the plurality of entries. The method can include identifying a subset of the plurality of data structures that correspond to the subset of the entries. For example, the one or more processors can generate the subset of the plurality of data structures using the plurality of data structures and the one or more ML models 142. Each data structure of the one or more data structures can correspond to one or more actions of the plurality of actions identified by comparing a score to a threshold for actions indicative of the performance of a test taker at the client device.

The method can include identifying performance data. The performance data can include at least one or more of: a test case input for the client solution, a test case output for the client solution, data on a test case applied to the client solution, data on a test case that the client solution satisfied, data on a test case that the client solution did not satisfy, data on an error for the client solution, metrics on consumption of computing resources, time to run the client solution, or data on a warning for the client solution. For example, the performance data can include the test case input for the client solution and the test case output for the client solution. In another example, the performance data can include the data on a test case applied to the client solution and the data on an error for the client solution.

The method can include generating a list of submissions for the client solution. For example, the one or more processors may generate a list of submissions for the client solution using the plurality of data structures corresponding to the performance data The method can include generating the plurality of entries. For example, the one or more processors can generate the plurality of entries using at least the list of actions and the list of submissions.

At 2120, the method can include providing the timeline of events and the actions for display by retrieving, from a storage device, the plurality of entries organized in a chronological order and indicative of a plurality of actions. The plurality of actions can include the actions. The actions can be at least one of: a keystroke of a keyboard of the client device, a copy action performed at the client device, a paste action performed at the client device, a menu selection at the client device, a user interface window selection, a click of a pointing device, or testing of the client solution using one or more test cases.

The method can include generating, from the timeline of events, a visual representation. The visual representation can represent the actions taken at the client device according to timestamps of the actions. For example, the one or more processors can display the visual representation of the actions taken according to the timestamp of when the action occurred. The method can include providing, based at least on the timeline of events and the actions, a metric indicative of performance of a test taker at the client device during creation of the computer code.

E. Performance Reports Generated Based on Automated Computer Code Analyses

Technical solutions of the present disclosure can use timestamped data entries reflective of actions taken by the client candidate on the client solution 212 to analyze the results of the client candidate's work and determine the skill level and abilities of the client candidate. The data processing system 102 can be built using entries for the timelines, such as the event timeline 276. The data processing system 102 can monitor the progress of the client candidate on the test problem 226 and create a record of the test taker's work. The data processing system 102 can detect and break down individual detailed actions of the client candidate and process this information to generate a textual (e.g., natural language) analysis and description of the client candidate's abilities. The data processing system 102 can identify, discern, or determine, using entries, such as those of the event timeline 276, various degrees of client candidate's characteristics, abilities, or skills. For instance, the data processing system 102 can determine client candidate's success on solving test problem 226, approach utilized for various aspects of the test problem 226, algorithmic skills or abilities exhibited during the testing period, the level of familiarity or command of a programming language, client candidate's debugging skills, problem solving abilities, familiarity with a subject matter or a field, or any other topic covered by candidate's approach and solution to the test problem 226. The data processing system 102 can make these determinations using machine learning and without any human input of a test provider or an administrator administering the test.

Some prior solutions can analyze candidate's test related work either through human intervention or through acceptance or rejection of results on a pass/fail basis. These solutions are normally limited to comparing the result from the client candidate with the expected results, which also limits these solutions in the scope of the issues that they can detect or what they can learn about the client candidate's abilities. For instance, by failing to take into account the approach to problem solving that the client candidate has taken, or the ways in which the client candidate has arrived at the final work product, these solutions are incapable of accurately assessing all of client candidate's abilities, skills and shortfalls. The technical solutions overcome these challenges by utilizing a data processing system 102 that utilizes timestamped timelines of events or actions from the client candidate's testing to more accurately identify the client candidate's performance. In doing so, the data processing system 102 of the technical solutions can determine the approaches that the client candidate took, how successful these approaches were and how the client candidate generated the answers, all of which allows the data processing system 102 to more accurately gauge the strengths and weaknesses of the client candidate.

The technical solutions described here can utilize timestamped data entries reflective of actions taken by client candidates to generate their client solutions 212 to more accurately analyze the work and assess the skills of the client candidates. The technical solutions can utilize entries from timelines, such as the event timeline 276 to gather information about the client candidate's progress on the test problem 226, creating a detailed record of the work process during the testing period. The technical solutions can detect and break down individual actions taken by the client candidate, processing this information to generate a textual (e.g., natural language) analysis and description of the client's abilities. For instance, by using entries, such as those in the event timeline 276, the data processing system 102 can identify and evaluate various aspects of the client candidate's characteristics, abilities, or skills. The data processing system can assess their success in solving the test problem 226, the approach used for different aspects of the problem, algorithmic skills displayed during the test, familiarity with a programming language, debugging skills, problem-solving abilities, subject matter expertise, and other relevant topics. These determinations can be made using machine learning, without any human input from test providers or administrators.

Prior solutions for assessment of client candidate test results can analyze the test-related work of a client candidate either through human intervention or by accepting or rejecting results based on a pass/fail basis. These techniques are typically limited to comparing the candidate's results with expected outcomes, restricting their ability to detect or understand the full scope of the candidate's abilities. For instance, these prior solutions can fail to account for the candidate's problem-solving approach, or the steps taken to arrive at the final product, limiting their capability to accurately assess the candidate's skills and shortcomings. Using machine learning to implement these tasks is also challenging due to ML related performance issues, such as drifting or hallucinations, leading to false-positive, inaccurate, and unreliable results, adding to the computational and energy efficiencies. The technical solutions of the present disclosure overcome these limitations by using a data processing system 102 that employs timestamped event timelines from the candidate's testing, allowing for a more focused and precise analysis of the client candidate's performance. The data processing system 102 can identify and determine the approaches taken by the client candidate, evaluate the success of these approaches, and understand how the client candidate generated their answers. This comprehensive analysis allows the data processing system 102 to more accurately gauge the candidate's strengths and weaknesses, while limiting drifting or hallucinations and conserving computational and energy resources.

To build an automated analysis, the data processing system 102 can provide a machine learning based textual analysis of the client candidate's skills using one or more timelines (e.g., event timelines 276 or highlight timelines) that can be generated based on the entries gathered during the test process. The data processing system 102 may benefit from presenting the generated timelines to the user, but simultaneously can utilize their post-processed form to transform the raw signals recorded during the candidate interview (described earlier) into a form that can be utilized for the generation of analysis.

The automated analysis can be implemented responsive to generation of the timelines (e.g., event timeline 276 or highlight timeline). The data processing system 102 list of raw timelines that were provided from the first set of calls to the LLMs can be used to perform analysis on dynamic test problems 226 with multiple test stages 236. The list of timelines from each test stage 236 can be combined and flattened into a single cohesive list for the entire test problem 226. Such a single cohesive list can include dividers (e.g., strings added within the list of objects) which can mark the location in the list at which there is a transition between test stages 236. The timeline lists can be the produced prior to the filtering process. This can allow the calls to LLMs to have as much context as possible about the candidate's journey to solving the problem. For instance, the list of entries can include all entries made by the client candidate, including the entries that are not included in the event timeline 276.

The resulting list can be transformed into a string object that can be sent to LLMs of the ML system 140. The data processing system 102 can send the string object to the LLMs along with an analysis system prompts 222. The analysis system prompts 222 can inform the LLMs that they are receiving and considering a list of timeline events, and that they can output JSON objects that can include the analysis along the aforementioned dimensions. For instance, prompts 222 can include instructions for the LLM to analyze and provide output indicative of various evaluation parameters 262, such as client candidate's algorithm design abilities, language proficiency, knowledge of a particular field or area (e.g., optical engineering, AI, regulations, or any other field or topic), debugging or troubleshooting skills, as well as any other features or dimensions of test analysis, depending on the design.

The system prompt 222 can task the ML system 140 to identify specific examples of the computer code from the client solution 212 or highlight or event timelines to help support the analysis or scores 260 determined in connection with each evaluation parameter 262 (e.g., dimension of assessment). The prompt 222 can task the ML model 142 to limit the number of examples per section to a maximum of a set number of examples (e.g., 3 examples). Each dimension (e.g., evaluation parameter 262) can be associated with a text that describes the user's performance along that particular evaluation parameter 262, and a list of example objects, where each object includes a timestamp 216 of the middle of the example action and a description of that action. In an example, the text for each section can be requested to be about two to four sentences in length and the example text can be requested to be approximately one sentence long. The length of these sentences can be chosen as the most convenient amount of information to present to the user.

In some embodiments, a separate LLM call can be utilized for each evaluation parameter 262. The system prompts 222 can instruct the utilized LLMs to provide analysis with respect to, or along, each individual evaluation parameter 262. In some embodiments, evaluation parameters 262 (e.g., analysis dimensions) can be created sequentially, where each LLM can be provided the aforementioned inputs as well as the analysis that was already provided with respect to each previously determined evaluation parameter 262. In doing so, the subsequent LLM determinations can improve their performance (e.g., accuracy, efficiency, and reliability) based on the benefits of prior analyzed evaluation parameters 262.

The TAE 120 can generate scores 260 responsive to, or based on, the analyses of the evaluation parameters 262. One or more ML models 142 can be utilized to generate a numerical score 260 for the candidate's performance. The score 260 can act as a single metric that captures both the objective performance of the client candidate (e.g., the number of test cases 204 or test stages 236 that the client candidate was able to pass) as well as the qualitative performance (e.g., the ability to recognize and implement efficient algorithms to solve the problem, the debugging skills, and more insights that are captured during the above analyses). In some implementation, scores 260 can be directed to each individual evaluation parameter 262. Instructions on how to generate scores 260 can be passed as a system prompt 222 to the scoring LLM of the ML system 140, which can use the timelines (e.g., event timeline 276, the highlight timeline or a complete list of all entries for all actions of the client candidate). Using such inputs or prompts, the ML system 140 can utilize the analyses to generate the scores 260.

The system prompt 222 can ask the LLM to provide a score 260, as well as a justification for a given score. In an example, the score 260 can be a value from 0-100. In some implementations, the score 260 can include a qualitative score (e.g., excellent, good, fair, or poor), a numeric score that has discrete options (e.g., 1, 2, 3, 4 and 5) or using other approaches. In an example, the explanation that is produced by the scoring model may not be utilized in generating the score 260, while in some implementations the analysis is used by the scoring model to generate the scores 260. In some examples, asking the ML model 142 to provide an explanation for its results can lead to more accurate scoring. The delivered explanation might be used for user display or other purposes.

The results can be stored in a table output format, such as a completed interviews table (see FIG. 18) and can be ready to be served to the evaluator in the frontend of the data processing system 102 (e.g., admin interface 106). The output table (e.g., the interviews table) can be organized as a data structure 242 that stores an association between the results from the analyses and an interview identifier or a profile identifier of the client candidate being assessed.

The text-based results can be stored in a text-based form (e.g., a report 264) that can include a section header for each of the evaluation parameters 262 (e.g., analysis dimensions assessed). The summary section of the report 264 can provide a summary of the analyses, whereas individual evaluation parameter sections (e.g., sections on algorithm design, language proficiency, and debugging) can be minimized as to not overwhelm the user with information. Each section corresponding to each evaluation parameter 262 can include a header that the admin user can select to expand or minimize the section.

For instance, FIGS. 19-20 and 22-26 illustrate examples 1900, 2000, 2200, 2300, 2400, 2500 and 2600 of various GUIs of administrator interface 106 providing descriptions of client performance, including for instance client actions 1902, analyses 266 for specific evaluation parameters 262 and computer code of the client solutions 212. As shown in examples 1900-2000 and 2200-2600, when a report section is expanded, the text generated (e.g., analysis 266) corresponding to the relevant dimension (e.g., evaluation parameter 262) can be displayed on the administrator interface 106. The examples of client actions 1902 taken with respect to the computer code for the expanded dimensions can also be displayed along with the textual analysis. For each example, the data processing system 102 can calculate the time elapsed from the example timestamp 216 along with the description of the example. When an example is selected by the admin user, the corresponding timestamp 216 can be shown within the code editor to reveal the evidence from the given example.

The ability to click on computer code examples along with the timeline examples can allow the admin users (e.g., client candidate evaluators) to review and verify the analyses or timelines generated autonomously and access the raw data (e.g., user actions, such as keystrokes and entries) that led to the analyses and conclusions with respect to each evaluation parameter 262.

The score 260 for each analysis section (e.g., each individual evaluation parameter 262) can be provided at the frontend results page viewed by the evaluator. The score 260 can be exported to autonomously transition candidates through the interview process (in some cases, users of the data processing system 102 can comply with local laws and regulations when doing so). In an example, the data processing system 102 has pre-selected the four dimensions (e.g., 262) on which text-based analyses can be generated for the given client candidate. The dimensions considered can be altered or made custom by the admin user in preparation for the analysis or the test. The system prompt 222 of the analysis LLM can be changed to generate different results for each dimension. The dimensions may be determined either before or after the client candidate has created the candidate solution. In some examples, the admin user can provide a title and a short description of the preferred dimensions (e.g., evaluation parameters 262). The number of dimensions can be adjusted (e.g., increased or decreased) for any test being generated or for any analysis of any previously performed test. In multi-stage test problems 226, scores 260 can correspond to each of the test stages 236 or to various individual evaluation parameters 262 tested in each of the individual test stages 236. The ability to deliver results for dynamically selected dimensions can be included in this data processing system 102. In some examples, the analysis can be presented in various formats, including written report 264, individual analyses 266 or live or hybrid interview setting. Analyses can be included as part of a recap playback for the evaluator. For instance, the analyses 266 data can be included within a content to play to the user. For instance, one or more calls can be utilized to assign a subset of the user-facing timeline items to each analysis dimension, allowing the evaluator-viewed results to be more cohesive.

In one example, one or more processors 310 of a computing environment 300 coupled with memory 315 can include instructions, computer code and data to provide reports 264 with textual analyses 266 for various evaluation parameters 262 tested by the test problems 226. For instance, the one or more processors 310 can be configured, via computer code, instructions, or data in the memory 315, to generate analyses 266 for various evaluation parameters 262 along with scores 260 for the client candidate performance.

The one or more processors 310 can be configured to identify a plurality of code portions 214 of a computer code for a client solution 212 of a test problem 226. Each code portion 214 can correspond to a respective timestamp 216 of a plurality of timestamps 216. The one or more processors 310 can be configured to generate, using one or ML models 142, a timeline. The timeline can include a series of entries corresponding to a plurality of actions of a test taker (e.g., keystrokes entered, input device actions or GUI selections) recorded by the code recorder 210 during the testing process. A timeline generator 274 can generate a timeline using the plurality of code portions 214 and corresponding timestamps 216 of the plurality of timestamps 216. The timeline generated by the timeline generator 274 can identify a plurality of actions performed in creating the client solution 212.

The one or more processors 310 can be configured to generate, for each evaluation parameter 262 of a plurality of evaluation parameters, a textual output describing performance along the evaluation parameter and a description of one or more actions of the sequence of actions associated with the evaluation parameter 262. The textual output can include one or more textual analyses 266 of dimensions or evaluation parameters 262. For instance, the TAE 120 can generate the textual output (e.g., analysis 266) for each evaluation parameter 262 using the one or more ML models 142, the timeline, the plurality of code portions and corresponding timestamps. The one or more processors 310 can be configured to provide, for display, a report 264 that can include the textual output (e.g., analysis 266) for each of the plurality of evaluation parameters 262. The report can be generated based on the one or more actions of the sequence of actions indicative of one or more evaluation parameters 262.

The one or more processors 310 can be configured to generate, using the one or more ML models 142 and the textual output (e.g., analysis 266), one or more scores 260 corresponding to one or more evaluation parameters 262 of the plurality of evaluation parameters 262. The one or more processors 310 can be configured to store, in one or more data structures 242, an association between an identifier of the client solution 212, the textual output (e.g., analysis 266), and the one or more scores 260.

The one or more processors 310 can be configured to generate, using the one or more ML models 142, a list of one or more objects corresponding to one or more code portions 214. Each object of the one or more objects can include including a timestamp 216 of the plurality of timestamps corresponding to an action of the plurality of actions. The one or more evaluation parameters 262 can correspond to at least one of: a problem-solving approach, an ability to develop an algorithm, a proficiency in a programming language of the computer code, a demonstration of secure software coding practice, or an ability to debug the computer code.

The one or more processors 310 can be configured to generate, using the one or more ML models 142, a plurality of scores 260 corresponding to the plurality of evaluation parameters 262. The one or more processors 310 can be configured to generate, using the one or more ML models 142 and the plurality of scores 260, a performance metric (e.g., score 260) for the plurality of evaluation parameters 262 of the client solution 212. For example, the performance metric can include an indicator of the level of client candidate performance with respect to a particular evaluation parameter 262.

The one or more processors 310 can be configured to identify a plurality of lists of events corresponding to a plurality of test stages 236 of the test problem 226. The plurality of test stages 236 including a test stage 236 corresponding to the plurality of actions. The one or more processors 310 can be configured to combine the plurality of lists of events (e.g., 276) into a list of events of the plurality of test stages 236. The list of events can include one or more markers indicative of one or more transitions between the plurality of stages 236. The one or more processors 310 can be configured to generate the plurality of entries using the list of events.

The one or more processors 310 can be configured to select, using the one or more ML models 142, from the plurality of actions, an action corresponding to one or more code portions 214 of the plurality of code portions in support of a score 260 corresponding to an evaluation parameter 262 of the one or more evaluation parameters 262. The one or more processors 310 can be configured to store, in one or more data structures 242, an association between the client solution 212, the score 260 and at least one of the action or the one or more code portions 214.

The one or more processors 310 can be configured to provide, for display via a user interface (e.g., 106), a summary section of the report 264. The summary section of the report 264 can include a description of a respective performance along each evaluation parameter 262 of the plurality of evaluation parameters according to one or more scores 260 corresponding to one or more evaluation parameters 262 of the plurality of evaluation parameters 262.

The one or more processors 310 can be configured to provide, for display via a graphical user interface (e.g., of an interface function 104 or an admin interface 106), a plurality of sections of the report 264. Each section of the plurality of sections can correspond to an evaluation parameter 262 of the plurality of evaluation parameters 262. The one or more processors 310 can be configured to receive, via the user interface of the admin interface 106, a selection of a section of the plurality of sections. The one or more processors 310 can be configured to display, via the user interface (e.g., 104 or 106), the section including the textual output (e.g., analysis 266) that can correspond to the respective evaluation parameter.

The one or more processors 310 can be configured to receive, via a user interface (e.g., 104 or 106), one or more selections corresponding to a plurality of sections of the report 264. The plurality of sections can correspond to the plurality of evaluation parameters 262. The one or more processors 310 can be configured to identify, based on the one or more selections, the plurality of evaluation parameters 262 to use for the test problem 226 and one or more weights for the plurality of evaluation parameters 262. The one or more processors 310 can be configured to generate, based at least on the one or more selections, the textual output (e.g., analysis 266) for the plurality of evaluation parameters 262 according to the one or more weights selected via the user interface. The weights can correspond to a level of importance of a particular evaluation parameter 262 for the given analysis. For example, a score 260 can be generated for client candidate applicants for a given position (e.g., a software engineering computer designer position) in which particular evaluation parameters 262 (e.g., familiarity with Python) can be given a weight parameter that is larger than a weight parameter of another evaluation parameter 262 (e.g., familiarity with JSON).

The one or more processors 310 can be configured to receive the identifier of the client solution 212 and a request to generate the report 264. The one or more processors 310 can be configured to generate, using the one or more data structures 242 and the one or more ML models 142, the report 264 for the one or more evaluation parameters 262.

The one or more processors 310 can be configured to generate the report 264 comprising the timeline. The timeline can include a timeline of all actions taken by the client candidate during the testing, or a subset of actions (e.g., event timeline 276) that is generated or selected based on filtering parameters (e.g., validity conditions 272). The one or more processors 310 can be configured to receive, via a user interface (e.g., 104 or 106), a selection of an action of the plurality of actions in the timeline. The one or more processors 310 can be configured to provide, for display via the user interface, responsive to the selection, one or more code portions 214 of the plurality of code portions 214 corresponding to the action. For instance, a series of code portions 214 (e.g., series of snapshots) can be indicative of a particular action taken on the computer code of the client solution 212. The series of snapshots can be displayed to illustrate the given action.

The one or more processors 310 can be configured to at least one of a plurality of evaluation parameters 262 is input in a text format via a graphical user interface (e.g., 104). The one or more processors 310 can be configured to identify, from a plurality of clients, a client according to the textual output (e.g., analysis 266) and one or more evaluation parameters. The plurality of clients can include a plurality of client candidates who are test takers applying for a position of an enterprise (e.g., computer software engineer architect position) for which the test problem 226 was designed. The textual output of the analysis 266 indicative of the level of skill for a particular evaluation parameter 262 can be used as a basis for selecting a particular client candidate with a particular desired skill level along a particular dimension (e.g., evaluation parameter 262).

Figure 27:
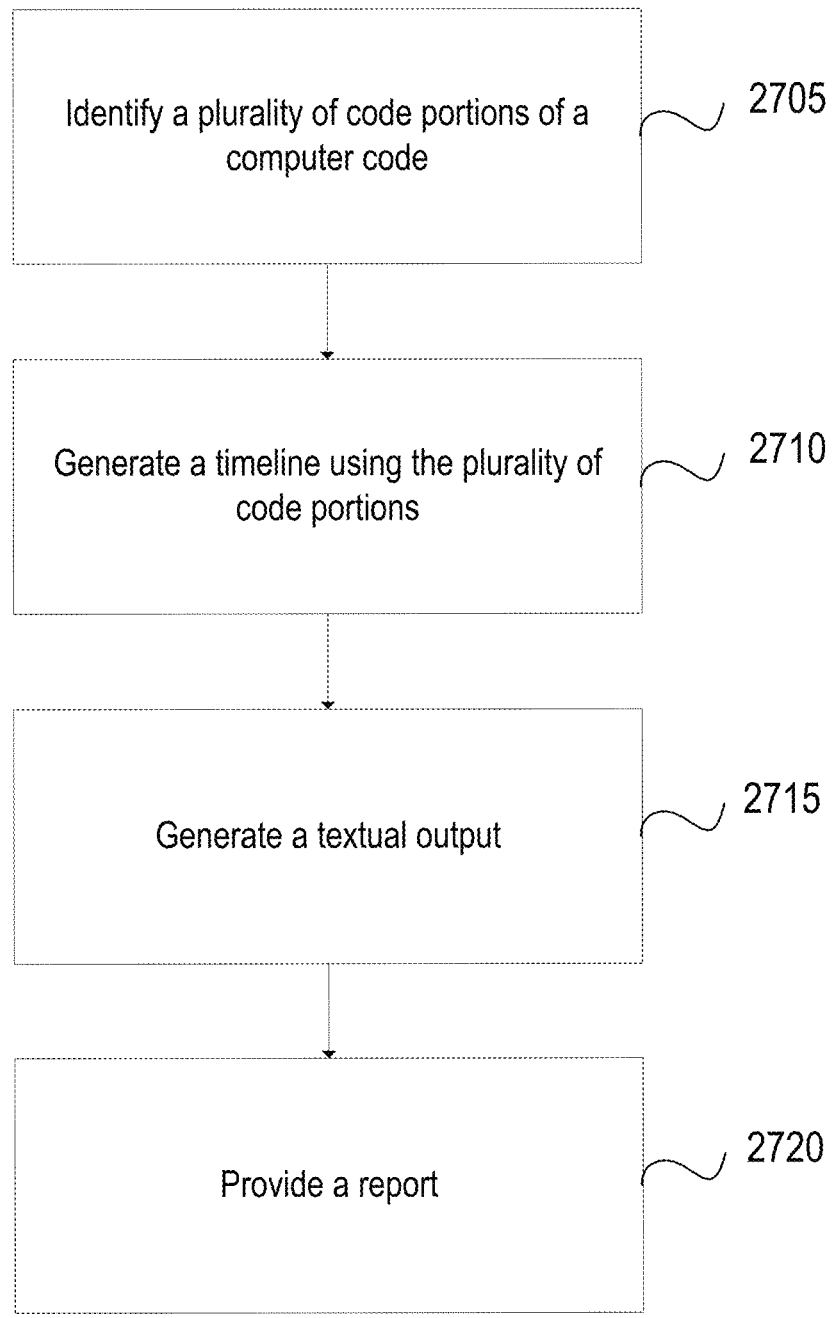
FIG. 27 is an example flow diagram of a method for a candidate performance report generated based on automated computer code analysis.

FIG. 27 is an example flow diagram of a method 2700 for a candidate performance report generated based on automated computer code analysis. Method 2700 can include acts 2705 through 2720, which can be implemented, for example, using a combination of features of designs or systems discussed in connection with FIGS. 1-3. Method 2700 can be implemented alongside with, or including or using any operations or acts of methods 400, 500, 1600, 2700, and vice versa. At 2705, the method can include identifying a plurality of code portions of a computer code for a client solution of a test problem. At 2710, the method can include generating a timeline using the plurality of code portions and corresponding timestamps of the plurality of timestamps. At 2715, the method can include generating a textual output. At 2720, the method can include providing, by the one or more processors, for display, a report based on the one or more actions of the sequence.

At 2705, the method can include identifying a plurality of code portions of a computer code for a client solution of a test problem. For example, the one or more processors can identify a first code portion of the computer code for a client solution. Each code portion can correspond to a respective timestamp of a plurality of timestamps. For example, the first code portion can associate with a first timestamp whereas a second code portion can associate with a second timestamp.

The method can include identifying a plurality of lists of events corresponding to a plurality of stages of the test problem. For example, a first list can correspond to a first stage. The plurality of stages can correspond to the plurality of actions. For example, each stage in the plurality of stages can correspond to at least one action in the plurality of actions.

The method can include combining the plurality of lists of events into a list of events, such as by flattening the timelines from different stages into a central timeline of the test as a whole. The list of events can include one or more markers indicative of one or more transitions between the plurality of stages. For example, each event in the list of events can include marker between a first stage and a second stage. The method can include generating the plurality of entries using the list of events. For example, the one or more processors can generate a first entry using a first list of events by indicating the transitions between the first stage and the second stage.

At 2710, the method can include generating a timeline, using the plurality of code portions, corresponding timestamps of the plurality of timestamps, and using one or more machine learning (ML) models. For example, the one or more processors can generate the textual output using a first code portion with the corresponding timestamp of the first code portion, and the one or more ML models. The timeline can identify a plurality of actions performed in creating the client solution.

The method can include generating a list of one or more objects. The list of one or more objects can correspond to one or more code portions. For example, the first objects in the list can correspond to a first code portion. Each object of the one or more objects can include a timestamp of the plurality of timestamps. Each timestamp can correspond to an action of the plurality of actions. For example, the one or more processors can identify a first object that corresponds to an action at a timestamp.

At 2715, the method can include generating a textual output. For example, the one or more processors can use the one or more ML models, the timeline, the plurality of code portions and corresponding timestamps, for each evaluation parameter of a plurality of evaluation parameters to generate the textual output. At least one evaluation parameter can be input in a text format via a graphical user interface. The textual output can describe performance along the evaluation parameter and a description of one or more actions of the sequence of actions associated with the evaluation parameter. For example, the textual output can describe performance along a first evaluation parameter. The evaluation parameter can correspond to at least one of: a problem-solving approach, an ability to develop an algorithm, a proficiency in a programming language of the computer code, a demonstration of secure software coding practice, or an ability to debug the computer code.

The method can include generating a plurality of scores corresponding to the plurality of evaluation parameters. For example, the one or more processors can use the one or more ML models, to generate the plurality of scores. The method can include generating a performance metric for the plurality of evaluation parameters of the client solution. For example, the one or more processors can use the one or more ML models and the plurality of scores to generate the performance metric.

The method can include generating one or more scores. The one or more scores can correspond to one or more evaluation parameters of the plurality of evaluation parameters. For example, the one or more processors can use the one or more ML models and the textual output to generate the one or more scores. From here, the one or more processors can store, in one or more data structures, an association between an identifier of the client solution, the textual output, and the one or more scores.

The method can include selecting, from the plurality of actions, an action. The action can correspond to one or more code portions of the plurality of code portions in support of a score. The score can correspond to an evaluation parameter of the one or more evaluation parameters. For example, the one or more processors can use the one or more ML models to select the action from the plurality of actions, thereby indicating a score corresponding to an evaluation parameter.

The method can include receiving a selection of an action of the plurality of actions in the timeline. The action can be at least one of: a keystroke of a keyboard of the client device, a copy action performed at the client device, a paste action performed at the client device, a menu selection at the client device, a user interface window selection, a click of a pointing device, or testing of the client solution using one or more test cases. For example, the one or more processors can receive, via a user interface, the selection of the action such as a keystroke of a keyboard of the client device.

The method can include storing in one or more data structures, an association between the client solution, the score and at least one of the action or the one or more code portions. For example, the data structure can be a linked list and the associations between the client solution, the score and at least one of the action or the one or more code portions can be one or more nodes within the list.

The method can include receiving the identifier of the client solution and a request to generate the report. For example, the one or more processors can receive the identifier of the client solution in response to a user of the client device completing each stage in the test problem. Upon completion, the admin device can transmit a request to generate the report. The method can include generating the report for the one or more evaluation parameters. For example, using the one or more data structures and the one or more ML models, the one or more processors can generate the report for the one or more evaluation parameters. In another example, the one or more processors can generate the report including the timeline.

The method can include receiving one or more selections corresponding to a plurality of sections of the report. For example, the one or more processors can receive, via an interface, the one or more selections corresponding to the plurality of sections of the report. In another example, the one or more processors can receive a first selection corresponding to a first section of the report. The plurality of sections can correspond to the plurality of evaluation parameters. For example, a first section can correspond to a first evaluation parameter.

The method can include identifying the plurality of evaluation parameters to use for the test problem. For example, the one or more processors can use a first selection in the one or more selections to identify a first evaluation parameter in the plurality of evaluation parameters. The method can include identifying one or more weights for the plurality of evaluation parameters. For example, the one or more processors can use a first selection in the one or more selections to identify one or more weights for the plurality of evaluation parameters. The one or more weights can correspond to an importance of the respective evaluation parameter in the plurality of evaluation parameters.

The method can include generating the textual output for the plurality of evaluation parameters according to the one or more weights selected via the user interface. For example, using at least the one or more selections, the one or more processors can generate the textual output. Continuing on, the one or more processors can identify, from a plurality of clients, a client according to the textual output and one or more evaluation parameters. For example, the one or more processors can identify a first client based on the textual output and based on one to three evaluation parameters.

The method can include providing, for display via the user interface, one or more code portions of the plurality of code portions corresponding to the action. For example, the one or more processors can provide a first code portion corresponding to the action responsive to the selection of the action.

At 2720, the method can include providing, by the one or more processors, a report. For example, the one or more processors can provide the report for display. In another example, the one or more processors can provide the report for display based on the one or more actions of the sequence. The report can include the textual output for each of the plurality of evaluation parameters.

The method can include providing a summary section of the report. For example, the one or more processors can provide the summary section of the report for display via a user interface. The summary section can include a description of a respective performance along one or more evaluation parameter of the plurality of evaluation parameters. For example, the summary section can include a description of a respective performance along each evaluation parameter of the plurality of evaluation parameters according to one or more scores corresponding to one or more evaluation parameters of the plurality of evaluation parameters.

F. Automated Delivery of Assistance to a Client Candidate

The data processing system 102 can be capable of providing autonomously generated assistance to a client candidate during the testing period, such as to provide assistance with the client candidate's work on a test problem 226 that may be challenging to the client candidate. Detecting that a client candidate is facing challenges on a test problem 226 and that assistance may be desirable, can be a challenge. In some instances, client candidates can merely take longer than usual to organize their thoughts or develop a strategy to complete the client solution 212. In prior solutions, manual solution and monitoring can be provided, which is undesirable, time consuming and introduce variability for different client candidates. Utilizing ML for this purpose can be challenging due to performance issues of ML models, which can affect the output accuracy and reliability. This in turn can increase computational and energy resources of the system and impact user experience.

The technical solutions can overcome these limitations by providing candidate assistance during an interview based on detection of client candidate reaching an obstacle that they are unable to overcome through ML-based monitoring and analysis of the client candidate progress. The technical solutions can include functionalities for monitoring and detecting one or more of client's algorithmic successes, their methodology, their programming skills, and other progress metrics. Based on these determinations, the technical solutions can determine events in which the client candidate can use the assistance. The assistance can be provided in single-stage and dynamic (e.g., multi-stage) test problems allowing the client candidate to be more meaningfully tested in the areas in which client candidate performance can reveal more information about client's abilities and skills.

The client candidate assistance can be provided by a client assistance engine that can operate while users attempt to solve problems within the platform interface and code editor. When the engine recognizes that the candidate seems "stuck," (e.g., detecting delay in progress) the client assistance engine can assist the client candidate in providing an answer to solve the problem via a variety of methods. For example, there are one or more forms in which the assistance engine can help the candidate, which the engine can recognize and decide when to utilize these methods.

In an example, there can be four modes in which the engine can assist the client candidate in passing the stage via fixing their code. A first mode can include a function to "change line". This technique or method can allow the engine to replace one line of candidate code with a line of code that corrects a client candidate mistake and passes the failing test cases 204. When this technique is used, the incorrect line can be highlighted and replaced by the new line in view of the client candidate, allowing the client candidate to complete the test stage 236. When the "change line" method is used or selected, the backend service can use an LLM to generate the line change. The service can send the candidate's current code, the description of the current stage, and test case details (inputs, expected outputs, failing tests, console logs, error messages, etc.), which can be provided as inputs to the ML model system 140. Included with the inputs can be a system prompt 222 instructing the ML model 142 to output a JSON object with original code that should be changed along with the new code. In some embodiments, the system prompt 222 can remind the ML model 142 that the ML model 142 is only allowed to change one line of code. In some embodiments, there may be no explicit constraint on the amount of code that is changed by this ML model 142. Once the ML model 142 returns a valid JSON object, the results can be propagated back to the front-end, where the change can be executed for the candidate. In another embodiment, the "change line" technique could allow for changing n lines of code (for example, the value of n is three).

A second technique or mode can include the function to "finish with comments". As the name implies, this mode can use the backend service to append to the candidate's solution, comments that help hint the candidate find the correct answer. More specifically, the backend service can use an LLM to generate the assistive comments, and then append the comments to the current code. The inputs provided to this ML model 142 can be the same as described in the change line case previously. The system prompt can instruct the ML model 142 on how to generate the comments. In an embodiment, the comments may not necessarily have to be appended to the code. Such a "hint" feature can provide text on the screen giving candidate information on what to try next. In an embodiment, this feature can be used not only to assist with unfinished code but show the candidate where there might be an error in their logic, again either by writing a comment within the client solution 212 code or displaying text on screen.

A third mode can include a function to "highlight error", which can highlight the line(s) or areas of code that contain the error(s) that cause issues for the candidate. This can be done similarly to the change line method. The backend service can pass the same inputs into the large language model, this time instructing the ML model 142 to output a JSON valid list of strings that should be highlighted for the client candidate.

A fourth mode can include a function to "solve", where the assist engine can solve the problem for the client candidate. In this case, the backend service can make a call to the LLM with the same items as the first three methods, along with a copy of the actual solution for the problem, saved in the stage details or data structure. In this call, the system prompt can instruct the ML model 142 to create a solution for the problem that as closely as possible mimics the client candidate's attempt, reusing their code as possible. Once the solution is parsed and returned from the ML model output, the data processing system 102 then run the solution against the test cases for the test stage, using the same functionality as that described in Section B of this disclosure when the problem creation service first generates the candidate solutions. The iterative process if the solution fails can be followed similarly in this case up to k times (k=3 In an example). If the iterative process still fails, then the prewritten solution can be provided back to the candidate. In some embodiments, there could be an additional mode that just writes one additional comment instead of the full line of comments, or a method that writes the next character, token, or line of code.

A component of the data processing system can include the candidate assistance engine that includes the function that makes a determination or decision of when to assist the candidate, and what mode to deploy. The data processing system 102 can make binary decisions on whether or not to intervene, and these binary decisions can be made on a set schedule. The first binary decision can be performed when the candidate spends at least one half of the overall time bank on the current stage. Additional binary decisions can be made every four minutes thereafter. The data processing system 102 can be extended to work on a more complex schedule of binary decisions, including alternating the frequency of checks based on the difficulty of the problem, number of stages, or candidate preference and can be straightforward to implement.

When a binary decision event occurs, a large language model in the backend service can be tasked with determining whether to intervene to assist the candidate given their current progress on the stage. Again, the stage details, current code, and test case details are provided to this ML model. The system prompt can explain the expected progress of the problem over time and ask for a binary decision as well as an explanation, encoded within a JSON object. In an example, the explanation of the JSON object can be not utilized. For example, it can be requested to help improve the quality of the model's binary decision.

When the binary decision event returns an affirmative response (e.g., a yes) and decides to intervene, an additional model call can be then utilized to determine which assist method to deploy. This can be performed by supplying the same inputs to the model, along with a system prompt that explains what methods are available and the right context to utilize each of the four explained methods. The model can return one of the four methods to use within a JSON object, which then triggers the relevant method to trigger and assist the candidate.

Figure 28:
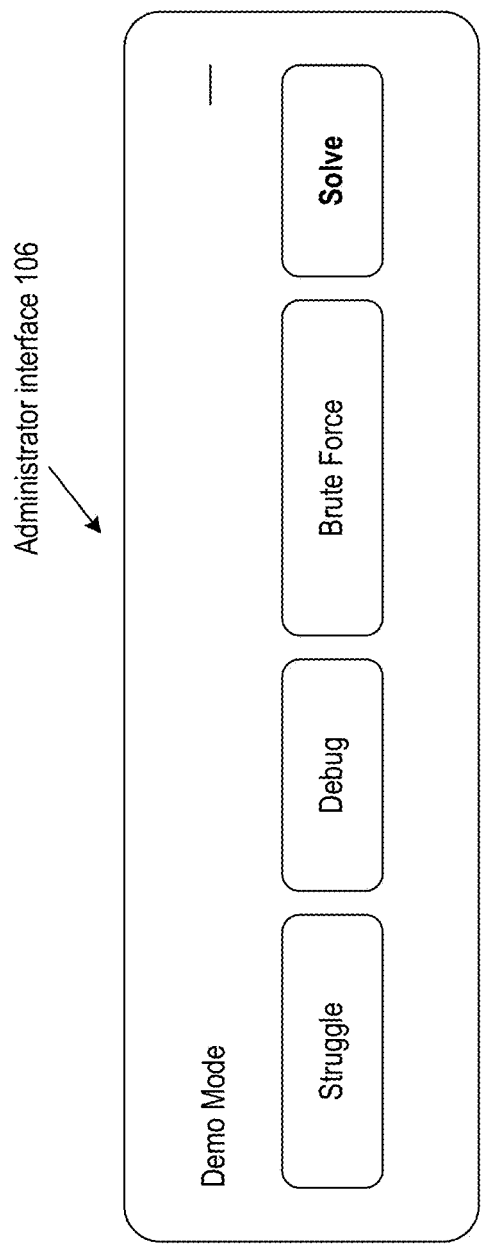

In an example, the candidate assistance engine can intervene to change the code after the candidate does not make an edit in the code editor for up to 1000 to 3000 ms, 5 seconds, 10, seconds 15 seconds, 20 seconds or 30 seconds, after the proposed change is ready to be deployed. This can be an option for the user or can be revealed to the user utilizing some other medium. Any assistance actions can be saved to the current attempts table. (See FIG. 11). Closely related to the candidate assistance engine in an embodiment can be the feature demonstrative (demo) mode, which allows prospective users of the application to quickly explore and evaluate the platform. This can be illustrated, for example, in example 2800 of a demo feature shown in FIG. 28 and example 2900 of a GUI of administrator interface 106 illustrated in FIG. 29.

For instance, when demo mode is selected, for clients or "candidates" (this mode can be generally reserved for prospects evaluating the platform) can be given a modal in the lower right corner of the code editor (e.g., in example 2900) to allow the users to use large language models to quickly use the problem. This setting can be similar to the data processing system 102's process of creating synthetic results, such as those described in Section C. For example, there can be three options within demo mode; "Struggle", "Solve" and "Brute Force". For example, the solve option can operate the same as the solution described in Section B. The backend service can stream the correct solution back into the code editor for the user. The struggle capability can operate the same as that described in Section C. A large language model in the backend service can be provided with the problem stage description, the test case details, and boilerplate. The LLM can asked or prompted to generate an incorrect solution for the problem. The brute force option can work in a similar form. In this case the backend service can instruct the large language model to provide a correct algorithm to the problem, but one that brute forces (solves in a simple but inefficient method) the solution. This mode can be designed to allow the employer staff to explore how the results provided by the platform adapt to candidate performance.

The technical solutions can create custom problems in minutes, adjust a problem's difficulty (both to increase difficulty and reduce difficulty) in response to user actions, and automatically generate detailed results of the assessment powers. Some of the description herein corresponds to system components or groupings of operations and responsibilities of these system components any of which can operate within technical solutions. Different functions or modules can be implemented in hardware, software or any combination of hardware and software, such as computer instructions on a non-transient computer readable storage medium, and modules can be distributed across various hardware or computer-based components.

The systems described above can provide multiple ones of any or each of those components and these components can be provided on either a standalone system or on multiple instantiations in a distributed system. In addition, the systems and methods described above can be provided as one or more computer-readable programs or executable instructions embodied on or in one or more articles of manufacture. The article of manufacture can be cloud storage, a hard disk, a CD-ROM, a flash memory card, a PROM, a RAM, a ROM, or a magnetic tape. In general, the computer-readable programs can be implemented in any programming language or a script, such as Python, JavaScript Object Notation (JSON), LISP, PERL, C, C++, C#, PROLOG, or in any byte code language such as JAVA. The software programs or executable instructions can be stored on or in one or more articles of manufacture as object code.

Example and non-limiting module implementation elements can include or use input providing devices, such as touchscreens, computer selection devices (e.g., computer mouse), detectors or sensors that can provide any value determined herein, as well as sensors providing any value that is a precursor to a value determined herein, datalink or network hardware including communication processors, circuits or chips, oscillating crystals, communication links, cables, twisted pair wiring, coaxial wiring, shielded wiring, transmitters, receivers, or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), or digital control elements.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. The program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices include cloud storage). The operations described in this specification can be implemented as operations performed by a data processing apparatus on data stored on one or more computer-readable storage devices or received from other sources.

The terms "computing device", "computing environment", "component" or "data processing apparatus" or the like encompass various apparatuses, devices, and machines for processing data, including by way of example a programmable processor, a memory, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data can include non-volatile memory, media, and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts or operations and those elements can be combined in other ways to accomplish the same objectives. Acts, elements, and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements from any section or paragraph, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an embodiment", "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence has any limiting effect on the scope of any claim elements.

Modifications of described elements and acts such as variations in sizes, dimensions, structures, shapes and proportions of the various elements, values of parameters, mounting arrangements, numbers of inputs or outputs, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes, and omissions can also be made in the design, operating conditions and arrangement of the disclosed elements and operations without departing from the scope of the present disclosure.

For example, descriptions of positive and negative electrical characteristics may be reversed. For example, a positive or a negative parameter, input, or difficulty direction with respect to a testing system can be increased or decreased, as desired. Elements described as negative or decreasing in value can instead be configured as positive or increasing in value and vice versa. For example, elements described as having a lower difficulty level can have a higher difficulty level and vice versa. Further relative parameter values described with respect to other values can include variations within +/−10% or +/−10 degrees of a pure stated value, such as with +/−10 degrees of a pure vertical, parallel, or perpendicular positioning or a signal value. References to "approximately," "substantially" or other terms of degree include variations of +/−10% from the given measurement, unit, or range unless explicitly indicated otherwise. Coupled elements can be electrically, communicatively, mechanically, or physically coupled with one another directly or with intervening elements.

While the disclosure has been described with respect to specific embodiments, one skilled in the art will recognize that numerous modifications are possible. For instance, although specific examples of rules (including triggering conditions and/or resulting actions) and processes for generating suggested rules are described, other rules and processes can be implemented. Embodiments of the disclosure can be realized using a variety of computer systems and communication technologies including but not limited to specific examples described herein.

Embodiments of the present disclosure can be realized using any combination of dedicated components and/or programmable processors and/or other programmable devices. The various processes described herein can be implemented on the same processor or different processors in any combination. Where components are described as being configured to perform certain operations, such configuration can be accomplished, e.g., by designing electronic circuits to perform the operation, by programming programmable electronic circuits (such as microprocessors) to perform the operation, or any combination thereof. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present disclosure may be encoded and stored on various computer readable storage media; suitable media include magnetic disk or tape, optical storage media such as compact disk (CD) or DVD (digital versatile disk), flash memory, and other non-transitory media. Computer readable media encoded with the program code may be packaged with a compatible electronic device, or the program code may be provided separately from electronic devices (e.g., via Internet download or as a separately packaged computer-readable storage medium).

Thus, although the disclosure has been described with respect to specific embodiments, it will be appreciated that the disclosure is intended to cover all modifications and equivalents within the scope of the following claims.

The machine learning model may be periodically and/or continuously trained. For instance, as the recommendations (or other predictions and derived information) are presented to the end-user, the system may monitor the end-user's behavior (e.g., whether a recommendation was accepted/rejected or whether a predicted attribute was revised). The monitored data may be fed back into the machine learning model to improve its accuracy. The machine learning model can re-calibrate itself accordingly, such that the results are customized for the end-user.

It should be understood that the disclosed embodiments are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. Thus, it is to be understood that other embodiments can be utilized and functional, logical, operational, organizational, structural and/or topological modifications may be made without departing from the scope of the disclosure. As such, all examples and/or embodiments are deemed to be non-limiting throughout this disclosure.

Some embodiments described herein relate to methods. It should be understood that such methods can be computer implemented methods (e.g., instructions stored in memory and executed on processors). Where methods described above indicate certain events occurring in a certain order, the ordering of certain events can be modified. Additionally, certain of the events can be performed repeatedly, concurrently in a parallel process, when possible, as well as performed sequentially as described above. Furthermore, certain embodiments can omit one or more described events.

All definitions, as defined and used herein, should be understood to control over dictionary definitions, definitions in documents incorporated by reference, and/or ordinary meanings of the defined terms.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A system for validating machine learning (ML) model generated candidate solutions to test problems using ML model generated test cases, the system comprising:
one or more processors coupled with memory configured to:
cause, responsive to inputting one or more prompts including a description of a test problem for evaluating skills of a user to write computer code into one or more ML models, the one or more ML models to generate:
(i) an ML generated candidate solution for the test problem, the ML generated candidate solution comprising an ML generated computer code; and
(ii) an ML generated JavaScript Object Notation (JSON) test case object that includes at least one input value and at least one output value to validate the ML generated candidate solution for the test problem;
pass, to a function executed in an execution environment, the at least one input value of the ML generated test case object using the ML generated candidate solution;
validate, by executing the ML generated test case object against the function in the execution environment, the ML generated candidate solution by passing the at least one input value of the ML generated test case object to the function as an argument and comparing the output of the function utilizing the ML generated candidate solution with the at least one output value of the ML generated test case object; and
store, in one or more data structures, the description of the problem and the ML generated candidate solution responsive to the validation that the at least one output value of the ML generated test case object matches the output of the function.

2. The system of claim 1, wherein the one or more processors are configured to:
create a string comprising an instruction code to be combined with the ML generated candidate solution generated using the one or more ML models; and
generate the function to validate the ML generated candidate solution, using the string.

3. The system of claim 1, wherein the one or more processors are configured to;
identify a name of the function; and
pass the name of the function to the execution environment to cause the execution environment to execute the ML generated test case object.

4. The system of claim 1, wherein the one or more prompts include first prompts and wherein the one or more processors are configured to:
cause, responsive to inputting one or more second prompts including a description of a test problem into the one or more ML models, the one or more ML models to generate a boilerplate portion of the ML generated candidate solution; and
store, in the one or more data structures, the boilerplate portion.

5. The system of claim 4, wherein to generate the ML generated test case object for the test problem and the ML generated candidate solution, the one or more processors are configured to:
cause the one or more ML models to generate the ML generated test case object;
parse, responsive to generation of the ML generated test case object, the ML generated test case object; and
cause the one or more ML models to generate the ML generated candidate solution.

6. The system of claim 1, wherein the one or more ML models generate a plurality of ML generated test case objects including the ML generated test case object and wherein the one or more processors are configured to determine, responsive to generation of each of the plurality of ML generated test case objects, whether the ML generated candidate solution satisfies a validity condition for each of the plurality of ML generated test case objects.

7. The system of claim 6, wherein to store the description of the problem and the ML generated candidate solution, the one or more processors are configured to store the description of the test problem and the ML generated candidate solution responsive to determining that the ML generated candidate solution satisfies the validity condition for each of the plurality of ML generated test case objects.

8. The system of claim 1, wherein the ML generated candidate solution is a first ML generated candidate solution and wherein the one or more processors are configured to:
cause the one or more ML models to generate a second ML generated candidate solution prior to the first ML generated candidate solution;
create a second function for execution in the execution environment by combining, with the second ML generated candidate solution, code generated using the second ML generated candidate solution to evaluate the ML generated test case object against the second function;
evaluate, in the execution environment, the ML generated test case object against the second function by passing the at least one input value of the ML generated test case object to the second function as an argument and compare the output of the second function with the at least one output value of the ML generated test case object; and cause the one or more ML models to generate the first ML generated candidate solution responsive to determining that the at least one output value of the ML generated test case object matches the output of the second function.

9. The system of claim 8, wherein the one or more processors are configured to:
debug the second ML generated candidate solution;
determine, responsive to debugging the second candidate solution, that the second ML generated candidate solution includes an error; and
discard the second ML generated candidate solution and cause the one or more ML models to generate the first ML generated candidate solution.

10. The system of claim 8, wherein the ML generated test case object is a first ML generated test case object and wherein the one or more processors are configured to:
debug a second ML generated test case object generated by the one or more ML models;
determine, responsive to debugging the second ML generated test case object, that the second ML generated test case object includes an error; and
discard the second test case and cause the one or more ML models to generate the first ML generated test case object.

11. The system of claim 10, wherein the one or more processors are configured to:
validate the second ML generated test case object with the second ML generated candidate solution; and
compare one or more expected outputs of the second ML generated test case object with one or more outputs of the second ML generated candidate solution based on one or more inputs of the second ML generated test case object input into the second ML generated candidate solution.

12. The system of claim 11, wherein the one or more processors are configured to:
validate the second ML generated test case object with the ML generated candidate solution;
debug, responsive to one or more outputs of the second ML generated test case object not matching one or more corresponding outputs of the ML generated candidate solution, the second ML generated test case object; and
determine, responsive to debugging the second ML generated test case object, that the second ML generated test case object includes the error;
discard the second ML generated test case object and cause the one or more ML models to generate the first ML generated test case object for the ML generated candidate solution.

13. The system of claim 1, wherein the ML generated test case object is one of a plurality of ML generated test case objects and wherein the one or more processors are configured to initiate generation of the ML generated candidate solution prior to the one or more ML models completing generation of each of the plurality of ML generated test case objects.

14. The system of claim 1, wherein the one or more processors are configured to provide, for presentation at a client device, the ML generated candidate solution subsequent to storing, in the one or more data structures, the description of the problem and the ML generated candidate solution.

15. The system of claim 1, wherein the one or more prompts include first prompts and the one or more processors are configured to:

receive, from a client device, a domain of the test problem to be generated;
generate, responsive to one or more second prompts and the domain input into the one or more ML models, one or more short problem summaries corresponding to the domain;
cause, responsive to the one or more second prompts and a candidate short problem summary of the one or more short problem summaries input into one or more ML models, a description of the test problem corresponding to the domain and the candidate short problem description.

16. The system of claim 1, wherein the one or more ML models includes at least one of one or more generative pretrained transformer models or one or more large language models (LLMs).

17. The system of claim 1, wherein the one or more processors are configured to:
generate, by the one or more ML models responsive to a prompt comprising an indication of the test problem, a string of text comprising the description of the test problem; and
provide for display on a client device, the string of text.

18. The system of claim 17, wherein the one or more processors are configured to:
generate, by the one or more ML models responsive to a type of the computer code indicated in the one or more prompts and the string of text input into the one or more ML models, a boilerplate portion of the ML generated candidate solution according to the indicated type; and
provide for display on the client device, the boilerplate portion.

19. The system of claim 1, wherein the one or more processors are configured to:
receive, from the one or more ML models responsive to parsing the ML generated candidate solution of the one or more ML generated candidate solutions for the test problem, the ML generated candidate solution parsed into a JavaScript Object Notation (JSON) object.

20. The system of claim 1, wherein the one or more processors are configured to:
receive an indication that an ML generated test case object or the solution is incorrect;
generate, responsive to the indication, a plurality of calls for the one or more ML models, each of the plurality of calls including the ML generated test case object;
receive a plurality of results from the one or more ML models responsive to the plurality of calls; and
determine, based on the plurality of results, validity of the ML generated test case object.

21. A method, comprising:
causing, by one or more processors, responsive to inputting one or more prompts including a description of a test problem for evaluating skills of a user to write computer code, into one or more ML models, the one or more ML models to generate;
(i) an ML generated candidate solution for the test problem, the ML generated candidate solution comprising an ML generated computer code; and
(ii) an ML generated JavaScript Object Notation (JSON) test case object that includes at least one input value and at least one output value to validate the ML generated candidate solution for the test problem;
passing, by the one or more processors, to a function executed in an execution environment, the at least one input value of the ML generated test case object using the ML generated candidate solution;

validating, by the one or more processors, by executing the ML generated test case object against the function in the execution environment, the ML generated candidate solution by passing the at least one input value of the ML generated test case object to the function as an argument and comparing the output of the function utilizing the ML generated candidate solution with the at least one output value of the ML generated test case object; and storing, by the one or more processors, in one or more data structures, the description of the problem and the ML generated candidate solution responsive to validating that the at least one output value of the ML generated test case object matches the output of the function.

22. A non-transitory computer-readable media having processor readable instructions, such that, when executed, causes at least one processor to:

cause, responsive to inputting one or more prompts including a description of a test problem for evaluating skills of a user to write computer code into one or more ML models, the one or more ML models to generate:
  (i) an ML generated candidate solution for the test problem, the ML generated candidate solution comprising an ML generated computer code; and
  (ii) an ML generated JavaScript Object Notation (JSON) test case object that includes at least one input value and at least one output value to validate the ML generated candidate solution for the test problem;

pass, to a function executed in an execution environment, the at least one input value of the ML generated test case object using the ML generated candidate solution;

validate, by executing the ML generated test case object against the function in the execution environment, the ML generated candidate solution by passing the at least one input value of the ML generated test case object to the function as an argument and comparing the output of the function utilizing the ML generated candidate solution with the at least one output value of the ML generated test case object; and store, in one or more data structures, the description of the problem and the ML generated candidate solution responsive to the validation that the at least one output value of the ML generated test case object matches the output of the function.

* * * * *